US006184850B1

(12) United States Patent
Suzuki et al.

(10) Patent No.: US 6,184,850 B1
(45) Date of Patent: **xwx.-99,-9999

(54) IMAGE DISPLAY APPARATUS WITH BACKLIT DISPLAY AND METHOD OF DRIVING THE SAME

(75) Inventors: Hidetoshi Suzuki, Fujisawa; Ichiro Nomura, Atsugi; Tetsuya Kaneko, Yokohama; Naoto Nakamura, Isehara, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/946,570

(22) Filed: Oct. 7, 1997

Related U.S. Application Data

(63) Continuation of application No. 08/692,400, filed on Aug. 5, 1996, now abandoned, which is a continuation of application No. 08/208,298, filed on Mar. 10, 1994, now abandoned.

(51) Int. Cl.[7] ............................................. G09G 3/22
(52) U.S. Cl. ............................................. 345/74; 345/77
(58) Field of Search ................................. 345/30, 47, 48, 345/49, 50, 60, 65, 74, 75, 76, 77, 84, 87, 105, 106; 359/45, 47, 48, 49, 51, 52; 313/495, 391, 422; 315/169.1, 169.3, 169.4

(56) References Cited

U.S. PATENT DOCUMENTS

| | | | | |
|---|---|---|---|---|
| 4,799,050 | * | 1/1989 | Prince et al. | 345/32 |
| 4,822,145 | * | 4/1989 | Staelin | 359/42 |
| 4,882,617 | * | 11/1989 | Vriens | 348/751 |
| 4,952,031 | * | 8/1990 | Tsunoda et al. | 359/45 |
| 4,958,104 | | 9/1990 | Suzuki et al. | 313/495 |
| 4,958,915 | * | 9/1990 | Okada et al. | 359/50 |
| 5,121,233 | * | 6/1992 | Spencer et al. | 345/102 |
| 5,155,416 | * | 10/1992 | Suzuki et al. | 345/77 |
| 5,315,418 | * | 5/1994 | Spague et al. | 359/41 |

FOREIGN PATENT DOCUMENTS 56-15529   4/1981   (JP).
62-35325   2/1987   (JP).

OTHER PUBLICATIONS

W.P. Dyke, et al., "Field Emission", Advances in Electronics and Electron Physics, vol. III, 1956, pp. 90–182.
C.A. Spindt, et al., "Physical properties of thin-film emission cathodes with molybdenum cones", Journal of Applied Physics, vol. 47, No. 12, Dec. 1976, pp. 5247–5263.
C.A. Mead, "Operation of Tunnel-Emission Devices", Journal of Applied Physics, vol. 32, No. 4, Jan.–Dec. 1961, pp. 646–652.
M.I. Elinson, et al., "The Emission of Hot Electrons and the Field Emission of Electrons from Tin Oxide", Radio Engineering and Electronic Physics, No. 7, Jul. 1965, pp. 1290–1296.
G. Dittmer, "Electrical Conduction and Electron Emission of DIscontinuous Thin Films", Thin Solid Films, No. 9, 1972, pp. 317–328.

(List continued on next page.)

Primary Examiner—Chanh Nguyen
(74) Attorney, Agent, or Firm—Fitzpatrick, Cella, Harper & Scinto

(57) ABSTRACT

An image display apparatus includes a panel type light source including a plurality of cold-cathode devices arranged two-dimensionally on a substrate and a phosphor member contained in a same vacuum container for emitting visible light upon irradiation of electron beams by the cold-cathode devices. In addition, a transmission type optical modulation panel using the panel type light source as a back light source.

26 Claims, 37 Drawing Sheets

OTHER PUBLICATIONS

M. Hartwell, et al., "Strong Electron Emission From Patterned Thin–Indium Oxide Thin Films", International Electron Devices Meeting (IEDM Tech. Digest), 1975, Washington, D.C., Catalog No. 75 CH1023–1Ed., pp. 519–521.

H. Araki, et al., "Electroforming and Electron Emission of Carbon Thin Films", Journal of Vacuum Society of Japan, vol. 26, No. 1, Sep. 24, 1981, pp. 22–29.

C.A. Spindt, A Thiin–Film Field Emission Cathode, Journal of Applied Physics, vol. 39, No. 6, May 1968, pp. 3504–3505.

* cited by examiner

FIG. 24A

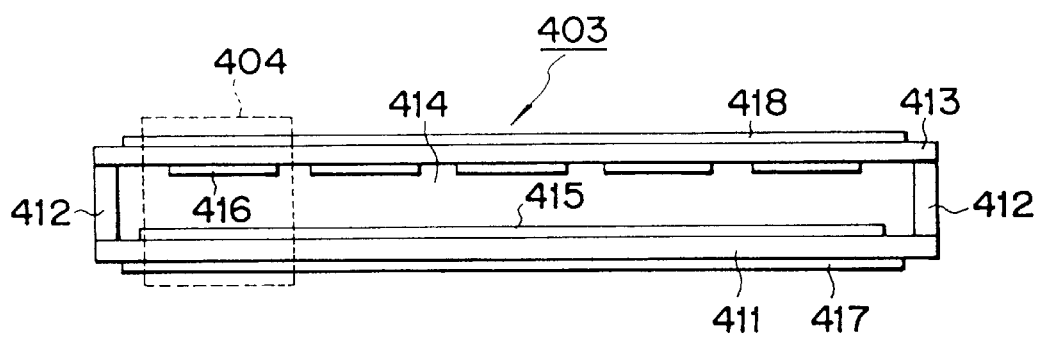
FIG. 27A
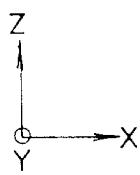
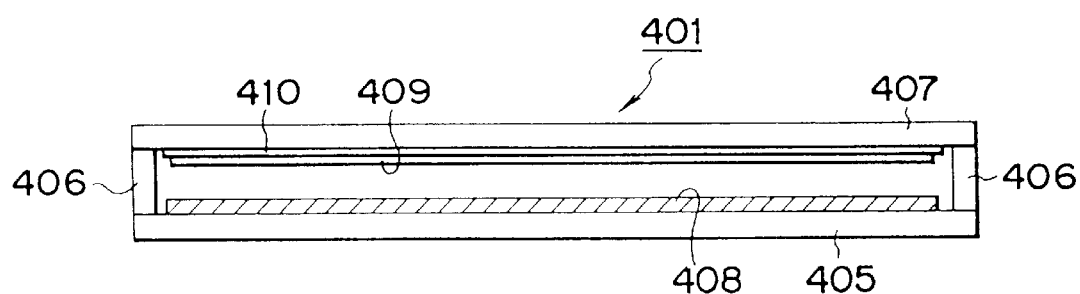
FIG. 27B

IMAGE DISPLAY APPARATUS WITH BACKLIT DISPLAY AND METHOD OF DRIVING THE SAME

This application is a continuation of application Ser. No. 08/692,400, filed Aug. 5, 1996, which is a continuation of application Ser. No. 08/208,298, filed Mar. 10, 1994, now both abandoned.

BACKGROUND OF THE INVENTION

1. Field of the Invention

This invention relates to an image display apparatus comprising a light source and a transmission type optical modulation panel and a method of driving the same.

2. Related Background Art

Image display apparatuses comprising a transmission type optical modulation panel such as a liquid crystal display panel to be illuminated from behind to show images are known. Such display apparatuses are normally classified into a direct viewing type comprising an image carrying panel to be directly viewed and a projection type comprising a screen for showing projected images.

As a matter of course, such image displays are required to show satisfactorily bright images without uneven distribution of illumination.

FIG. 37 of the accompanying drawings schematically shows a conventional direct viewing type image display apparatus. Referring to FIG. 37, the apparatus comprises a fluorescent lamp 641, a reflector 642 having a concave cross section, a diffusing panel 643 and a liquid crystal display panel 644. Rays of light emitted from the fluorescent lamp 641 are partly made to hit the diffusing panel 643 directly and partly reflected by the reflector 642 before they get to the diffusing panel 643. The liquid crystal display panel 644 is illuminated from behind by the rays of light that have been diffused by the diffusing panel 643.

However, it is a known fact that it is practically impossible for an image display apparatus having a configuration as described above to show satisfactorily bright images without uneven distribution of illumination, even if the fluorescent lamp 641 and the reflector 642 are designed optimally in terms of brightness and distribution of illumination. A net result is then an unevenly illuminated display panel.

On the other hand, it is desired for a projection type image display apparatus to have its transmission type optical modulation panel illuminated brighter than that of a direct viewing type apparatus with an enhanced level of even distribution of illumination. According to a known method developed to achieve this objective, a highly bright luminous tube such as a metal halide lamp and a concave mirror are combined to produce a light source for illuminating a liquid crystal display panel. With such an arrangement, however, the metal halide lamp itself intercepts some of the rays of light reflected by the concave mirror to project its shadow on the panel and hence hinders the attempt of evenly illuminating the panel.

Another known illumination method involves the use of a cathode luminescence light source. FIG. 38 of the accompanying drawings schematically shows a display apparatus using such a light source. Referring to FIG. 38, the apparatus comprises a glass vacuum container 701, a phosphor layer 702, a metal backing layer 703 and an electron gun having a thermionic cathode as an electron source. Again, however, it is practically impossible for such a light source to irradiate the phosphor layer with evenly distributed electron beams, even if its electronic optical lens and electron gun are designed optimally in terms of brightness and distribution of illumination. A net result is also an uneven illumination.

There has also been proposed a cathode luminescence light source for a display apparatus as schematically illustrated in FIG. 39 of the accompanying drawings in an attempt to achieve an evenly distributed illumination. In FIG. 39, reference numerals 701 through 703 denote, respectively, the same components as those of FIG. 38, although a plurality of wire cathodes (linear thermionic cathodes) 805 are arranged in parallel to replace the electron gun 704 of FIG. 38. Additionally, a grid electrode 806 is provided to improve the even distribution of electron beams irradiating the phosphor layer 702. However, the display panel of this apparatus is accompanied by regularly distributed variations in the intensity of illumination attributable to the arrangement of wire cathodes 805 and variations in the temperature of the wire cathodes 805 (mainly attributable to the heat loss that takes place at the wire cathode supporting sections) and it is extremely difficult, if not totally impossible, to completely eliminate these variations. Since each of the light valves of a liquid crystal display panel is very small in its effect when compared with the wire cathodes 805, the regularly distributed variations in the intensity of illumination of the panel are directly reflected on the brightness of the images projected on the panel.

SUMMARY OF THE INVENTION

In view of the above identified problems of the existing transmission type optical modulation panels, it is therefore an object of the invention to provide a display apparatus comprising a panel of the type under consideration showing an extremely even distribution of brightness as well as a method of driving such an apparatus.

According to the invention, the above object is achieved by providing an image display apparatus comprising a panel type light source including a plurality of cold-cathode devices arranged two-dimensionally on a substrate and a phosphor member contained in a same vacuum container for emitting visible light upon irradiation of electron beams by the cold-cathode devices, and a transmission type optical modulation panel using the panel type light source as a back light source.

According to the invention, there is also provided a method of driving an image display apparatus comprising a panel type light source including a plurality of cold-cathode devices arranged two-dimensionally on a substrate and a phosphor member contained in a same vacuum container for emitting visible light upon irradiation of electron beams by the cold-cathode devices and a transmission type optical modulation panel, said method comprising steps of applying a voltage to the plurality of cold-cathode devices arranged two-dimensionally on a substrate to force them to emit electron beams, irradiating the phosphor member with electron beams emitted by said plurality of cold-cathode devices to cause it to emit visible light, illuminating the transmission type optical modulation panel from the back and driving the transmission type optical modulation panel according to picture signals.

According to the invention, there is further provided a method of driving an image display apparatus comprising a panel type light source including a plurality of cold-cathode devices arranged two-dimensionally on a substrate and a phosphor layer contained in a same vacuum container for emitting visible light upon irradiation of electron beams by the cold-cathode devices and a transmission type optical modulation panel, wherein said plurality of cold-cathode devices are arranged in rows in parallel with an X-axis and stripe-shaped light valves are arranged in parallel with a Y-axis rectangularly intersecting said X-axis, said X- and Y-axes being defined by a coordinate system, said method comprising steps of sequentially scanning the light emitting areas of the panel type light source according to incoming picture signals and applying a modulation signal to the light valves of the transmission type optical modulation panel in synchronism with the scanning operation.

BRIEF DESCRIPTION OF THE DRAWINGS

FIGS. 24A through 24D show voltage waveforms of signals that can be used to drive cold cathode devices comprised in the panel type light source of the third embodiment.

FIGS. 27A and 27B are sectional views of the embodiment of FIG. 26 taken along two different planes defined by arrows X and Z.

DETAILED DESCRIPTION OF THE PREFERRED EMBODIMENTS

Figure 1:
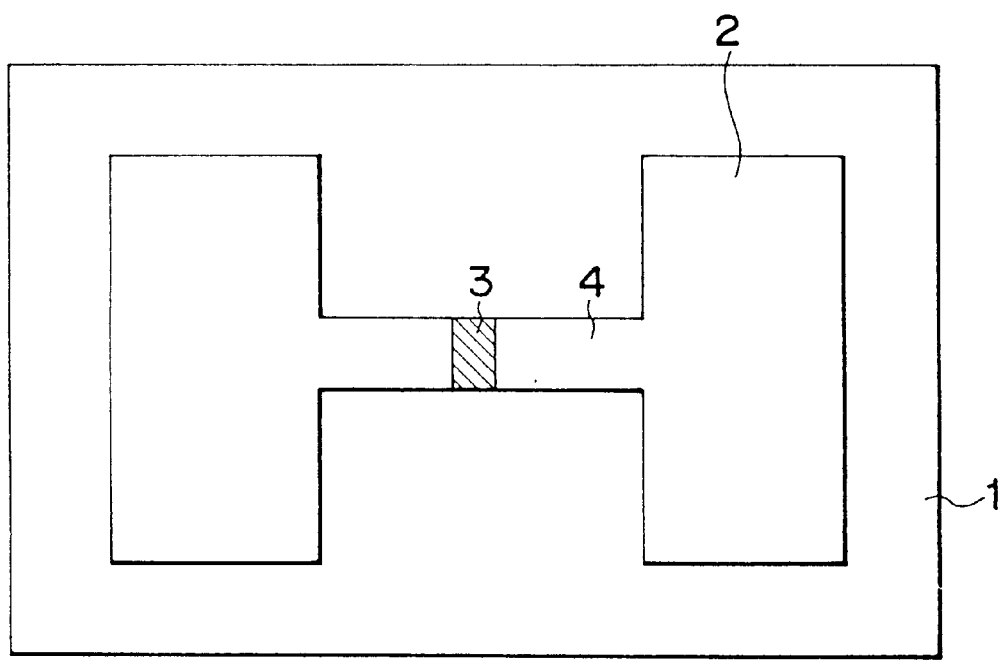
FIG. 1 is a plan view of a surface conduction electron-emitting device that can suitably be used as a cold cathode device for the purpose of the invention.

Now, the present invention will be described in greater detail by referring to the accompanying drawings that illustrate different phases of carrying out the invention as well as preferred embodiments thereof.

(Phase 1)

In the first phase of carrying out the invention, a panel type light source is arranged close to or in direct contact with the rear side of a transmission type optical modulation panel for a direct viewing type or projection type image display apparatus according to the invention. For the purpose of the invention, a panel type light source comprises a multi-electron-beam source realized by arranging a large number of cold cathode devices on a substrate, which is then fitted to the bottom of a thin vacuum container, and a phosphor layer arranged on the inner surface of the face plate of the vacuum container to emit visible light upon irradiation of electron beams. Rays of visible light are emitted from the phosphor layer when it is irradiated with multi-electron-beams generated by applying a voltage to the plurality of cold cathode devices.

Unlike a thermionic cathode device, a cold cathode device can emit electron beams without being heated to a high temperature. Cold cathode devices that may be used for the purpose of the invention include field emission type (hereinafter referred to as FE type), metal/insulation layer/metal type (hereinafter referred to as MIM type) and surface conduction type (hereinafter referred to SCE type) electron-emitting devices. Examples of the FE type device are described in W. P. Dyke & W. W. Dolan, "Field Emission", Advance in Electron Physics, 8,89 (1956) and C. A Spindt, "Physical Properties of Thin-Film Field Emission Cathodes with Molybdenum Cones", J. Appl. Phys., 47, 5248 (1976).

Examples of the MIM type devices are illustrated in C. A. Mead, "The Tunnel-Emission Amplifier", J. Appl. Phys., 32,646 (1961).

Examples of the SCE type devices are introduced in M. I. Elenson, "Radio Eng. Electron Phys.", 10 (1965).

Since cold cathode devices of any of the above described types can be tightly arranged in large numbers on a substrate without providing wide spaces separating them from each other, they allow a neat and even arrangement by far more than thermionic cathode devices. Additionally, since differences in the performance of the devices arranged on a small area are optimally compensated, if the number of devices is large, they can realize a highly uniform and flat electron beam source.

In short, an image display apparatus according to the invention shows a highly even distribution of brightness as it comprises a panel type light source realized by combining such a highly uniform electron beam source and a phosphor layer and arranged so as to illuminate a transmission type optical modulation panel from behind.

(Phase 2)

An image display apparatus according to the invention achieves a remarkable improvement in terms of even distribution of brightness by using cold cathode devices as described above, which most suitably are surface conduction type electron-emitting devices in view of the fact that MIM type devices require a rigorous control of the thicknesses of the insulation layer and the upper electrode and FE type devices need to be severely controlled for the profile of the needle-like electron-emitting member. Consequently, devices of these types are rather costly and difficult to manufacture, particularly when they are to be used for large display panels.

Contrary to the above problem and as described hereinafter, surface conduction type electron-emitting devices are structurally simple and it is easy and less costly to manufacture them if they are to be used for large display panels. This advantage has become particularly beneficial in recent years as there has been a remarkably increasing demand for high quality and less expensive large display apparatuses.

An SCE type device utilizes the phenomenon that electrons are emitted when an electric current is made to flow along the surface of a small thin film formed on a substrate. Known surface conduction type electron-emitting devices include those using an $SnO_2$ thin film as proposed by Elinson et al. referred to earlier, those using an Au thin film as described in G. Dittmer, "Thin Solid Films", 9,317 (1972), those comprising an $In_2O_3/SnO_2$ thin film as disclosed in M. Hartwell and C. G. Fonstad, "IEEE Trans. ED Conf.", 519 (1975) and those using a carbon thin film as proposed in Hisashi Araki et al., "Vacuum", Vol. 26, No. 1, p. 22 (1983).

FIG. 1 is a plan view of a surface conduction type electron emitting device (hereinafter referred to as "surface conduction electron-emitting device" as usual) developed by M. Harwell, which is a typical SCE type device. Referring to FIG. 1, it comprises an H-shaped metal oxide thin film 2 for an electron-emitting region formed on an insulator substrate 1 by sputtering. An electron-emitting region 3 is formed therein when electrically energized in a process called "forming" as described in detail hereinafter. Reference numeral 4 denotes the thin film including the electron-emitting region 3 that has already been formed.

An electron-emitting region 3 is produced in a surface-conduction electron-emitting device normally by electrically energizing a thin film 2, a process generally referred to as "forming". More specifically, a slowly rising DC voltage that rises, for instance, at a rate of 1 V/min. is applied to the opposite ends of the thin film 2 to locally destroy or deform or structurally modify the thin film 2 to produce fissures in a part thereof, which then becomes an electrically highly resistive electron-emitting region 3. Once the surface-conduction electron-emitting device is processed for forming, electrons will be emitted from those fissures and their neighboring areas of the electron-emitting region 3 when a voltage is applied to the thin film 4 including the electron-emitting region 3 to cause an electric current to flow through the device.

Although surface conduction electron-emitting devices to be used as electron beam sources for the purpose of the invention are not subject to specific limitations in terms of structure, materials and manufacturing method, those having a configuration as described below under the heading of (Phase for Surface Conduction Electron-Emitting Device) are particularly preferable because they show excellent performances and can be manufactured in a relatively simple manner. (Phase for Surface Conduction Electron-Emitting Device)

A surface conduction electron-emitting device to be used for the purpose of the invention has a configuration as described below and is manufactured in the following way. A surface conduction electron-emitting device to be used for the purpose of the invention may be either of flat type or of step-forming type.

Firstly a surface conduction electron-emitting device of flat type will be described.

Figure 2A:
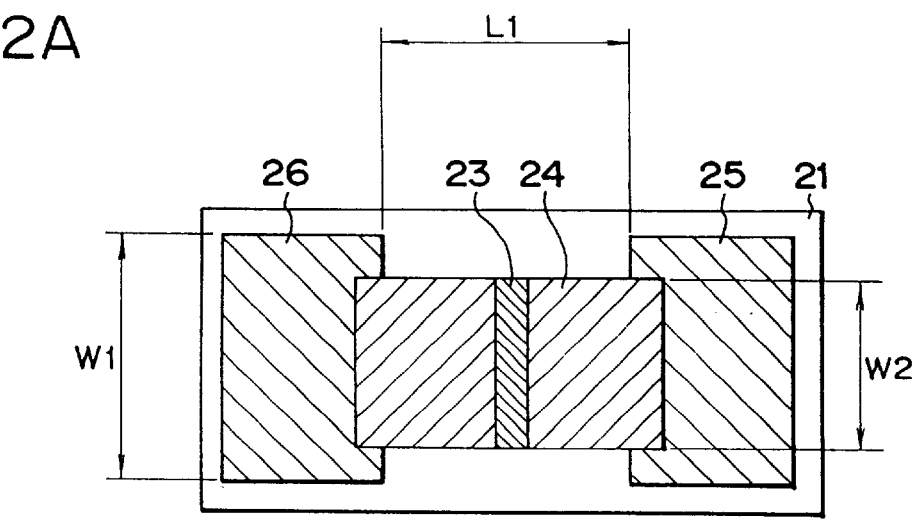
FIGS. 2A and 2B are respectively a plan view and a sectional side view of a surface conduction type, flat electron emitting device that can most suitably be used as a cold cathode device for the purpose of the invention.
Figure 2B:
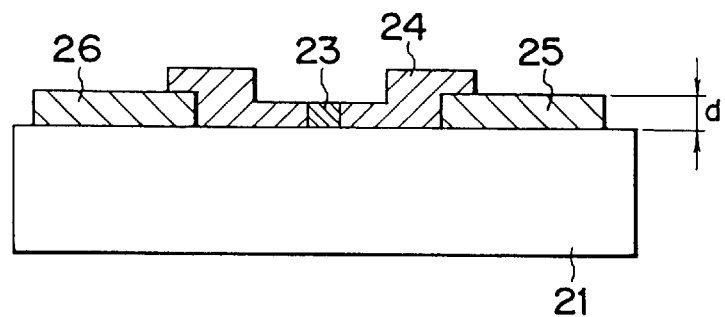

FIGS. 2A and 2B are a schematic plan view and a sectional view of a surface conduction electron-emitting device to be used for the purpose of the invention, showing its basic configuration.

Referring to FIGS. 2A and 2B, the device comprises a pair of device electrodes 25 and 26 and a thin film 24 including an electron-emitting region 23 formed on a substrate 21.

The substrate 21 is preferably an insulator substrate such as a glass substrate made of quartz glass, glass containing Na and other impurities to a reduced level or soda lime glass, a multilayer glass substrate prepared by forming a $SiO_2$ layer on soda lime glass by sputtering or a ceramic substrate made of a ceramic material such as alumina.

While the oppositely arranged device electrodes 25 and 26 may be made of any conductor material, preferred candidate materials include metals such as Ni, Cr, Au, Mo, W, Pt, Ti, Al, Cu and Pd, their alloys, printable conductor materials made of a metal or a metal oxide selected from Pd, Ag, $RuO_2$, Pd-G and glass, transparent conductor materials such as $In_2O_3$—$SnO_2$ and semiconductor materials such as polysilicon.

The distance L1 separating the electrodes is between hundreds of angstroms and hundreds of micrometers and determined as a function of various technical aspects of the photolithography to be used for manufacturing the device, including the performance of the aligner and the etching method involved, and the voltage to be applied to the electrodes and the electric field strength designed for electron emission. Preferably it is between several micrometers and tens of several micrometers.

The lengths W1 of the electrodes 25 and 26 and the thickness d of the device electrodes 25 and 26 may be determined on the basis as the requirements involved in designing the device such as the resistances of the electrodes and the arrangement of the plurality of electron sources to be provided, although the length W1 of the electrodes 25 and 26 is normally between several micrometers and several hundred micrometers and the thickness d of the device electrodes 25 and 26 is typically between several hundred angstroms and several micrometers.

While the thin film 24 of the device that includes an electron-emitting region 23 is arranged between and partly laid on the device electrodes 25 and 26 oppsitely disposed on the substrate 21 as seen in FIG. 2B, it may alternatively be so arranged as to be located off the device electrodes 25 and 26 on the substrate 21. In other words, a thin film 24 and a pair of device electrodes 25 and 26 are sequentially laid on a substrate 21 to produce such a device. Still alternatively, it may be so arranged that all the areas of the thin film found between the oppositely arranged device electrodes 25 and 26 may operate as an electron-emitting region. The thickness of the thin film 24 including the electron-emitting region is preferably between several angstroms and several thousand angstroms and most preferably between 10 and 500 angstroms. It is determined as a function of the step coverage of the thin film 24 to the device electrodes 25 and 26, the resistance between the electron-emitting region 23 and the device electrodes 25 and 26, the mean size of the conductor particles of the electron-emitting region 23 and the parameters for the forming operation that will be described later as well as other factors. The thin film 24 normally shows a resistance per unit surface area between $10^1$ and $10^9$ $\Omega/\square$.

The thin film 24 including the electron-emitting region is made of a material selected from metals such as Pd, Pt, Ru, Ag, Au, Ti, In, Cu, Cr, Fe, Zn, Sn, Ta, W and Pb, oxides such as PdO, $SnO_2$, $In_2O_3$, PbO and $Sb_2O_3$, borides such as $HfB_2$, $ZrB_2$, $LaB_6$, $CeB_6$, $YB_4$ and $GdB_4$, carbides such as TiC, ZrC, HfC, TaC, SiC and WC, nitrides such as TiN, ZrN and HfN, semiconductors such as Si and Ge and carbon, preferably made of fine particle film of these materials.

The term "a fine particle film" as used herein refers to a thin film constituted of a large number of fine particles that may be loosely dispersed, tightly arranged or mutually and randomly overlapping (to form an island structure under certain conditions). Such fine particles have a particle size between several and several thousands angstroms and preferably between 10 and 200 angstroms.

The electron-emitting region 23 is constituted of a large number of fine conductor particles with a mean particle size of preferably between several and several hundreds angstroms and most preferably between 10 and 500 angstroms and the thickness of the thin film 24 including the electron-emitting region is determined depending on a number of factors including the method selected for manufacturing the device and the parameters for the forming operation that will be described later. The material of the electron-emitting region 23 may be selected from all or part of the materials that can be used to prepare the thin film 24 including the electron-emitting region.

Figure 3A:
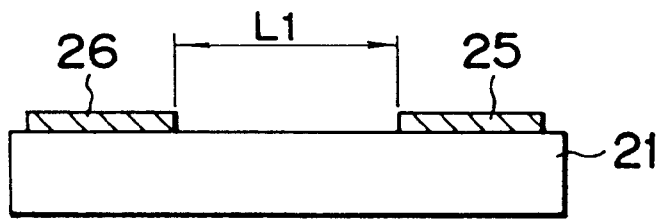
FIGS. 3A through 3C are sectional side views of a surface conduction electron-emitting device that can most suitably be used as a cold cathode device for the purpose of the invention, showing different manufacturing steps thereof.
Figure 3B:
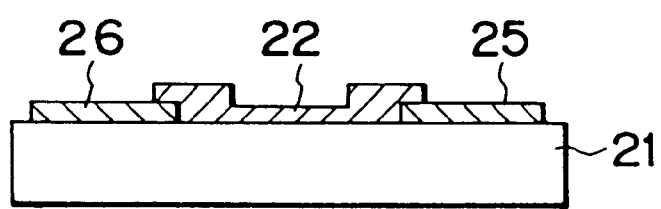
Figure 3C:
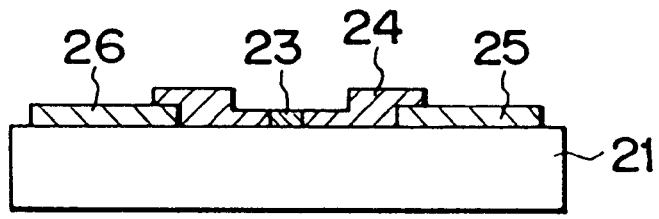

While a number of different methods may be used for manufacturing an electron-emitting device comprising an electron-emitting region 23, FIGS. 3A through 3C illustrates different steps of a specific method. In FIGS. 3A through 3C, reference numeral 22 denotes a thin film to be used for producing an electron-emitting region and may preferably be a fine particle film.

Now the method will be described below by referring to FIGS. 3A through 3C.

1) After a substrate 21 is thoroughly washed with detergent, pure water and organic solvent, a selected electrode material is deposited thereon at oppositely arranged locations by means of vacuum deposition, sputtering or some other appropriate technique and then processed by photolithography to produce a pair of device electrodes 25 and 26 (FIG. 3A).

2) An organic metal solution is applied to the surface area of the substrate 21 between the device electrodes 25 and 26 and left to dry to produce an organic metal thin film. The organic metal solution is a solution of an organic compound of a metal selected from Pd, Ru, Ag, Au, Ti, In, Cu, Cr, Fe, Zn, Sn, Ta, W and Pb as listed earlier. Thereafter, the formed organic metal thin film is heated for sintering and then subjected to a patterning operation, using a lift-off or etching technique, to produce a thin film 22 (FIG. 3B). While the organic metal thin film is prepared by applying an organic metal solution onto the substrate in the above description, such a film may also be formed by using a different technique such as vacuum deposition, sputtering, chemical vacuum deposition, distributed application, dipping or spinner.

Figure 4:
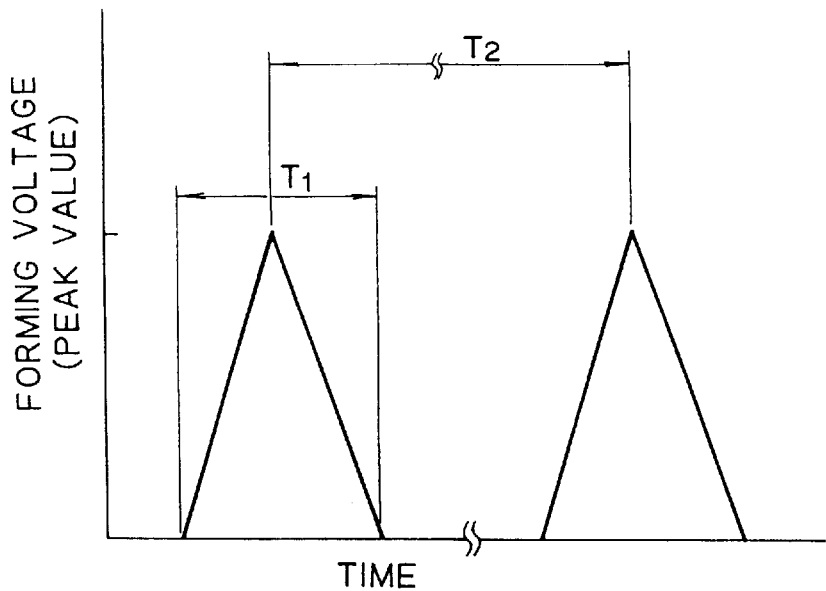
FIG. 4 is a graph showing the forming voltage waveform for a surface conduction electron-emitting device that can most suitably be used as a cold cathode device for the purpose of the invention.

3) Subsequently, the thin film 22 is subjected to a so-called forming operation, where a pulsed or rapidly increasing voltage is applied to the device electrodes 25 and 26 by a power source (not shown) to locally modify the structure of the thin film 22 in an area that becomes an electron-emitting region 23 (FIG. 3C). More specifically, the thin film 22 is locally destroyed, deformed or structurally modified as it is energized to become an electron-emitting region 23. As described above, the inventors of the present invention have proved through observation that the electron-emitting region 23 is constituted of fine conductor particles. FIG. 4 shows a graph illustrating the forming voltage waveform to be used for a forming operation.

In FIG. 4, T1 and T2 respectively indicate the pulse width and the pulse interval of triangular pulsed voltage waves, T1 being between 1 and 10 microseconds, T2 being between 10 and 100 microseconds. A peak level (peak voltage for forming) of triangular pulse waves is appropriately selected. The forming operation is conducted for a time period between tens of several seconds to several minutes in a vacuum atmosphere of approximately $10^{-5}$ Torr.

While a voltage is applied to the electrodes of an electron-emitting device in the form of triangular pulses to produce an electron-emitting region as described above, it may not necessarily take a triangular wave form and rectangular waves or waves in some other form may alternatively be used. Likewise, other appropriate values may be selected for the pulse width, the pulse interval and the peak level to optimize the performance of the electron-emitting region to be produced depending on the intended resistance of the electron-emitting device and other related factors.

Figure 5:
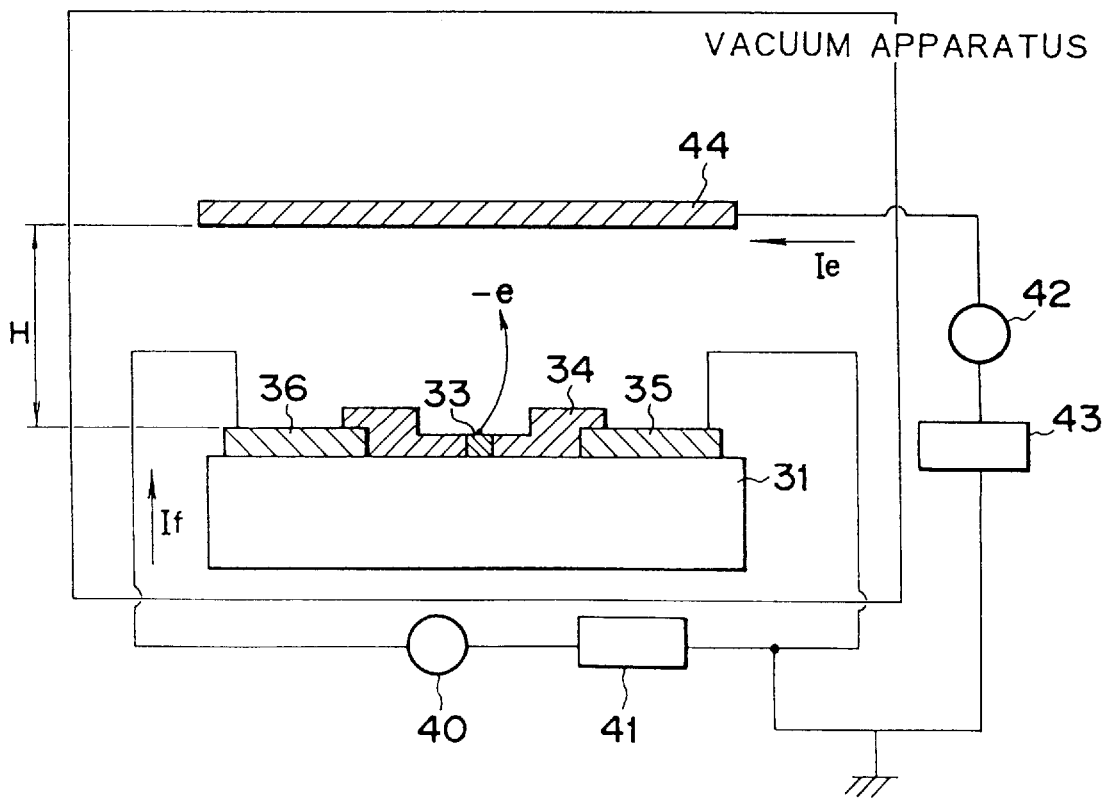
FIG. 5 is a schematic block diagram of an apparatus designed to determine the performance of a surface conduction electron-emitting device that can most suitably be used as a cold cathode device for the purpose of the invention.

FIG. 5 is a schematic block diagram of a gauging system for determining the performance of an electron-emitting device that has been subjected to a forming operation.

In FIG. 5 that schematically shows a gauging system for determining the performance of an electron-emitting device having a configuration as illustrated in FIGS. 2A and 2B, an electron-emitting device comprises a substrate 31, a pair of device electrodes 35 and 36 and a thin film 34 including an electron-emitting region 33. On the other hand, the gauging system comprises a power source 41 for applying a device voltage Vf to the device, an ammeter 40 for metering the device current If running through the thin film 34 including the electron-emitting section and between the device electrodes 35 and 36, an anode 44 for capturing the emission current Ie emitted from the electron-emitting section of the device, a high voltage source 43 for applying a voltage to the anode 44 and another ammeter 42 for metering the emission current Ie emitted from the electron-emitting section 33.

For measuring the device current If and the emission current Ie, the device electrodes 35 and 36 are connected to the power source 41 and the ammeter 40 and the anode 44 connected to the power source 43 and the ammeter 42 is placed above the device. The electron-emitting device and the anode 44 are put into a vacuum chamber, which is provided with an exhaust pump, a vacuum gauge and other pieces of equipment necessary to operate a vacuum chamber so that the metering operation can be conducted under a desired vacuum condition.

For determining the performance of the device, a voltage between 1 and 10 KV is applied to the anode, which is spaced apart from the electron emitting device by distance H between 2 and 8 mm.

Figure 6:
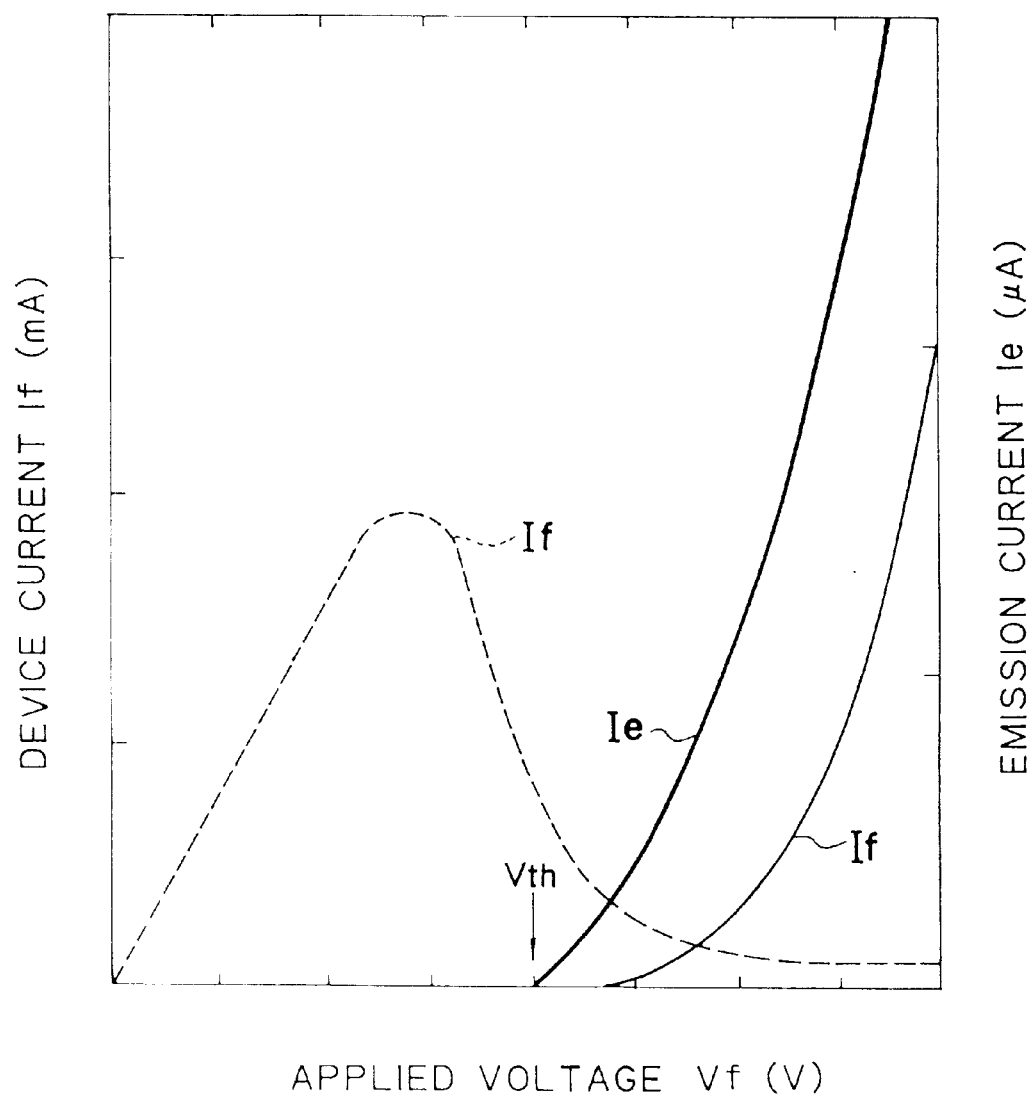
FIG. 6 is a graph showing the electric performance of a surface conduction electron-emitting device that can most suitably be used as a cold cathode device for the purpose of the invention.

FIG. 6 shows a graph schematically illustrating the relationship between the device voltage Vf and the emission current Ie and the device current If typically observed by the gauging system of FIG. 5. Note that different units are arbitrarily selected for Ie and If in FIG. 6 in view of the fact that Ie has a magnitude far smaller than that of If. As seen in FIG. 6, an electron emitting device to be suitably used for the purpose of the invention has three remarkable features in terms of emission current Ie, which will be described below.

Firstly, an electron emitting device of the type under consideration shows a sudden and sharp increase in the emission current Ie when the voltage applied thereto exceeds a certain level (which is referred to as a threshold voltage hereinafter and indicated by Vth in FIG. 5), whereas the emission current Ie is practically unobservable when the applied voltage is found lower than the threshold value Vth. Differently stated, an electron emitting device of the above identified type is a non-linear device having a clear threshold voltage Vth to the emission current Ie.

Secondly, since the emission current Ie is highly dependent on the device voltage Vf, the former can be effectively controlled by way of the latter.

Thirdly, the emitted electric charge captured by the anode 44 is a function of the duration of time of applying the device voltage Vf. In other words, the amount of electric charge captured by the anode 44 can be effectively controlled by way of the time during which the device voltage Vf is applied.

Because of the above remarkable features and a monotonously increasing property of the device current If and the emission current Ie to the device voltage Vf as shown in FIG. 6 in a surface conduction type electron-emitting device of the above identified type, it may find a variety of applications in various technological fields.

On the other hand, the device current If may either exhibit a monotonously increasing property to the device voltage Vf as shown by a solid line in FIG. 6 (a characteristic referred to as MI characteristic hereinafter) or a voltage-controlled-negative-resistance (a characteristic referred to as VCNR characteristic hereinafter) as shown by a broken line in FIG. 6. It is believed that either of the above peculiarities of the device current If appears depending on how the electron-emitting device is actually manufactured. Note that an electron-emitting device to be used for the purpose of the invention has the above described three features in either case.

It should be noted also that the method of manufacturing a surface conduction electron-emitting device comprising a step a dispersing conductor particles as described above may partly be modified particularly in terms of its basic components.

Now, a surface conduction electron-emitting device having an alternative profile, or a step forming type electron-emitting device, will be described.

Figure 7:
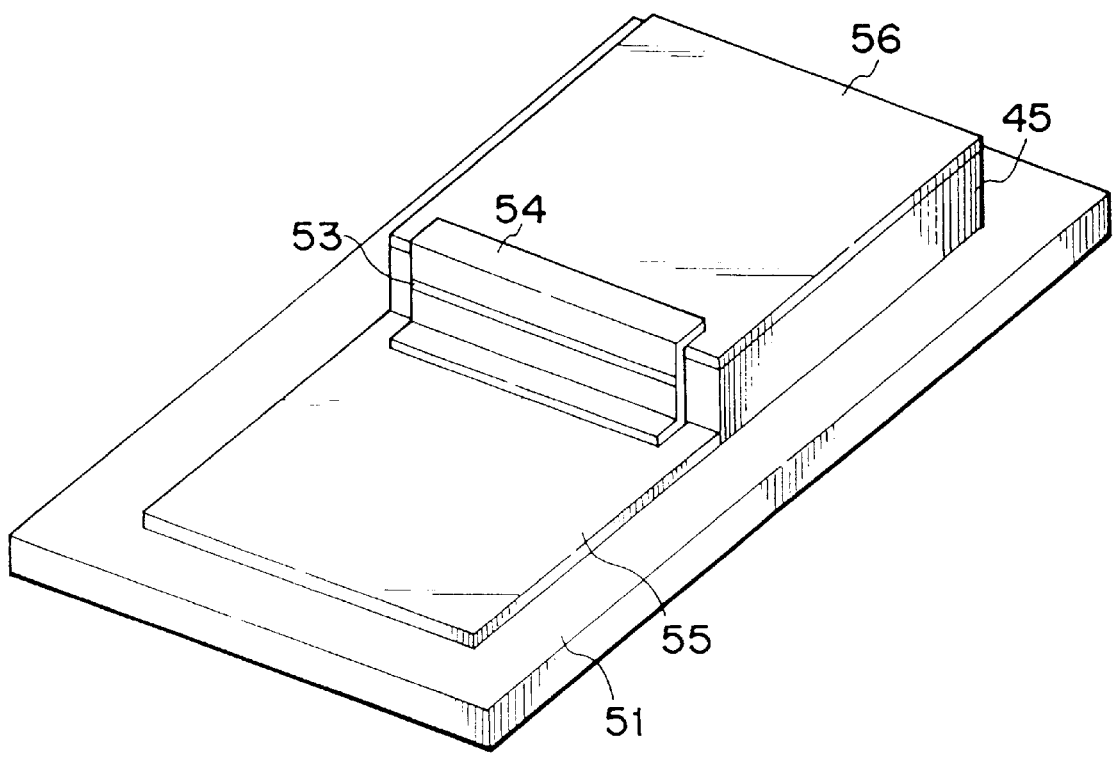
FIG. 7 is a schematic perspective view of a surface conduction, step-forming type electron emitting device that can most suitably be used as a cold cathode device for the purpose of the invention.

FIG. 7 is a schematic perspective view of a surface conduction step forming type electron-emitting device according to the invention.

As seen in FIG. 7, the device comprises a substrate 51, a pair of device electrodes 55 and 56, a thin film 54 including an electron-emitting region 53 and a step-forming section 45. Since the substrate 51, the device electrodes 55 and 56 and the thin film 54 including the electron-emitting region 53 are prepared from the materials same as those of their counterparts of a flat type electron-emitting device as described above, only the step-forming section 45 and the thin film 54 including the electron-emitting region 53 that characterize this device will be described in detail here.

The step-forming section 45 is made of an insulator material such as $SiO_2$ and formed there by vacuum deposition, printing, sputtering or some other appropriate technique to a thickness between several hundreds angstroms and tens of several micrometers, which is substantially equal to the distance L1 separating the electrodes of a flat electron-emitting device described earlier, although it is determined as a function of the technique selected for forming the step-forming section, the voltage to be applied to the electrodes of the device and the electric field strength available for electron emission and preferably found between several thousands angstroms and several micrometers.

As the thin film 54 including the electron-emitting region is formed after the device electrodes 55 and 56 and the step-forming section 45, it may preferably be laid on the device electrodes 55 and 56 and so shaped as to be suitably arranged without being laid on the device electrodes 55 and 56. The thickness of the thin film 54 including the electron-emitting section is a function of the method of preparing it and, in many cases, varies on the step-forming section and on the device electrodes 55 and 56. Normally, the thin film 54 is made less thick on the step-forming section than on the electrodes. Although the electron-emitting region 53 is linearly extending along the step-forming section 45 in FIG. 7, it may be differently arranged in terms of shape and position depending on the manufacturing and forming conditions.

While a surface conduction electron-emitting device according to the invention is described above in terms of its basic configuration and manufacturing method, such a device may be prepared with any other configuration and manufacturing method without departing from the scope of the invention so long as it is provided with the above defined three features and appropriately used for an image forming apparatus.

(Phase 3)

Any transmission type optical modulation panel may be used for an image display apparatus according to the invention if it can be controlled for the intensity of transmitted light by utilizing the electrooptic or thermooptic effect. For example, a liquid crystal display panel using a liquid crystal substance as a medium or an optical modulation panel using a transparent ceramic material such as BSO or PLZT as a medium may suitably be used.

A liquid crystal display panel using a liquid crystal substance as a medium may most suitably be used for the purpose of the invention. More specifically, contrary to that a transparent ceramic panel requires a relatively high voltage for optical modulation and entails a difficulty in preparing a large panel, a liquid crystal display panel can be driven at a relatively low voltage and have a large display area without entailing any difficulties. Additionally, a liquid crystal display panel consumes less energy and is less heavy than any other panel.

While liquid crystal display panels may be classified into groups particularly in terms of material, orientation, mode of operation and the use of active driving devices, any liquid crystal display panels may be used for the purpose of the invention regardless of such classification. For instance, a so-called simple matrix type panel utilizing a ferroelectric liquid crystal material provides a large visual field angle in spite of its structural simplicity. On the other hand, a so-called active matrix type T-N liquid crystal display panel offers an excellent graduation for images.

(Phase 4)

In a preferred mode of carrying out the present invention, there is provided an image display apparatus comprising a panel type light source that carries a number of cold cathode devices arranged in rows at regular intervals wherein the ratio of the interval of the rows of cold cathode devices to that of the rows of light valves of the transmission type optical modulation panel is constant throughout the display screen.

With such an arrangement, the image display apparatus offers a remarkably even distribution of brightness throughout the screen. If a direct viewing type image display apparatus is involved, the entire apparatus can be made very thin when compared with a conventional apparatus comprising a fluorescent lamp and a reflector.

Additionally, the distribution of brightness can be made further uniform by arranging optical diffusion means between the light emitting section of the panel type light source and the light valves of the transmission type light source.

The panel type light source and the transmission type optical modulation can be prevented from being electrically adversely affected by each other and being damaged by electrostatic charges when a transparent electrode is provided between the panel type light source and the transmission type optical modulation panel and electrically connected to the drive circuit of the panel type light source and the common grounding terminal of the transmission type optical modulation panel.

(Phase 5)

Considering that the provision of focusing lenses between the panel type light source and the transmission type optical modulation panel is effective for improving the efficiency of utilization of light and achieving an even distribution of brightness, gradient index lenses are arranged on the face place of the panel type light source of an image display apparatus according to the invention.

Preferably, gradient index lenses are arranged on the both sides of the face plate corresponding to respective luminous points of the phosphor layer in such a manner that the gradient index lenses located on the side close to the phosphor layer have a diameter greater that of the lenses located on the other side.

Still preferably, each of the gradient index lenses located on the outer surface of the face plate of the panel type light source is provided with a mask disposed along its periphery to prevent it from reflecting external light.

The effect of the above arrangement of this phase will be described below in greater detail by referring to a conventional panel type light source.

Figure 8:
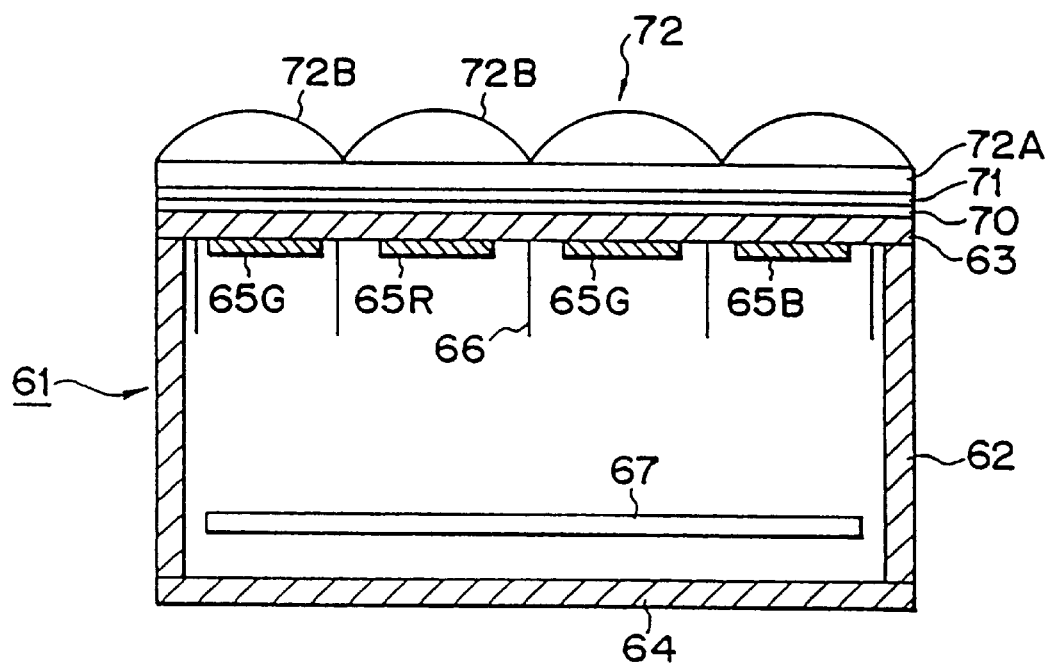
FIG. 8 is a sectional view of a conventional light source comparable to a light source realized in the fifth phase of carrying out the invention as described hereinafter.

FIG. 8 shows a sectional view of a known panel type light emitting tube to be used as a light source. Referring to FIG. 8, vacuum container 61 of a conventional panel type light emitting glass tube comprises a cylindrical side wall 62, a front panel 63 airtightly bonded to the front end of the cylindrical side wall 62 and a rear panel 64 also airtightly bonded to the rear end of the cylindrical side wall 62 so that the inside is held in a vacuum state. A number of light emitting sections (phosphor members) of three different kinds 65R, 65G and 65B are arranged on the back of the front panel 63 so as to glow red (R), green (G) and blue (B) when irradiated with electron beams.

Reference numeral 66 denotes anodes of the light emitting tube arranged in the vicinity of the respective light emitting sections 65R, 65G and 65B in order to accelerate the velocity of the electrons emitted from a line-shaped thermionic cathode 67 disposed close to the rear panel 64. Electrons emitted from the line-shaped thermionic cathode 67 are accelerated by the anodes 66 to hit and energize the light emitting sections 65R, 65G and 65B.

The light emitting tube is also provided with a filter 70 bonded to the front surface of the front panel 63 to shut out any external light and an array of focusing lenses 72 bonded to the rear surface of the filter 70 by means of a transparent adhesive agent 71 to focus rays of light coming from the front panel 63. The focusing lens array 72 comprises a base section 72A and convex lenses 72B formed on the front surface of the base section 72A integrally therewith and arranged so as to correspond to the respective light emitting sections 65R, 65G and 65B. It is realized as a unit made of acrylic resin and formed by injection molding.

With such an arrangement of the light emitting tube, since a focusing lens array 72 is provided on the front surface of the filter 70, the brightness of light emitted from the light emitting sections 65R, 65G and 65B that has been reduced by the filter 70 is once again intensified by the focusing lens array 72 to boost the display effect of the display apparatus comprising it. Additionally, since external light is forced to pass through the filter 70 twice, once when entering and once after having been reflected by the surface of the light emitting sections 65R, 65G and 65B, its intensity is remarkably reduced to improve the contrast of the proper image displayed on the apparatus.

However, with a conventional light emitting tube as described above, the focusing lens array 72 can be warped by the differentiated thermal expansions in the focusing lens array 72 due to temperature changes that can take place when it is being used. If, additionally, the focusing lens array 72 is elastically deformed by external force when it is bonded to the front panel 63 and rigidified by the transparent adhesive agent 71 without being restored to its original shape, the transparent adhesive agent 71 and the focusing lens array 72 are subjected to stress and can eventually be separated from each other. Once they are separated from each other, the brightness of the tube is remarkably reduced by the reflection of light that occurs at the interface to totally blind the colors from the viewer at any slanted angle.

Although a higher resolution of the indicator tube can be achieved by arranging a larger number of pixels per unit area at a higher pitch in the vacuum container 61 and hence reducing the size of each of the light emitting sections 65R, 65G and 65B, then the ratio of the thickness of the front panel 63 to the size of each of the light emitting sections 65R, 65G and 65B can become too large because the thickness of the front panel can not be reduced beyond a limit if the inside of the container requires to be held to a high degree of vacuum. Additionally, as the acrylic resin focusing lens array 72 is integrally formed with the front panel 63 and arranged directly on the front surface thereof, the distance separating each of the light emitting sections 65R, 65G and 65B and the corresponding one of the convex lenses 72B becomes large and only a relatively small portion of the light emitted by each of the light emitting sections 65R, 65G and 65B gets to the corresponding one of the convex lenses 72B to reduce the efficiency of the convex lenses 72B because of the existence of the base section 72A such that each of the light emitting sections 65R, 65G and 65B may be found through a convex lens 72B located next to the right one through which it should be observed, if the light emitting tube is viewed from a slanted angle.

Therefore, an object of the present invention is to solve the above identified problems by providing a panel type light source that is free from any unintended warp and/or separation of the focusing lens array and the transparent adhesive layer due to temperature changes and undesired displacement of the pixels relative to the corresponding convex lenses if the light source is viewed from a slanted angle and has a reduced distance between the convex lenses and the surface of the phosphor layer so that the light emitted from the light source may be effectively and efficiently used to produce a sharp contrast in the displayed images.

From the above Phase 5, it will be seen that the electron-emitting devices of such a light source emit electron beams once they are driven to operate and the phosphor layer irradiated by the emitted electron beams produce corresponding luminous spots. Then, the rays of light from each of the luminous spots are focused by the gradient index lenses arranged on the inside of the front member of the vacuum container to irradiate the respective pixels of transmission type optical modulation panel.

Since the gradient index lenses are arranged much closer to the light emitting surface of the luminous layer in an image display apparatus according to the invention than the convex lenses bonded to the outside of the vacuum container of a comparable conventional apparatus, the above described problem of displacement of the pixels relative to the gradient index lenses observed in a conventional apparatus that occurs when viewed from a slanted angle does not appear and the light emitted from the light source may be effectively and efficiently used to produce a sharp contrast in the displayed images. Additionally, since the gradient index lenses are formed as so many highly refractive areas in the front member of the vacuum container and hence do not accompany any adhesive agent, they are free from stress that may be generated by heat or the adhesive agent and give rise to separation of the lens array so that, once again, the light emitted from the light source may be effectively and efficiently used to produce a sharp contrast in the displayed images. If an anti-halation mask is additionally provided, it effectively eliminates any adverse effect of reflected external light to improve the contrast of the displayed images.

Finally, since tiny electron-emitting devices such as surface conduction electron-emitting devices are used as electron sources, the phosphor layer is irradiated with strong electron beams particularly at areas close to the optical axes of the gradient index lenses so that the light emitted by the phosphor layer may be effectively and efficiently used.

(Phase 6)

In this phase and in a best mode of carrying out the invention, there is provided a color image display apparatus with an even distribution of brightness comprising a transmission type optical modulation panel that drives the light valve of each pixel according to color picture signals and a panel type light source having a light emitting member contained in a single common vacuum container and carrying thereon phosphor spots each of which emits red, green or blue light when irradiated with electron beams, the pixels of said transmission type optical modulation panel being so arranged that each of them is irradiated with rays of light of a single color coming from a corresponding one of the phosphor spots.

Each of the phosphor spots is disposed vis-a-vis the light valve of the corresponding one of the pixels of the transmission type optical modulation panel and isolated from the remaining phosphor spots. Each of the phosphor spots preferably has an area smaller than that of the opening of each of the light valves of the transmission type optical modulation panel.

A plurality of cold cathode devices arranged for the apparatus are grouped for the three different colors of the phosphor spots that are irradiated with electron beams so that each group is commonly wired and driven independently from the remaining groups.

With such an arrangement, it is preferable that the conditions under which each of the groups is driven are independently regulated so that the color tone (color balance) of the entire display screen may be optimized.

The driving conditions for each of the groups are preferably regulated by modifying the amplitude or width of the pulse-shaped voltage signal applied to the devices of the group.

When a given voltage is applied to each of the electron-emitting devices of a color image display apparatus having a configuration as described above, they start emitting electron beams, which hit the corresponding phosphor spots and cause them to emit rays of light. Then, the rays of light from each of the phosphor spots directly and selectively strike the corresponding one of the pixels arranged vis-a-vis.

Thus, the apparatus does not show any loss of light energy and consequent generation of thermal energy attributable to a color filter which it does not have if compared with a comparable apparatus comprising a liquid crystal display panel and a color filter that are irradiated with rays of light emitted from a white light source (fluorescent lamp) and, therefore, it will be less energy consuming and free from the problem of deterioration of the color filter that inevitably occurs to conventional apparatuses. Additionally, since the phosphor spots are arranged in positional correspondence to the pixels of the transmission type display panel, the transmission type display panel can be illuminated by the phosphor spots with an evenly distributed intensity of light throughout the entire screen if the phosphor spots are uniformly arranged and hence optimally irradiated with electron beams. The electron-emitting devices may be irradiated intensely with rays of light when they are tightly arranged.

It should be noted that, whereas the white light source (fluorescent lamp) of a comparable conventional apparatus can not be regulated for its color tone, the phosphor spots of an apparatus according to the invention can be regulated for each color (kind) in terms of the rate of electron beam irradiation by driving the electron-emitting devices with voltages that are regulated for the pulse width or amplitude so that the color tone of the screen of the apparatus can always be optimized in a simple manner. Additionally, no bias voltage needs to be applied to the original signals being sent to the display panel to modify the color tone of the screen because it is regulated in the light source itself and hence the entire circuit configuration for processing incoming signals can be greatly simplified without adversely affecting the gradation of the display screen.

It should also be noted that, whereas the white light source of a comparable conventional apparatus does not have a color temperature of 6,500 to 7,000° C. required for a good color reproduction, a favorable color temperature can be achieved for each of the red, green and blue colors by selecting an appropriate phosphor material for it so that the apparatus can realize by far an excellent color reproducibility if compared with a conventional apparatus.

Finally, a panel type light source to be used for an image display apparatus according to the invention comprising electron-emitting devices and a phosphor layer contained in a same common vacuum container can be made very thin and consequently the apparatus can show a remarkably reduced width.

(Phase 7)

In this phase and in a best mode of carrying out the invention, there is provided a color image display apparatus with an even distribution of brightness comprising a plurality of electron-emitting devices arranged on a substrate in parallel rows, a light source constituted of the same number of phosphor spots arranged vis-a-vis the electron emitting devices to emit light upon irradiation of electron beams by the respective corresponding electron-emitting devices, said electron-emitting devices and said phosphor spots being contained in a single common panel type vacuum container, a transmission type optical modulator having a plurality of optical modulation cells arranged in parallel stripes running perpendicularly to the rows of the electron-emitting devices for modulating rays of light from said light source and drive means for driving each of said electron-emitting devices of the light source and applying modulation signals to each of the optical modulation cells of the transmission type optical modulator in synchronism with the operation of driving the corresponding electron-emitting device to form images on the display screen.

The drive means may be such that it drives the electron-emitting devices sequentially according to the arrangement of the devices. The electron-emitting devices may be arranged in an appropriate number of rows.

When the electron-emitting devices are driven sequentially in the image display apparatus having the above described configuration, they emit electron beams linearly, which hit the phosphor spots of the corresponding rows and cause them to emit light linearly that scans the corresponding stripes of optical modulation cells of the sequential transmission type optical modulator. Consequently, the optical modulation cells are driven to modulate the scanning light from the light source in synchronism with the scanning operation of the light from the light source to produce images on the screen.

As the light source is constituted of electron-emitting devices such as surface conduction electron-emitting devices and phosphor spots, it can be made very thin while it shows a remarkably uniform distribution of brightness of an enhanced degree. Since surface conduction electron-emitting devices have a simple structure, they can be arranged tightly in a simple manner to realize a large display panel and a large displaying capacity.

A transmission type optical modulator can be realized by arranging, for example, TN liquid crystal cells in stripes and, since such an arrangement does not require a XY or active matrix system, it is easy to drive such a modulator. Again, it can remarkably contribute to a large display panel and a large displaying capacity because of its structural simplicity.

Thus, an image display apparatus according to the invention and carried out in the above described mode can be made very thin and have a large display screen with an evenly distributed brightness and a large capacity.

(Phase 8)

In this phase and in a best mode of carrying out the invention where the invention is applied to a projection type display apparatus, there is provided a light source to be used for a projection type color image display apparatus comprising, in a panel type vacuum container, liquid crystal light valves, said light source comprising a number of electron-emitting devices arranged in correspondence to the positional arrangement of the liquid crystal light valves, said number being equal to or greater than that of the liquid crystal light valves, a phosphor body arranged to produce luminous spots thereon in correspondence to the positional arrangement of the liquid crystal light valves for emitting red, green or blue light independently upon irradiation of electron beams by the respective electron emitting devices and interference filters adapted to the wavelengths of the rays of light of the respective luminous spots for limiting the angle of emission of light of each luminous spot so as for a flux of light to be projected onto a corresponding liquid crystal light valve independently.

Preferably, an electron beam focusing lens may be arranged between each of the electron-emitting devices and the corresponding spot of the phosphor body or an optical guide path may be arranged between each of the luminous spots produced on the phosphor body and the corresponding liquid crystal light valve.

When the electron-emitting devices are driven sequentially in the image display apparatus having the above described configuration, they emit electron beams, which hit the phosphor body. Since the electron-emitting devices are arranged in positional correspondence to the respective liquid crystal light valves, the electron beams emitted from each electron-emitting device are focused to a spot on the phosphor body that positionally corresponds to the opening of the related liquid crystal light valve so that the phosphor body produces a luminous spot there. Each of the luminous spots on the phosphor body is limited for the angle of emission of light so as for a flux of light to be projected onto the corresponding liquid crystal valve independently.

With such an arrangement of the light source, since the opening of each liquid crystal light valve is effectively irradiated with light and electron-emitting devices having a simple structure and hence capable of being remarkably down-sized without adversely affecting the performance such as surface conduction electron-emitting devices are comprised, it can make a very flat cathode luminescence light source, which is free from the problem of uneven distribution of brightness that accompanies any existing light sources so that it satisfies a number of requirements for a monochromatic light source to be used for a color projection type image display apparatus, including an enhanced brightness, a high efficiency, an evenly distributed brightness, a high color purity and reduced dimensions.

When electron beam focusing lenses are provided, the luminous spots of the phosphor body may be made smaller and brighter. When optical guide paths are arranged, irradiated rays of light hit the liquid crystal light valves so effectively that the above identified requirements may be met much more satisfactorily.

While the present invention is described in terms of different phases of realization and some of the best modes of carrying out the invention are introduced above, they may be modified and combined without departing from the scope of the invention.

For instance, different optical means that can be arranged between the panel type light source and the light valves of the transmission type optical modulation panel are described above, they may be combined appropriately if such a combination improves the uniform distribution of brightness of the display screen.

It may be needless to say that the present invention is applicable to both direct viewing type and projection type image display apparatuses.

Embodiment 1

Figure 9:
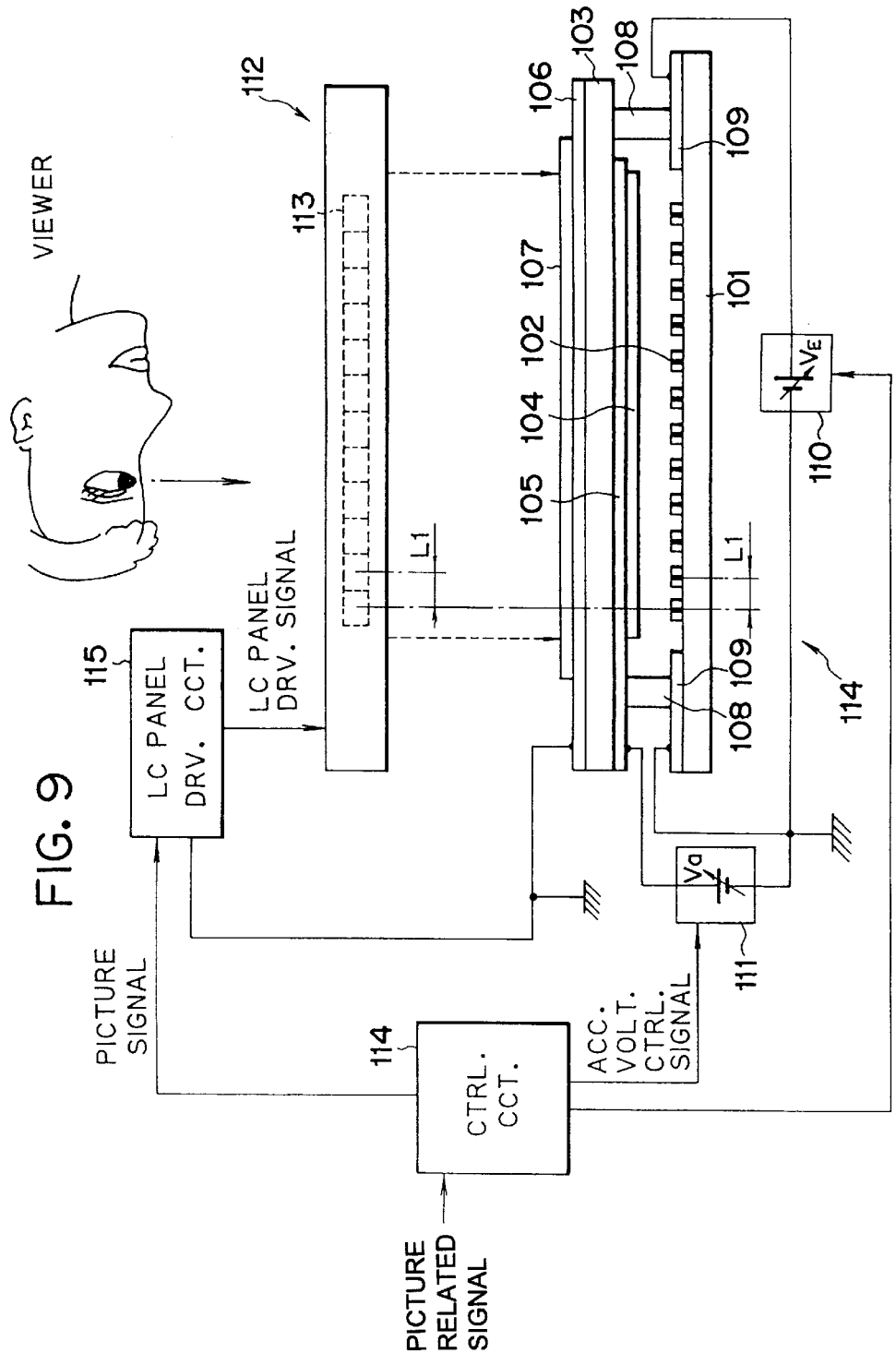
FIG. 9 is a schematic block diagram of a first embodiment of the invention, which is a direct viewing type image display apparatus.

Now, the present invention will be described by referring to the accompanying drawings that illustrate preferred embodiments of the invention. FIG. 9 is a sectional view of a first embodiment of an image display apparatus according to the invention, showing some of the electric connections at the same time. It comprises a glass substrate 101 constituting the rear panel of a light source, a number of surface conduction electron-emitting devices 102 arranged in rows separated from adjacent rows by distance L1 (or 600 $\mu$m for this embodiment), another glass substrate 103 arranged opposite to the substrate 101 and constituting the upper panel of the light source, a phosphor layer 104 disposed on the substrate 103 for emitting rays of visible light when irradiated with electron rays from the electron-emitting devices 102, an accelerating electrode 105 made of a conductive material such as transparent ITO and arranged on the lower surface of the substrate 103 for accelerating electron rays, a transparent shield electrode 106 arranged close to the transmission type liquid crystal display panel on the substrate 103 to fend electric noises away from the transmission type liquid crystal display panel, a light diffuser plate 107 for scattering rays of light emitted from the phosphor layer 104, a pair of glass plates 108, 108 constituting side panels of the illumination light source, a pair of distribution electrodes 109, 109 for feeding the electron-emitting devices 102, electron-emitting device driving power source 110 for driving the electron-emitting devices 102 and an accelerating voltage supplying power source 111 for applying voltage Va to the accelerating electrode 105. Basically, an illumination light source 114 is constituted of the components 101 through 111. A vacuum container is composed of the glass substrates 101 and 103 and the glass panels 108, 108 and the inside of the container is held to a vacuum of less than $10^{-5}$ Torr.

In FIG. 9, reference numeral 112 denotes a transmission type liquid crystal display panel and 113 denotes part of the pixels of the liquid crystal cells of the panel. Adjacent pixels are separated from each other by distance L1. The shield electrode 106 is grounded commonly with a liquid crystal panel drive circuit 115 and the illumination light source.

Reference numeral 114 denotes a control circuit for controlling the operation of each component of the illumination light source according to a picture related external signals. As described above, 115 denotes the liquid crystal drive circuit.

Figure 10:
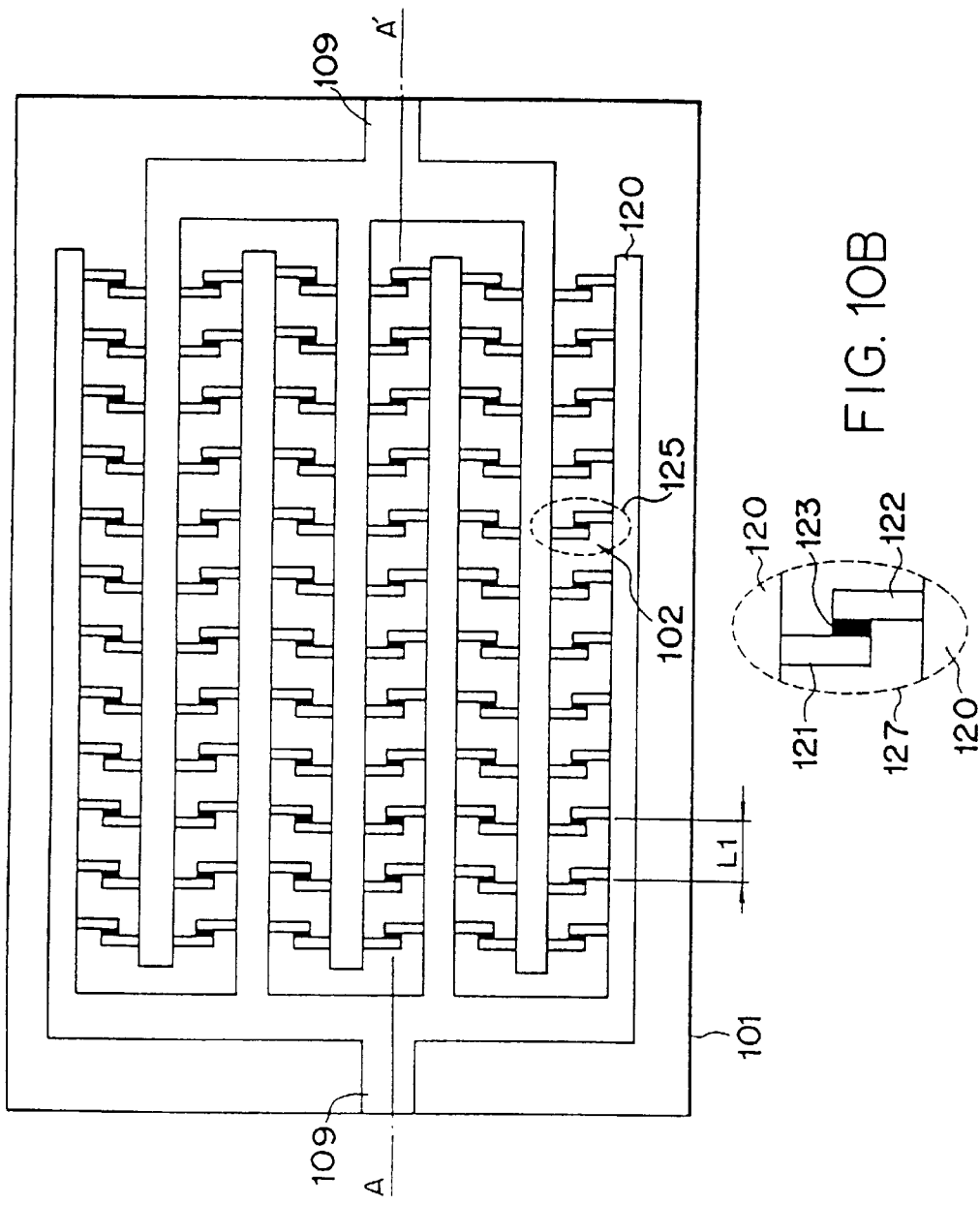
FIG. 10 is a plan view of the electron beam source of the first embodiment of FIG. 9.

FIG. 10 is a plan view of the substrate 101. Note that the view of the substrate 101 in FIG. 9 is taken along line A–A' of FIG. 10. In FIG. 10, a single surface conduction electron-emitting device 102 in a smaller dotted circle 125 is shown in enlarged dimensions in a larger dotted circle indicated by numeral 127. The electron-emitting device 102 comprises electrodes 121 and 122 and an electron-emitting region 123 disposed between the electrodes. The electron-emitting devices 102 are then connected to a pair of distribution electrodes 120 and 120 in parallel. Note that the surface conduction electron-emitting devices 102 are shown schematically in a simplified manner in FIG. 10, they do not necessarily have a flat profile as illustrated there. The distance separating the electrodes 121 and 122 is between 0.1 and 100 $\mu$m and the electron-emitting region 123 is realized in the form of a thin film containing very fine particles and having an electric resistance between $10^3$ and $10^9$ $\Omega/\square$. While seventy two (12×6=72) electron-emitting devices 102 are shown in FIG. 10, a number of devices by far much greater than that may be accommodated in a single apparatus of the type under consideration.

Referring to FIG. 9, the electron-emitting devices 102 can be electrically energized and driven to operate by connecting the distribution electrodes 109, 109 to a power source 110. When, for example, a voltage of 14 V is applied by the power source 110 to the distribution electrodes 109, 109, all the electron-emitting devices 102 emit electron beams because they are connected in parallel as shown in FIG. 10. At the same time, voltage Va is applied to the accelerating electrode 105 by the accelerating voltage supplying power source 111 to accelerate the emitted electron beams to head for and eventually hit the phosphor layer 104. The level of the voltage Va is determined as a function of the material of the phosphor layer 104, although approximately 4 KV may be appropriate for the voltage Va if popular P-22 is used for the phosphor layer.

As electron beams are emitted from a small area of each of the electron-emitting devices 102, correspondingly small luminous spots are formed on the phosphor layer 104 by the electron beams that strike the layer. However, then the rays of light emitted from each luminous spot are diffused by the light diffuser plate 107 so that the display panel 112 may be evenly and uniformly illuminated. While the illumination light source 114 and the transmission type liquid crystal display panel 112 are shown as if they were separated from each other in FIG. 9 for simplification, they are actually located close to each other so that the luminous spots are located directly under the respective pixels 113 of the liquid crystal display panel. Thus, each of the electron-emitting devices 102, the corresponding luminous spot and the corresponding pixel 113 of the liquid crystal panel 112 are vertically aligned.

The transparent shield electrode 106 arranged on the glass substrate 103 is connected to the grounding terminal of the transmission type liquid crystal display panel 112 so that the drive and accelerating voltages of the electron-emitting devices 102 may not adversely affect the operation of the liquid crystal display panel 112.

The peak level of the brightness of the displayed image of the embodiment can be easily regulated by controlling the brightness of the illumination light source. This scheme will be described below.

The control circuit 114 appropriately picks up picture signals out of the picture related signals entering the apparatus from outside and sends them to the liquid crystal panel drive circuit 115. The liquid crystal panel drive circuit, on its out part, sends out liquid crystal panel drive signals to the liquid crystal display panel 112.

Once the apparatus starts displaying images, the control circuit 114 also transmits control signals to the electron-emitting device driving power source 110 and the accelerating voltage supplying power source 111 so that appropriate voltages may be applied by them.

Thus, while the apparatus displays images in accordance with the incoming picture related signals, the viewer may modify at will the peak brightness of the current image on the display screen simply and quickly by controlling the output level of the electron-emitting devices or the accelerating voltage Va to make the brightness meet the viewer's taste and/or the lighting conditions of the surroundings.

The output level of the electron-emitting devices can be modified either by modifying the peak level of the pulse-shaped output voltage of the electron-emitting device driving power source or by controlling the width of the pulse-shaped voltage being applied to the electron emitting-devices if a pulse voltage generator is used for the electron-emitting device driving power source.

Note that, while the shield electrode and the light diffuser plate 107 are sequentially laid on the glass substrate 103 to produce a multilayer structure in this embodiment, alternatively they may be laid in the opposite order or, still alternatively, they may be laid on the bottom plate of the transmission type liquid crystal display panel. The basic requirement to be met there is that means for diffusing light and transparent electric shield means are arranged between the phosphor layer and the liquid crystal display cells.

With an arrangement as described above, the thickness of the illumination light source 114 (from the glass substrate 101 to the light diffuser plate 107) may be reduced to, for example, less than 8 mm to obtain an average brightness of more than 5,000 cd/cm$^2$ on the surface of the light diffuser plate 107 without difficulty.

Figure 11:
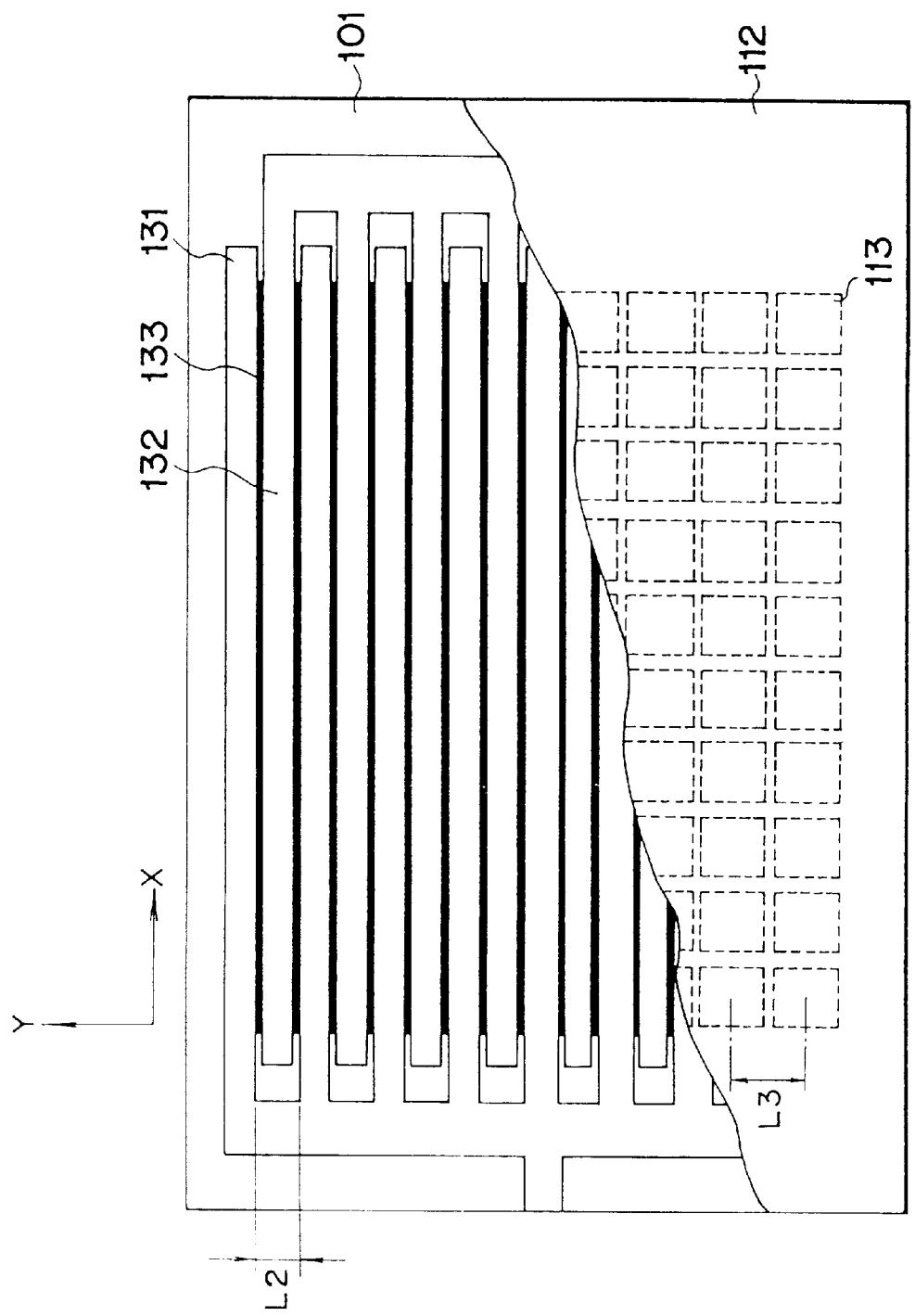
FIG. 11 is a partially torn off plan view of an image display apparatus obtained by modifying the first embodiment of FIG. 10

FIG. 11 is a partially torn off plan view of an image display apparatus obtained by modifying the first embodiment of FIG. 10, illustrating the inside structure of the apparatus. It may be noted that the transmission type liquid crystal panel and the illumination light source are partly torn off at an upper portion thereof so that the glass substrate and the electron-emitting devices arranged thereon are partly visible, whereas the display surface of the transmission type liquid crystal display panel is partly shown at a lower portion. As seen in FIG. 11, the apparatus comprises a substrate 101, on which electron-emitting devices are arranged, and a transmission type liquid crystal display panel 112. Reference numeral 113 denotes each of the pixels of the transmission type liquid crystal display panel. While surface conduction electron-emitting devices are used for the electron-emitting devices of this modified embodiment, these devices have a stripe-shaped oblong electron-emitting region 133 unlike the original embodiment. More specifically, a number of pairs of electrodes 131 and 132 are arranged in parallel in an alternating manner to form a comb-shaped electrode unit and a thin film containing very fine particles of an electron-emitting substance is formed between each pair of electrodes to make an electron-emitting region 133.

As seen in FIG. 11, the pixels 113 of the liquid crystal panel are arranged two-dimensionally to form a matrix having rows and columns extending respectively along the X- and Y-axes of an imaginary coordinate system shown there and the stripe-shaped electron-emitting devices are arranged in such a way that the oblong electron-emitting regions 133 thereof extend in parallel with the X-axis. While the rows of pixels 113 of the liquid crystal panel are horizontally arranged with a pitch of L3 along the Y-axis, the stripe-shaped electron-emitting devices are horizontally arranged with another pitch of L2 along the Y-axis. In this embodiment, each pixel is functionally covered by a pair of adjacently arranged stripe-shaped electron-emitting devices by defining a relationship L3=2×L2.

The above described modified embodiment has a configuration which is otherwise similar to that of the original embodiment. Thus, it will show a sectional view as shown in FIG. 9 except that the electron-emitting devices are differently arranged.

While a relationship L3=n×L2, where n=2, is defined for the above embodiment, n is not necessarily limited to 2 so long as the pixels 113 of the liquid crystal panel and the electron-emitting devices are arranged to show an unequivocally unique relationship so that no uneven distribution of brightness may take place. Therefore, n may be an integer equal to or greater than 3 or it may alternatively be a fractional number expressed by 1/P (where P is a positive integer).

As described above, since a highly luminous and thin panel type back light source can be prepared according to the invention, a thin image display apparatus can be provided with an excellent degree of brightness by combining such a back light source and a transmission type liquid crystal panel.

Then, the liquid crystal panel can show a highly even and uniform distribution of brightness by establishing a constant positional relationship between the pixels of the liquid crystal panel and the electron emitting devices.

Finally, the peak level of the brightness of the displayed image can be easily regulated by controlling either the amplitude or width of the pulse-shaped voltage applied to the cold cathode devices of the light source or the level of the accelerating voltage applied to the phosphor layer.

Embodiment 2

Figure 12:
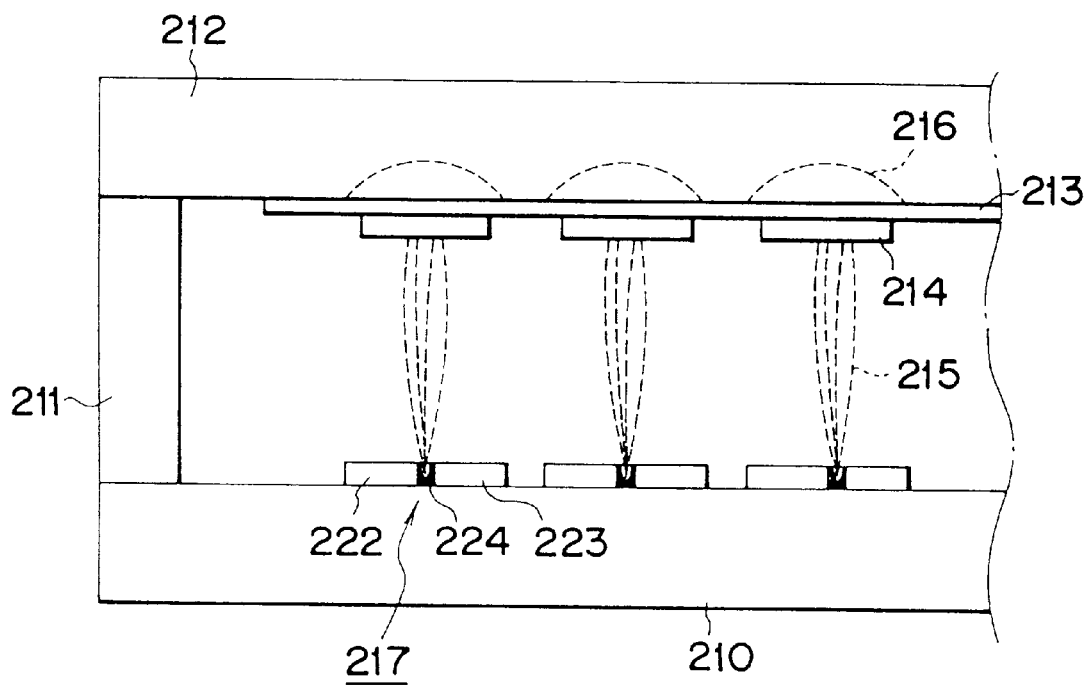
FIG. 12 is a sectional partial view of the panel type light source of a second embodiment of the invention.

FIG. 12 is a sectional partial view of the panel type light source of a second embodiment of the invention. Referring to FIG. 12, the light source comprises a rear panel 210, a side panel 211 and a front panel 212, which are made of glass and constitute members of a vacuum container, the inside of which is held to a vacuum of less than 10$^{-5}$ Torr.

A number of electron-emitting devices 217 are arranged on the rear panel 210, each comprising an electrode 222, an electrode 223 and an electron-emitting region 224 disposed between the electrodes. Each of the electron-emitting devices 217 emits electron beams from the electron-emitting region 224 when an appropriate voltage is applied between the electrodes 222 and 223. Reference numeral 215 denotes tracks of electron beams.

A transparent electrode 213 is made of a conductive material such as ITO and arranged on the back side of the front panel 212 and a number of phosphor spots 214 are laid on the transparent electrode 213. As a voltage as high as 2 KV is applied to the transparent electrode 213 to accelerate the electron beams emitted from the electron-emitting devices 217, they follow the respective tracks while accumulating therein energy sufficient to energize and cause the respective phosphor spots 214 to emit light. If appropriate, a metal back layer of a type known in the technological field of CRTs may be fitted to the surface of each of the phosphor spots 214.

Reference numeral 216 denotes gradient index lenses (areas defined by dotted lines on the front panel 212 in FIG. 12) having a refractive index greater than that of the material of the front panel. How the lenses are produced will be described hereinafter.

Each of the electron-emitting devices 217 and the corresponding phosphor spot 214 and gradient index lens 216 are aligned. Thus, the electron beams emitted from the small electron-emitting region 224 of an electron-emitting device 217 strike a surface area of the corresponding phosphor spot 214 covering the center and its vicinity of the spot so that the area is energized and strongly emits light. The phosphor spot 214 and the corresponding refractive index distribution type lens 216 may be arranged very close to each other. Most of the rays of light emitted from the phosphor spot 214 may be made to pass through the gradient index lens 216 by selecting an appropriate value for the diameter of the lens 216. Thus, this embodiment can make use of light much more efficiently than any existing comparable apparatuses.

The electron-emitting devices 217 are surface conduction electron-emitting devices that operate excellently for electron beam emission despite of the relatively simple structure. A surface conduction electron-emitting device can be realized by forming a pair of thin film electrodes separated from each other by an appropriate distance on a substrate and arranging an electron-emitting region that contains very fine particles between the electrodes.

Figure 13A:
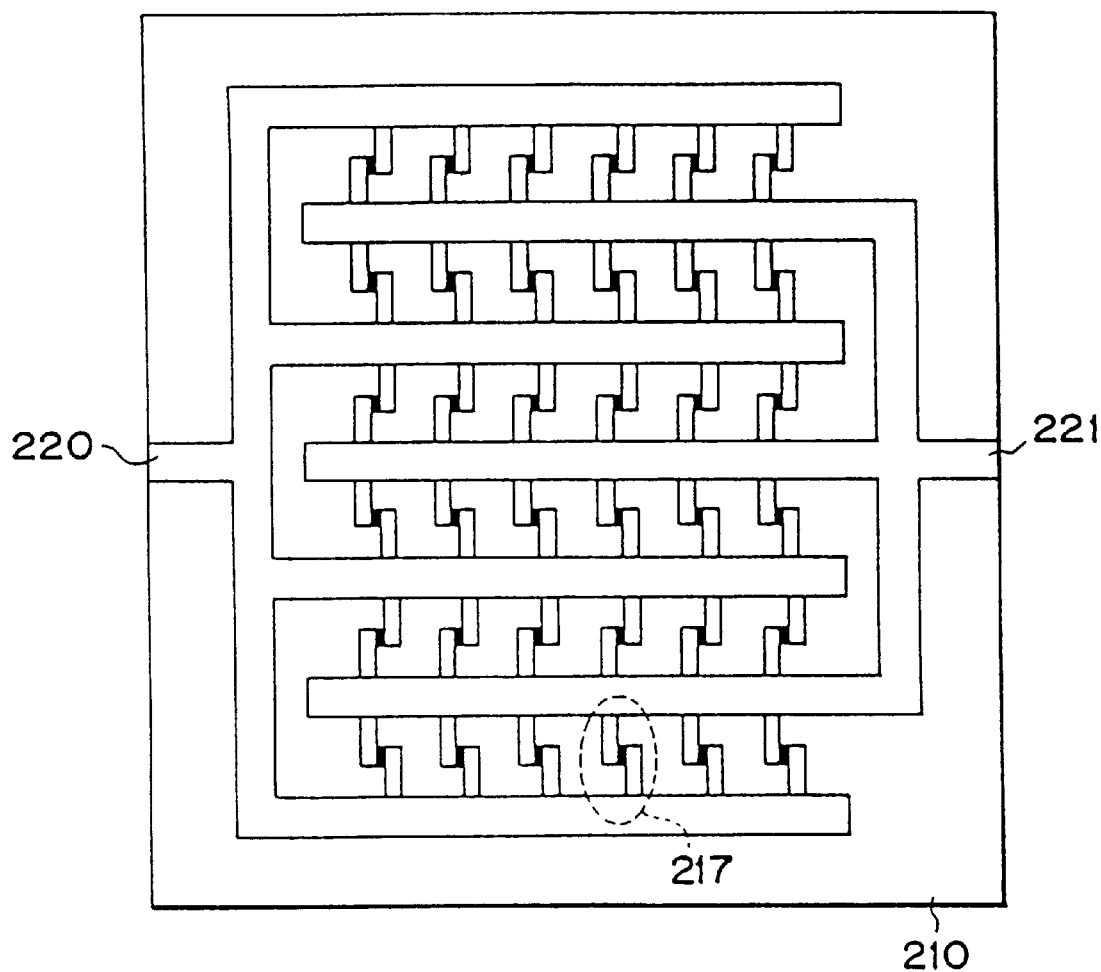
FIG. 13 is a plan view of the electron beam source comprised in the panel type light source of the second embodiment of FIG. 12.
Figure 13B:
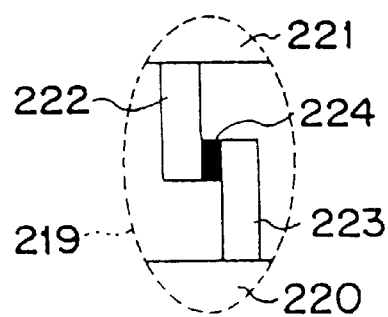

FIG. 13 is a plan view of the electron beam source of the embodiment of FIG. 12, showing how the electron-emitting devices 217 are arranged on the glass substrate 210. In FIG. 13, reference numeral 220 and 221 denote a pair of distribution electrodes for feeding the electron-emitting devices with electricity. The electrodes are connected in parallel to the electron-emitting devices. A single surface conduction electron-emitting device 217 in a smaller dotted ellipse is shown in enlarged dimensions in a larger dotted ellipse indicated by numeral 219 in FIG. 13, said device 217 comprising an electrode 222, an electrode 223 and an electron-emitting region 224. The electrodes 222 and 223 may be formed typically from a nickel (Ni) thin film by photolithography etching, while precisely controlling their positions and profile. The distance separating the electrodes 222 and 223 is preferably between 0.01 and 100 $\mu$m and an electron-emitting region 224 is prepared to fill the gap therebetween by forming a thin film containing very fine particles of an appropriate material such as palladium (Pd). The electron-emitting region 224 is preferably a thin film having an electric resistance between $10^3$ and $10^9$ $\Omega/\square$ in term of its electron beam emitting performance.

While the electrodes 222 and 223 and the electron-emitting region 224 have a rectangular plan view, they may alternatively be formed to show a different profile.

FIGS. 14A through 14D are schematic sectional views of the gradient index lenses 216 formed on the front panel 212 and comprised in the panel type light source of the second embodiment, showing different manufacturing steps thereof. Firstly, a glass substrate 212 containing alkali metal ions is prepared as a principal component and its surfaces are thoroughly cleansed.

Figure 14A:
FIGS. 14A through 14D are schematic side views of gradient index lenses comprised in the panel type light source of the second embodiment, showing different manufacturing steps thereof.
Figure 14B:
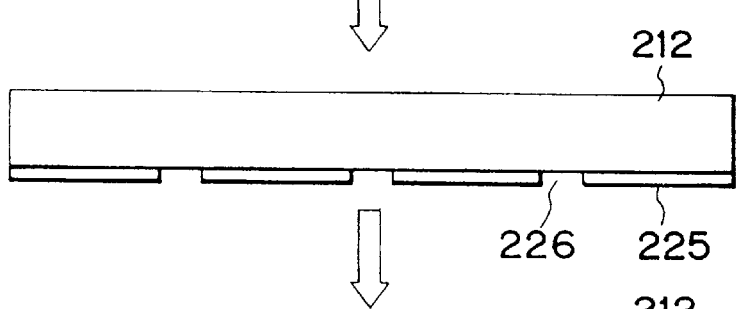
Figure 14C:
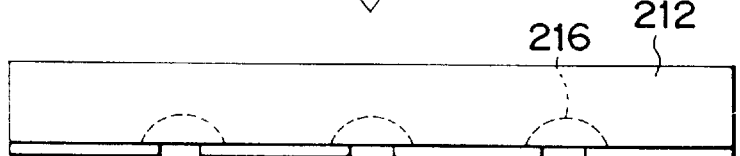
Figure 14D:
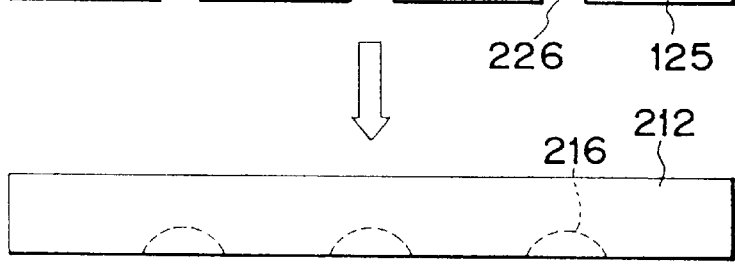

Then, as shown in FIG. 14B, a mask 225 is formed of a thin film which is typically made of titanium (Ti). Note that the mask 225 has openings 226 that are aligned with the respective electron-emitting devices to be formed.

Thereafter, a molten salt is caused to contact with the substrate from the side where the thin film mask 225 is arranged so that thallium ions are diffused into the substrate through the mask openings 226 to produce high refractive index regions 216 in the substrate. The molten salt contains $Tl_2SO_4$, $ZnSO_4$ and $K_2SO_4$ to appropriate concentrations.

Finally, desired gradient index lenses 216 are produced when the thin film mask 225 is removed.

Figure 15:
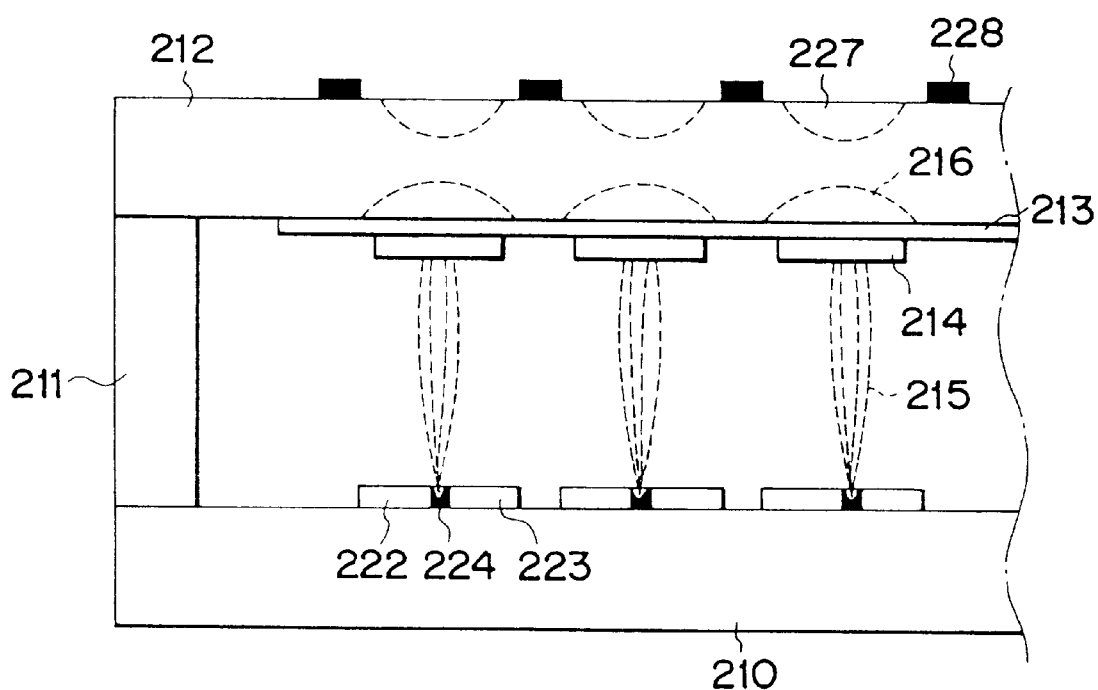
FIG. 15 is a sectional partial view of a panel type light source obtained by modifying that of FIG. 12.

FIG. 15 is a sectional partial view of a panel type luminous tube obtained by modifying that of FIG. 12. This luminous tube differs from that of FIG. 12 in that it additionally comprises gradient index lenses 227 formed on the light emitting surface (outer side) of the front panel 212 and anti-halation masks 228 are provided on the light emitting surface. Each of the gradient index lenses 227 is precisely aligned with the corresponding ones of the electron-emitting regions 224, the phosphor spots 214 and the gradient index lenses 216. The gradient index lenses 227 have a diameter smaller than that of the gradient index lenses 216. With such an arrangement, the gradient index lenses 227 can effectively catch the emitted light owing to the focusing effect of the gradient index lenses 216 if they have a small diameter and allow the anti-halation masks 228 to be arranged in the areas spared by the smaller diameter lenses. The anti-halation masks 228 are typically formed by simply applying black paint to appropriate spots.

With a luminous tube having a configuration as described above, rays of light are focused in two stages by the two-tier lens system of the gradient index lenses 216 and 227 to enhance the focusing effect of the tube. Additionally, the anti-halation masks 228 effectively eliminate undesired external reflections of light to improve the contrast of the displayed image.

When a transmission type optical modulation panel such as a liquid crystal panel is illuminated from behind by a panel type light source as described above, the focused rays of light can be effectively made to enter the liquid crystal panel through the openings. Thus, an image display apparatus comprising such a panel and a light source will show a remarkably improved efficiency in the use of light and hence an enhanced reliability when compared with display apparatuses utilizing a conventional light source that comprises convex lenses.

Electron-emitting devices to be used for the purpose of the present invention are not limited to surface conduction electron-emitting devices of the above described type and may alternatively be cold cathode devices using printed emitters such as proposed by Spindt of the SRI Laboratory in "J. Appl. Phys." 39, (1968), 3504, or MIM-type cold cathode devices. Still alternatively, they may be cold cathode devices comprising PN junctions as disclosed in Japanese Patent Publication No. 56-15529. What is essential here is that such devices operate excellently in emitting electrons and can be down-sized and arranged in arrays with an enhanced level of precision.

Embodiment 3 (Embodiments 3-1 through 3-5)
(Embodiment 3-1)

Figure 16:
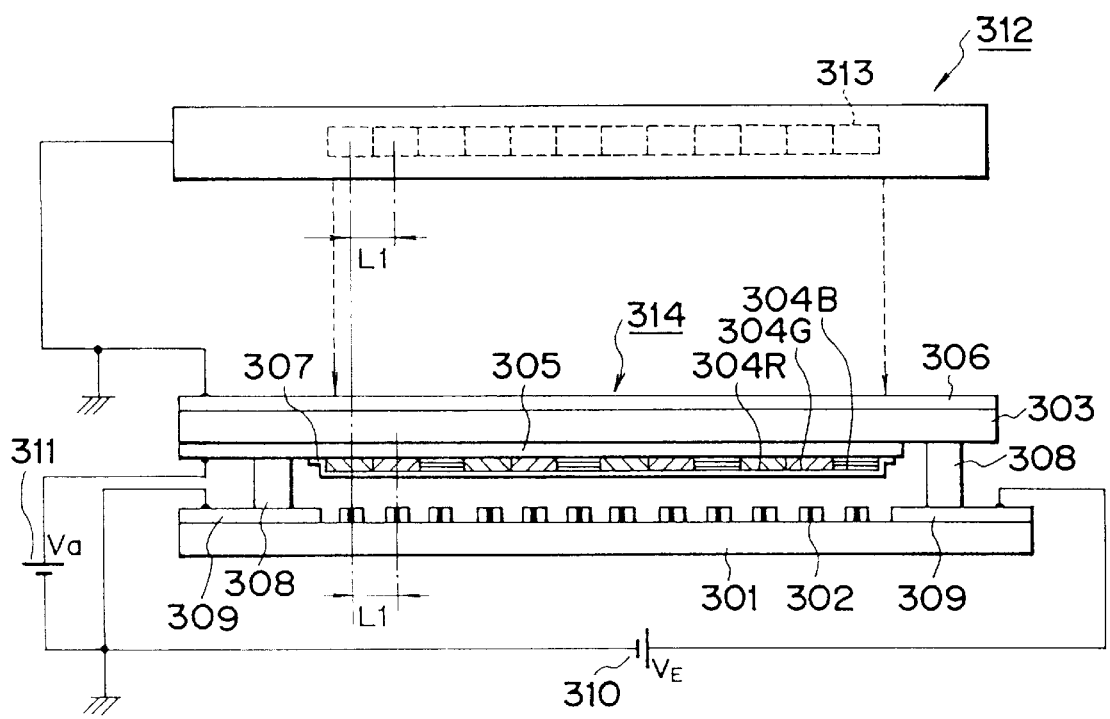
FIG. 16 is a sectional view of a third embodiment of the invention, which is a color image display apparatus.

FIG. 16 is a sectional view of a third embodiment of the invention, which is a color image display apparatus, showing part of its electric connections. Referring to FIG. 16, the apparatus comprises a glass substrate 301 constituting the rear panel of an illumination light source, a number of surface conduction electron-emitting devices 302 arranged in rows separated from adjacent ones by distance L1 (or 600 μm for this embodiment), another glass substrate 303 arranged opposite to the substrate 301 and constituting the upper panel of the light source, phosphor spots 304R, 304G and 304B arranged on the substrate 303 for respectively emitting red, green and blue lights upon irradiation of electron rays, accelerating electrode 305 made of a conductive material such as transparent ITO and arranged on the lower surface of the substrate 303 for accelerating electron rays, a transparent shield electrode 306 arranged close to the transmission type liquid crystal display panel on the substrate 303 to fend electric noises away from the transmission type liquid crystal display panel, a metal back 307 for reflecting rays of light emitted from the phosphor spots 304R, 304G and 304B, a pair of glass plates 308, 308 constituting side panels of the illumination light source, a pair of distribution electrodes 309, 309 for feeding the electron-emitting devices 302, electron-emitting device driving power source 310 for driving the electron-emitting devices 302 and an accelerating voltage supplying power source 311 for applying voltage Va to the accelerating electrode 305. Basically, an illumination light source 314 is constituted of the components 301 through 311. A vacuum container is composed of the glass substrates 301 and 303 and the glass panels 308, 308 and the inside of the container is held to a vacuum of less than $10^{-5}$ Torr.

In FIG. 16, reference numeral 312 denotes a transmission type liquid crystal display panel and 313 denotes part of the pixels of the liquid crystal cells of the panel. Adjacent pixels are separated from each other by distance L1. The shield electrode 306 is grounded commonly with the liquid crystal display panel 312.

Figure 17:
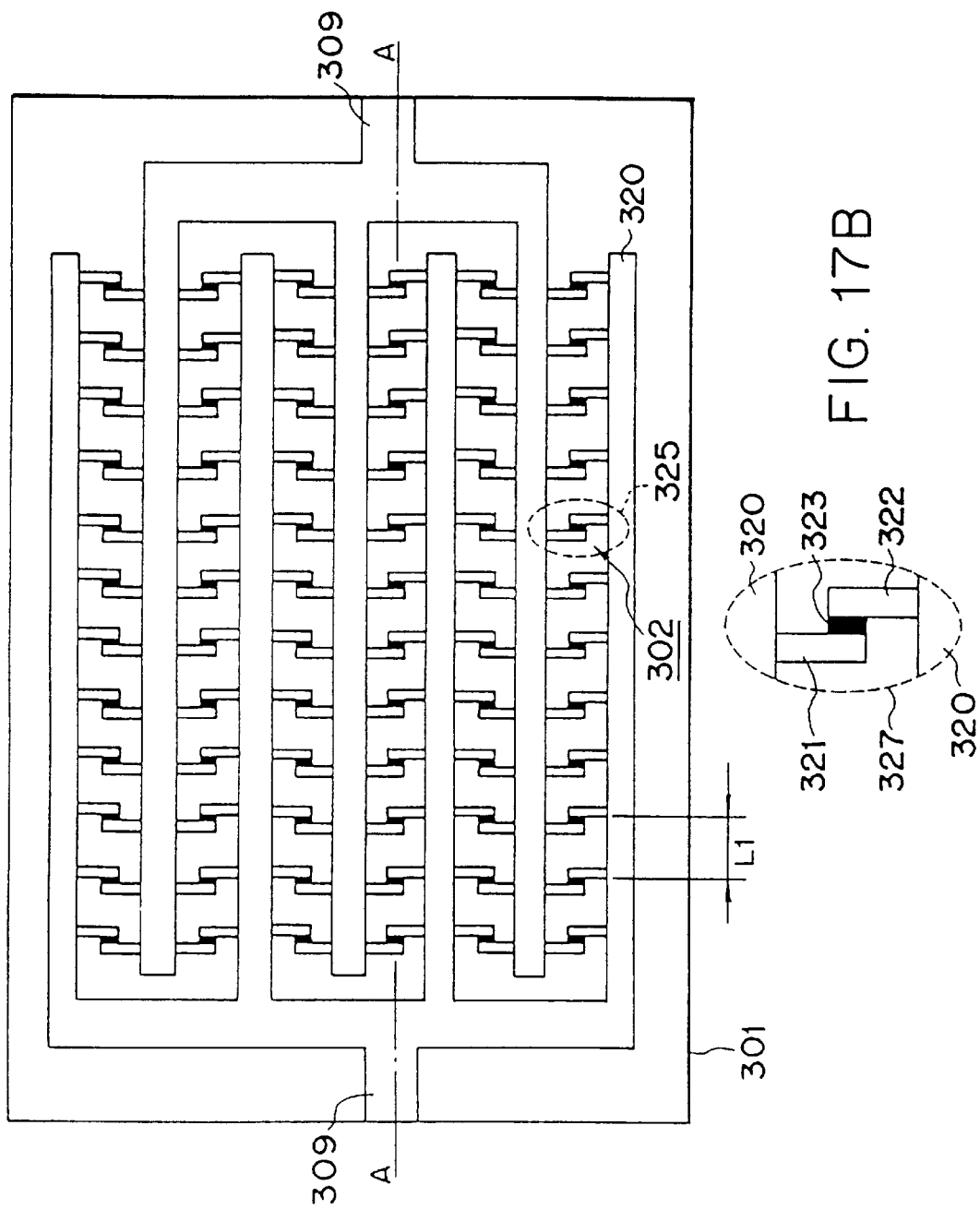
FIG. 17 is a plan view of the electron beam source comprised in the panel type light source of the color image display apparatus of FIG. 16.

FIG. 17 is a plan view of the substrate 301. Note that the view of the substrate 301 in FIG. 16 is taken along line A–A' of FIG. 17. In FIG. 17, a single surface conduction electron-emitting device 302 in a smaller dotted ellipse 325 is shown in enlarged dimensions in a larger dotted ellipse indicated by numeral 327. The electron-emitting device 302 comprises electrodes 321 and 322 and an electron-emitting region 323 disposed between the electrodes. The electron-emitting devices 302 are then connected to a pair of distribution electrodes 320 and 320 in parallel. Note that the surface conduction electron-emitting devices 302 are shown schematically in a simplified manner in FIG. 17, they do not necessarily have a flat profile as illustrated there. The distance separating the electrodes 321 and 322 is between 0.1 and 100 μm and the electron-emitting region 323 is realized in the form of a thin film containing very fine particles and having an electric resistance between $10^3$ and $10^9$ Ω/□. While seventy two (12×6=72) electron-emitting devices 302 302 are shown in FIG. 17, a number of devices by far much greater than that may be accommodated in a single apparatus of the type under consideration.

Referring to FIG. 16, the electron-emitting devices 302 can be electrically energized and driven to operate by connecting the distribution electrodes 309, 309 to a power source 310. When, for example, a voltage of 14 V is applied by the power source 310 to the distribution electrodes 309, 309, all the electron-emitting device 302 emit electron beams because they are connected in parallel as shown in FIG. 17. At the same time, voltage Va is applied to the accelerating electrode 305 by the accelerating voltage supplying power source 311 to accelerate the emitted electron beams to head for and eventually hit the phosphor spots 304R, 304G and 304B to make them emit rays of light. The level of the voltage Va is determined as a function of the material of the phosphor layer 104, although approximately 7 KV may be appropriate for the voltage Va. Under this condition, the phosphor spots is influenced by the metal back 307 so that they emit rays of light to brightly illuminate the transmission type liquid crystal panel 312.

While the illumination light source 314 and the transmission type liquid crystal display panel 312 are shown as if they are separated from each other in FIG. 16 for simplification, they are actually located close to each other in such a way that the pixels 313 of the transmission type liquid crystal panel are precisely aligned with the respective corresponding phosphor spots 304R, 304G and 304B of the illumination light source 314 so that the pixels 313 are efficiently irradiated with rays of light emitted from the phosphor spots 304R, 304G and 304B.

Thus, the pixels 313 of the transmission type liquid crystal panel 312 irradiated with rays of light from the illumination light source 314 are driven for red, green and blue to display color images.

An apparatus having a configuration as described above can be made very thin and display bright images in a stable manner with a reduced level of energy consumption and heat generation and without any uneven distribution of brightness on the screen when compared with any comparable conventional apparatuses.

Figure 18:
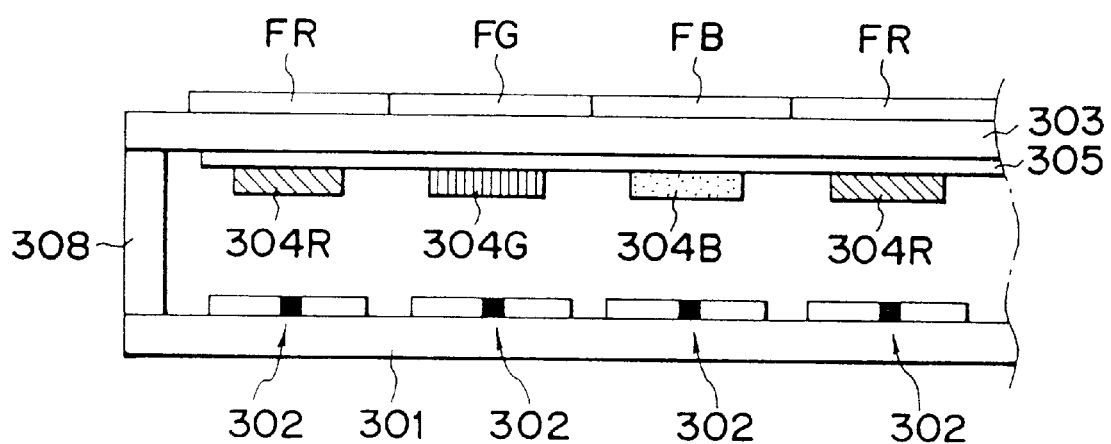
FIG. 18 is a sectional partial view of a panel type light source obtained by modifying that of the color image display apparatus of FIG. 16

The above embodiment may be additionally provided with color filters on the face plate of the panel type light source. FIG. 18 shows a possible arrangement of red, green and blue color filters FR, FG and FB for respective red, green and blue phosphor spots.

By arranging color filters, the chromatic reproducibility of the apparatus for displayed images can be remarkably improved because of an improved color purity of irradiated rays of light due to the filters. As the emission spectrum of the phosphor spots of each of the three colors is not noticeably deviated from the transmission spectrum of the color filters of that color, the loss of brightness that can be brought forth by the color filters is negligible and the filters hardly generate heat.

(Embodiment 3-2)

Figure 19:
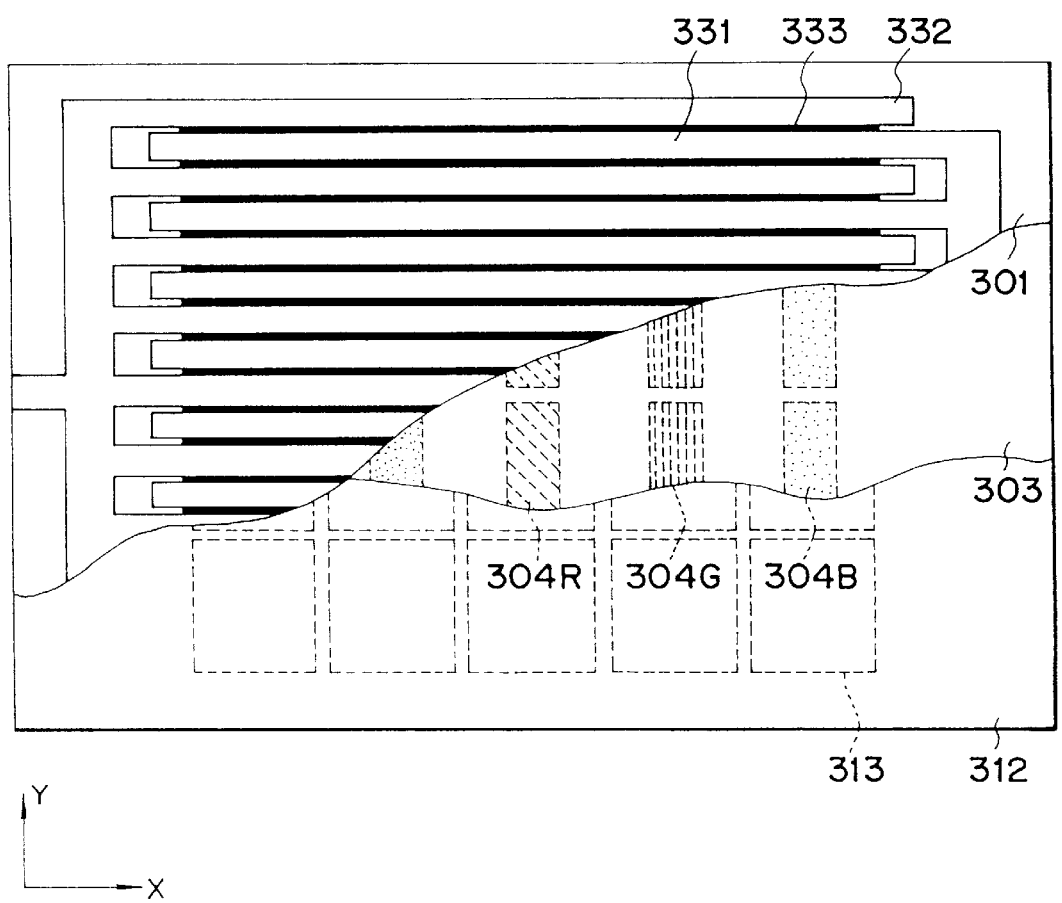
FIG. 19 is a partially torn off plan view of the third embodiment of the invention or the color image display apparatus of FIG. 16.

FIG. 19 is a partially torn off plan view of another embodiment of image display apparatus similar to Embodiment 3-1 shown in FIG. 16, illustrating the inside structure of the apparatus. It may be noted that both the transmission type liquid crystal panel 312 and the upper glass plate (glass substrate 303) of the illumination light source are partly torn off at an upperleft portion thereof so that the glass substrate 301 and the electron-emitting devices arranged thereon are partly visible. On the other hand, only the transmission type liquid crystal panel 312 is torn off at a center right potion to show part of the upper glass plate 303 of the illumination light source and some of phosphor columns 304R, 304G and 304B formed by applying a phosphor material on the lower surface of the glass plate. The proper display surface of the transmission type liquid crystal panel 312 is shown only by one-third of the entire surface area in a lower section of FIG. 19, where pixels 313 are drawn by broken lines.

As seen in FIG. 19, while surface conduction electron-emitting devices are used for the electron-emitting devices of this modified embodiment and arranged on the glass substrate 301, these devices have a strip-shaped oblong electron-emitting region 333 unlike Embodiment 3-1. More specifically, a number of pairs of electrodes 331 and 332 are arranged in parallel in an alternating manner on the glass substrate 301 to form a comb-shaped electrode unit and a thin film containing very fine particles of an electron-emitting substance is formed between each pair of electrodes to make an electron-emitting region 333. The phosphor columns 304R, 304G and 304B are arranged along the Y-axis in FIG. 19, the columns having a width smaller than that of the pixels 313. Each of the columns is divided into four sections, each of which covers four strip-shaped oblong electron-emitting regions. Thus, each section of the phosphor columns 304R, 304G and 304B is irradiated with electron beams emitted from four strip-shaped electron-emitting devices.

Thus, the above embodiment differs from Embodiment 301 in terms of the size of the phosphor members (spots or columns) relative to that of the pixels and the profile of the electron-emitting devices, it has a configuration which is otherwise similar to that of Embodiment 3-1 and hence it shows a sectional view similar to that of FIG. 16.

When phosphor is irradiated locally and intensely with electron beams, the light emitting area of the phosphor normally expands from the area directly hit by the electron beams because of the effect of secondary electrons and that of light diffusion by phosphor itself. With the above embodiment, however, no such phenomenon occurs since the phosphor columns are dimensionally smaller than the pixels of the liquid crystal and, therefore, the latter are not affected by rays of light emitted from phosphor columns other than the ones corresponding to them. In view of the fact that the picture quality of the display apparatus can be degraded when rays of light emitted from any particular spot of the phosphor layer of the apparatus go astray to affect the pixels neighboring the corresponding one particularly along the X-axis, the phosphor columns are made to have a width significantly smaller than that of the pixels.

Since each section of the phosphor columns 304R, 304G and 304B is irradiated with electron beams emitted from four strip-shaped electron-emitting devices in the above embodiment, the phosphor as a whole can emit light to an enhanced intensity while no phosphor sections adversely affect the pixels neighboring the respective corresponding ones so that the embodiment is capable of displaying high quality images.

(Embodiment 3-3)

Figure 20:
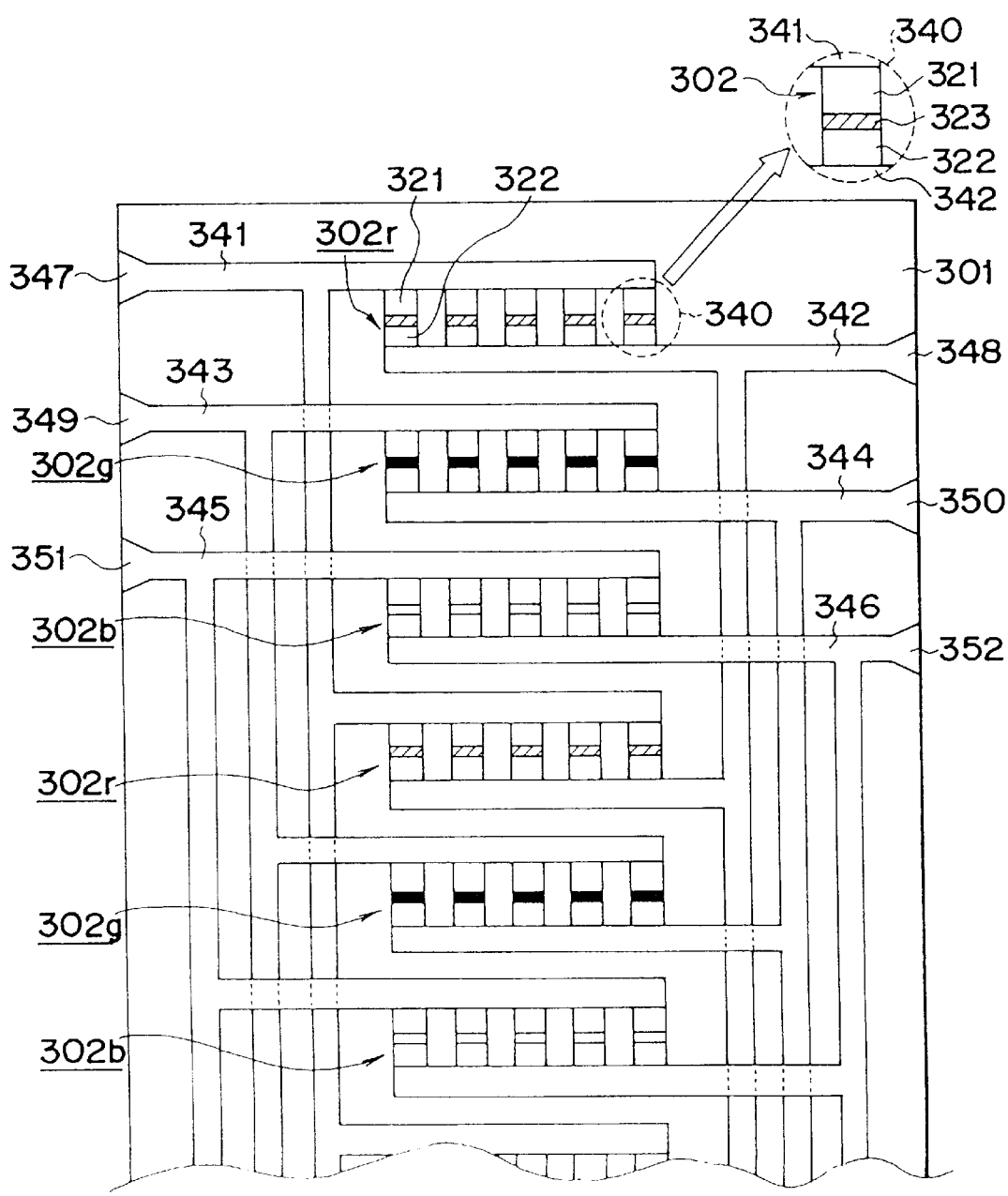
FIG. 20 is a partial plan view of the panel type light source of the third embodiment, showing how cold cathode devices are wired therein.

FIG. 20 is a partial plan view of Embodiment 3-3, showing part of the substrate of its panel type light source where electron-emitting devices are arranged. In FIG. 20, a single electron-emitting device in a circle 340 is shown again in enlarged dimensions. The device comprises a positive electrode 321, a negative electrode 322 and an electron-emitting section 323.

The electron-emitting devices 320 are surface conduction electron-emitting devices that operate excellently for electron beam emission despite of the relatively simple structure. A surface conduction electron-emitting device can be realized by forming a pair of thin film electrodes separated from each other by an appropriate distance on a substrate and arranging an electron-emitting region that contains very fine particles between the electrodes.

The positive and negative electrodes 321 and 322 may be formed typically from a nickel (Ni) thin film by photolithography etching, because this technique allows precise control of the positions and profile of the electrodes and other components of the device. The distance separating the positive and negative electrodes 321 and 322 is preferably between 0.01 and 100 µm and an electron-emitting region 224 is prepared to fill the gap therebetween by forming a thin film containing very fine particles of an appropriate material such as palladium (Pd). The electron-emitting region 323 is preferably a thin film having an electric resistance between $10^3$ and $10^9$ Ω/□ in terms of its electron beam emitting performance.

While the positive and negative electrodes 321 and 322 and the electron-emitting region 323 have a rectangular plan view, they may alternatively be formed to show a different profile. Electron-emitting devices to be used for the purpose of the present invention are not limited to surface conduction electron-emitting devices of the above described type and may alternatively be cold cathode devices using printed emitters such as proposed by Spindt of the SRI Laboratory in "J. Appl. Phys." 39, (1968), 3504, or MIN-type cold cathode devices. Still alternatively, they may be cold cathode devices comprising PN junctions as disclosed in Japanese Patent Publication No. 56-15529. What is essential here is that such devices operate excellently in emitting electrons and can be down-size and arranged in arrays with an enhanced level of precision.

The electron-emitting devices arranged on the substrate 301 are grouped for the three different colors, or groups 302r, 302g and 302b, so that each group is commonly wired and driven independently from the remaining groups. The embodiment additionally comprises distribution electrodes 341 and 342 connected respectively to the positive and negative electrodes 321 and 322 of the first group 302r, distribution electrodes 343 and 344 connected respectively to the positive and negative electrodes 321 and 322 of the second group 302g and distribution electrodes 345 and 346 connected respectively to the positive and negative electrodes 321 and 322 of the third group 302b. The distribution electrodes may typically be made of nickel (Ni) thin films, any two of which may be laid one on the other at the intersection thereof with an insulation film typically made of SiO₂ and interposed therebetween. The electron-emitting devices of the first through third groups 302r, 302g and 302b are electrically connected in parallel for each group. Reference numerals 347 through 352 denotes pads (terminals) for connecting the distribution electrodes 341 through 346 to respective external electric circuits.

Figure 21:
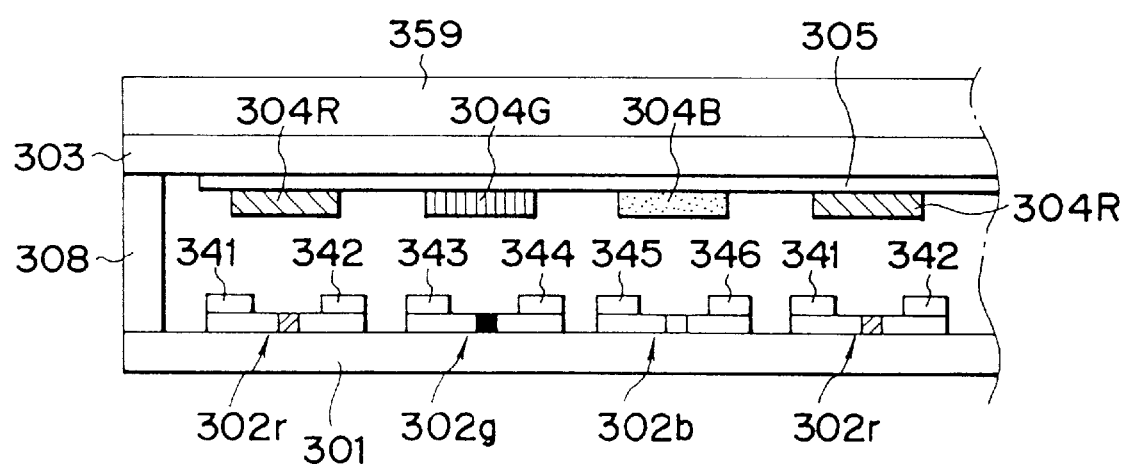
FIG. 21 is a partial sectional view of the panel type light source of the third embodiment, showing a glass substrate and electron emitting devices arranged thereon.

FIG. 21 is a partial plan view of the panel type light source of the embodiment, showing the glass substrate 301 on which the electron-emitting devices are arranged as electron sources. In FIG. 21, reference numeral 308 denotes a glass panel that constitutes a side plate of the light source whereas reference numeral 303 denotes a glass panel constituting an upper plate of the light source. The glass panels 301, 302 and 303 are made of frit glass and mutually bonded to form a panel type vacuum container, the inside of which is held to a vacuum of less than $10^{-5}$ Torr.

A transparent electrode 305 typically made of ITO is arranged under the lower surface of the glass panel 303, to which a voltage, e.g. 10 KV, is applied in order to accelerate the electron beams emitted from the electron-emitting devices 302.

Phosphor spots are arranged on the transparent electrode 305 vis-a-vis the respective corresponding electron-emitting devices. More specifically, red light emitting phosphor is applied to the transparent electrode 305 to form red light emitting phosphor spots 304R that correspond to the electron-emitting devices of the first group 302r. Similarly, green light emitting phosphor is applied to the transparent electrode 305 to form green light emitting phosphor spots 304G that correspond to the electron-emitting devices of the second group 302g, whereas blue light emitting phosphor is applied to the transparent electrode 305 to form blue light emitting phosphor spots 304B that correspond to the electron-emitting devices of the third group 302b. If appropriate, a metal back layer of a type known in the technological field of CRTs may be fitted to the surface of each of the phosphor spots 302R, 302G and 302B.

A light diffuser plate 359 is arranged on the outer surface of the glass panel 303 for scattering rays of light emitted from the phosphor spots 302R, 302G and 302B so that red, green and blue lights may be appropriately mixed with one another before going out as illumination light.

Figure 22:
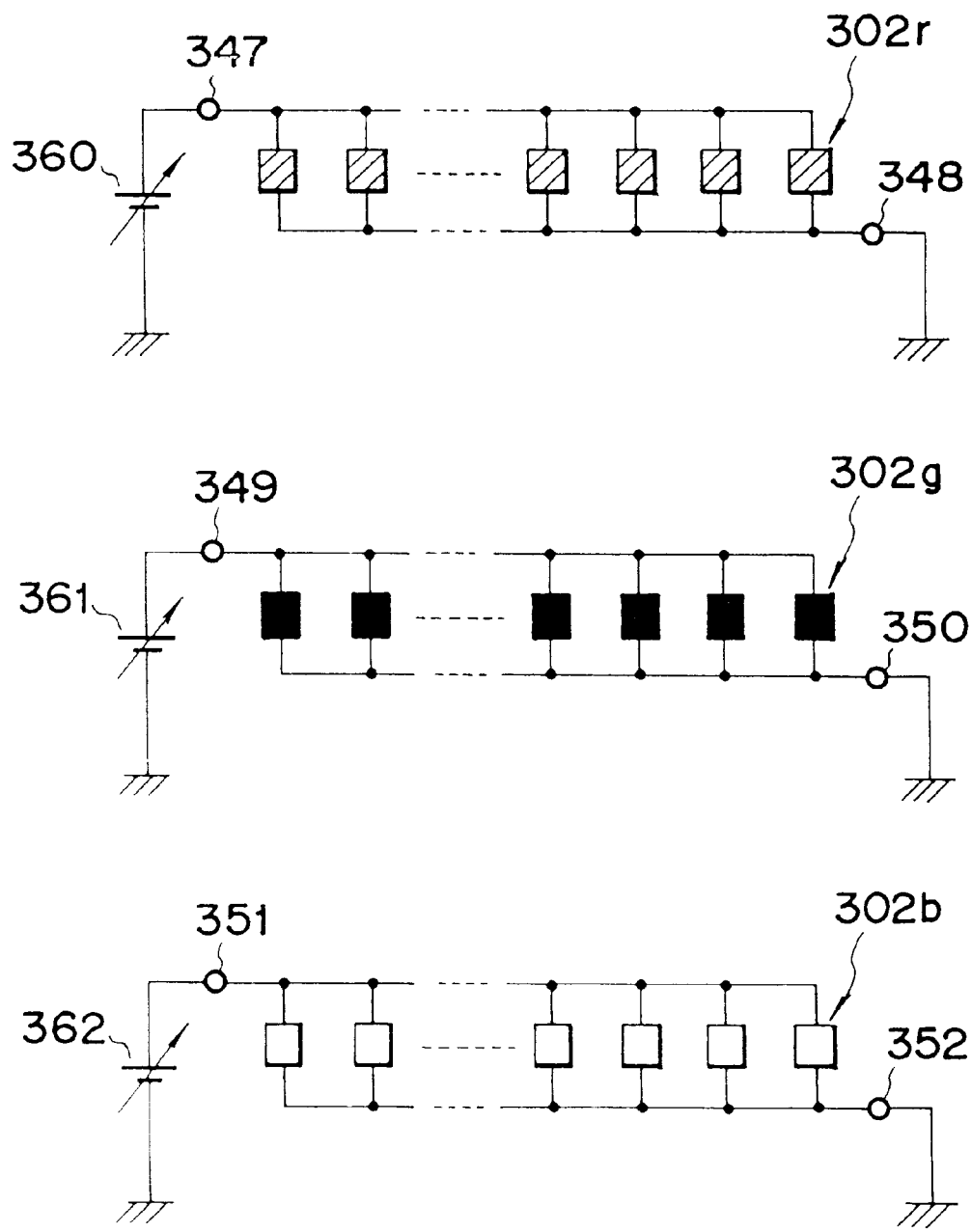
FIG. 22 is a circuit diagram schematically illustrating a preferable method of driving cold cathode devices comprised in the panel type light source of the third embodiment.

FIG. 22 is a schematic circuit diagram of the electron-emitting devices of the groups 302r, 302g and 302b. Variable voltages sources 360, 361 and 362 are provided for the respective groups 302r, 302g and 302b. These variable voltage sources may be such that are commercially available and capable of supplying a variable voltage between 10 and 15 V. Note, however, that a variable voltage of 10 to 15 V is defined for the surface conduction electron-emitting devices of this embodiment because they operate properly for electron emission with the above defined voltage range and a different voltage range may have to be defined if the surface conduction electron-emitting devices are modified in terms of materials and dimensions or if electron-emitting devices of some other type are used.

With the above described arrangement, the panel type light source of the embodiment can be regulated for color tone. For instance, while all the electron-emitting devices are driven by DC once the light source is turned on, the color tone of the display screen of the embodiment may be biased toward red by raising the output voltage of the variable voltage source 360 and increasing the rate of electron beam emission of the electron-emitting devices of the first groups so that the red light emitting phosphor spots 304R are irradiated with more electron beams than the remaining phosphor spots. Although red, green and blue lights are emitted from different luminous spots (phosphor spots), no noticeably uneven color distribution will take place on the display screen because fine phosphor spots are densely distributed in the light source and the light diffuser plate 359 operates effectively to diffuse different colors.

(Embodiment 3-4)

Figure 23:
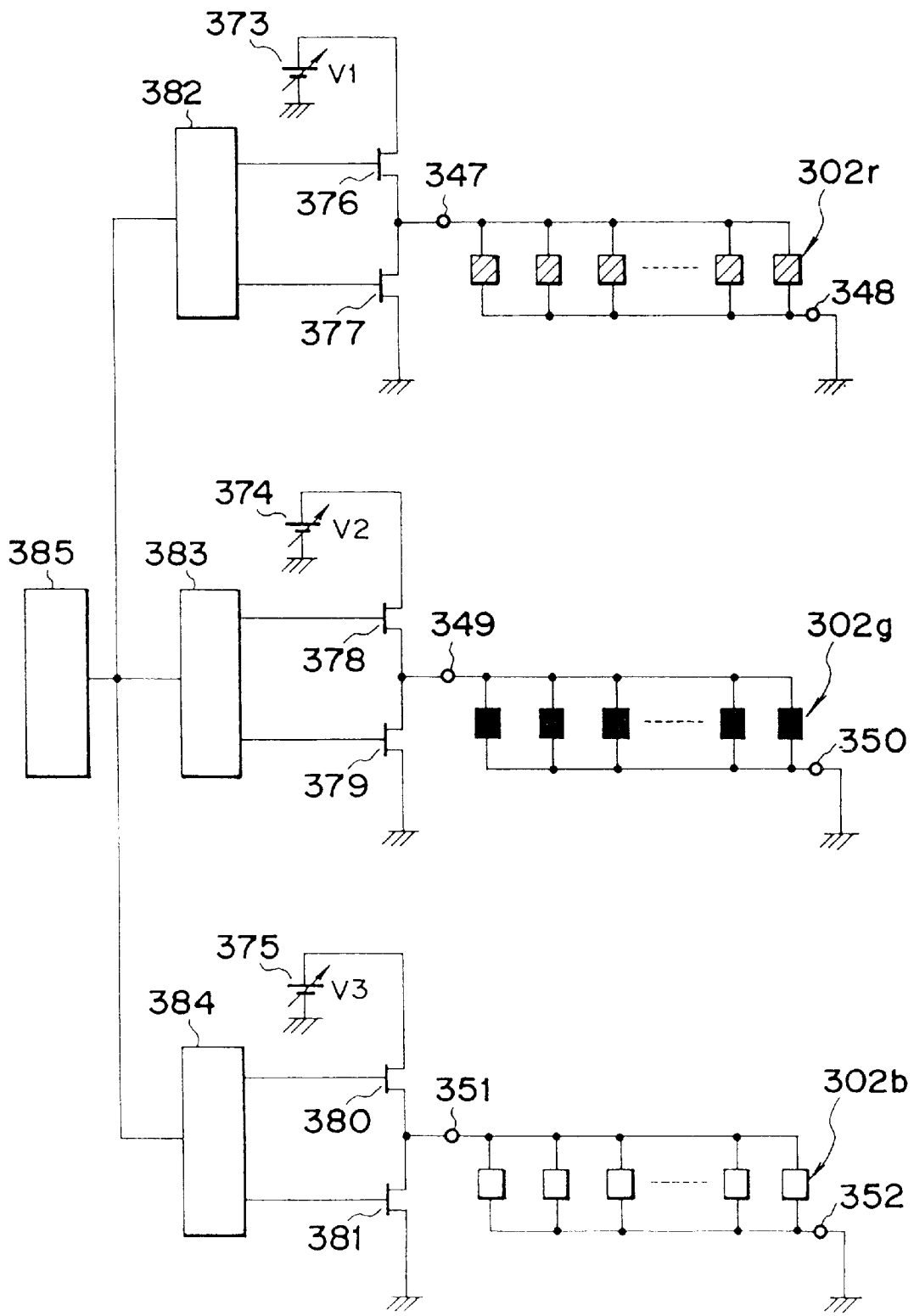
FIG. 23 is a circuit diagram schematically illustrating another preferable method of driving cold cathode devices comprised in the panel type light source of the third embodiment.

FIG. 23 is a schematic circuit diagram of the panel type light source of Embodiment 3-4. While the electron-emitting devices are driven by DC and the color tone of the display screen is regulated by controlling the voltages of the variable voltage sources in Embodiment 3-3, the electron-emitting devices are driven by a pulse-shaped voltage and the color tone of the display screen of this embodiment is regulated by controlling the amplitude or width of the pulse of the voltage applied to each group of electron-emitting devices since, in this embodiment again, electron-emitting devices are divided into three groups.

Referring to FIG. 23, three variable voltage DC sources 373 through 375 are connected to respective pairs of switching devices 376 and 377, 378 and 379 and 380 and 381 that can be, for example, FETs for the purpose of the invention. Of these, the switching devices 376 and 377 operate exclusively of each other such that either the DC sources 373 or the ground level (0 V) is electrically connected to a terminal 347. Similarly, the devices 378 and 379 operate exclusively of each other such that either the DC source 374 or the ground level (0 V) is electrically connected to a terminal 349. Finally, the devices 380 and 381 operate exclusively of each other such that either the DC source 375 or the ground level (0 V) is electrically connected to a terminal 351. Reference numeral 385 denotes a pulse generator for generating pulses having a constant frequency. Reference numerals 382 through 384 denote one shot multivibrators whose operation is triggered by the rising edge of a pulse generated by the pulse generator 385. As one-shot multivibrators 382 through 384 can independently modify the pulse width of the output pulse of the pulse generator, the switching devices 387 through 381 can be controlled for operation by appropriately utilizing the output pulses of the pulse generator that may have different pulse widths.

Figure 24B:
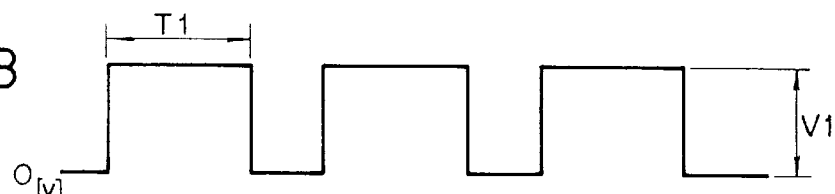
Figure 24C:
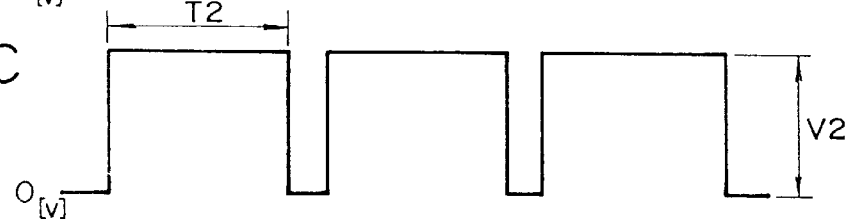
Figure 24D:
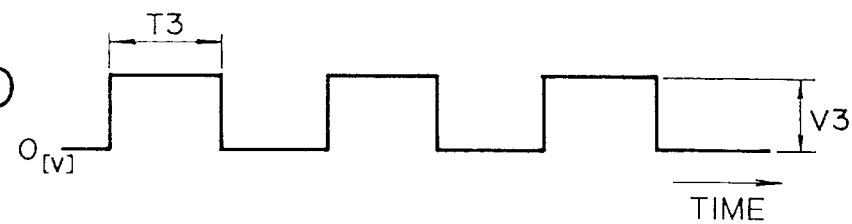

FIGS. 24A through 24D are timing charts illustrating the operation of the embodiment. FIG. 24A shows the output signal of the pulse generator 385 and the operation of one-shot multivibrators 382 is triggered by the rising edge of the pulse. Assuming that time constants T1, T2 and T3 are defined respectively for the one-shot multivibrators 382 through 384, then the electron-emitting devices of the first group 302r are connected to the voltage source 373 by the switching device 387 for a time period of T1. If the output voltage of the voltage source 373 is so controlled as to be equal to V1[V], then the drive voltage waveform of the voltage source 373 will be such as shown in FIG. 24B for the electron-emitting devices of the first group 302r. Similarly, FIGS. 24C and 24D show the drive voltage waveforms for the electron-emitting devices of the second group 302g and those of the third group 302b respectively.

It will be understood that, with such an arrangement, the color tone of the light source can be regulated by controlling the voltages of the DC voltage sources 373 through 375 and/or the time constants of the one-shot multivibrators 382 through 384. If, for example, green light needs to be intensified to achieve a desired color tone, it can be done by raising the output voltage V2 of the DC voltage source 374 and/or by increasing the value of the time constant T2 of the one-shot multivibrator 383.

While the drive voltages have a rectangular waveform in the above description, it may alternatively have any other waveform such as triangular or sinusoidal.

(Embodiment 3-5)

Figure 25:
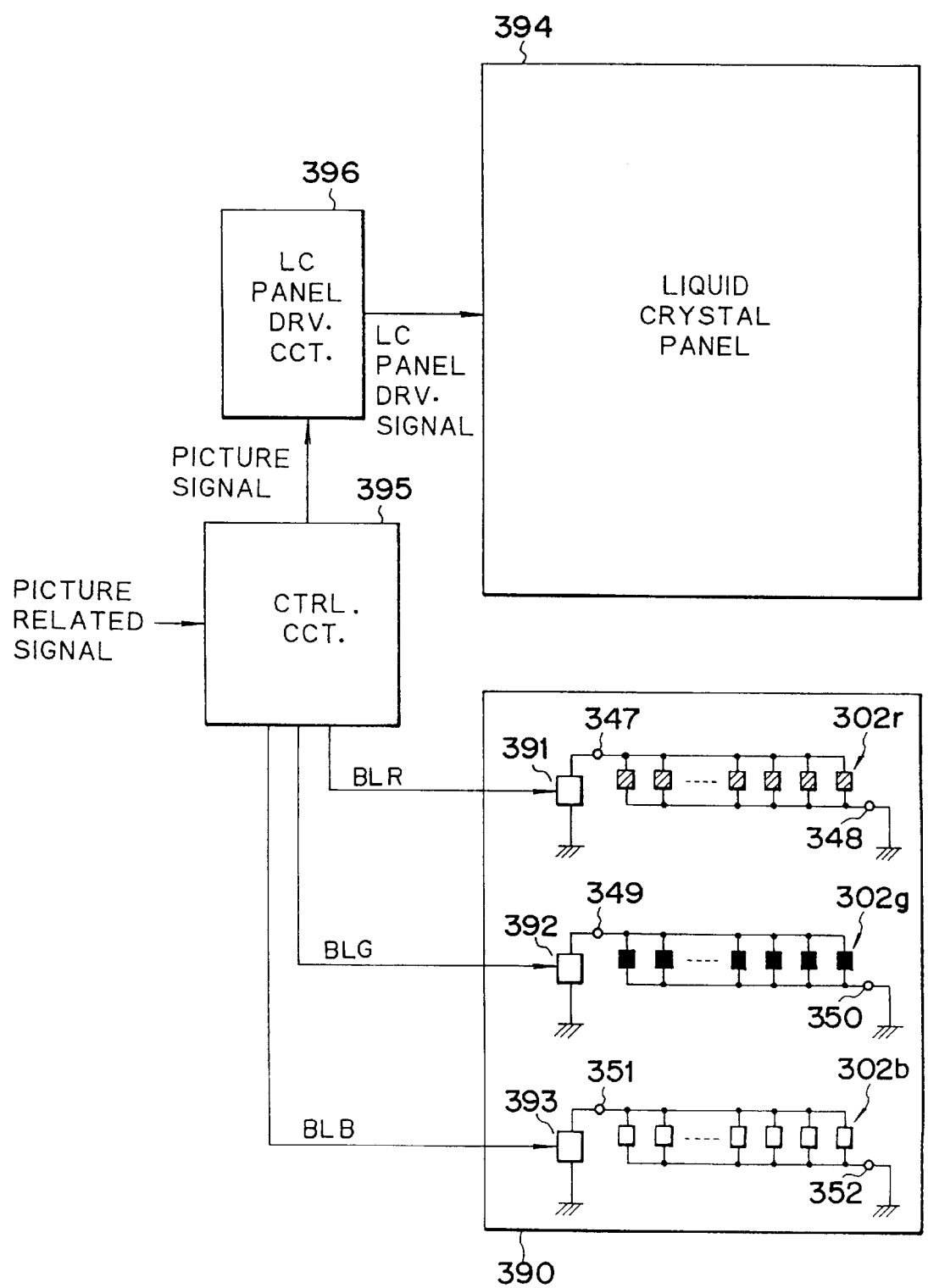
FIG. 25 is a schematic circuit diagram of the drive circuit for driving the third embodiment.

FIG. 25 is a schematic circuit diagram of a circuit for driving an image display apparatus according to the invention and comprising a panel type light source controllable for color tone and a liquid crystal panel.

In FIG. 25, reference numeral 390 denotes a panel type light source that is controllable for color tone and reference numerals 391, 392 and 393 respectively denotes power sources for driving surface conduction electron-emitting devices for red, green and blue lights. Reference numeral 394 denotes a transmission type liquid crystal panel and reference numeral 395 denotes a control circuit whereas reference numeral 396 denotes a liquid crystal panel drive circuit. Note that, for simplicity, an accelerating voltage source for applying an accelerating voltage to the phosphor members of the panel type light source 390 and some other components are not shown.

The display apparatus configured in a manner as described above operates as follows. In this apparatus, the color tone (color balance) of the displayed image can be regulated easily by controlling the color tone of the illumination light source.

The control circuit 395 appropriately picks up picture signals out of the picture related signals entering the apparatus from outside and sends them to the liquid crystal panel drive circuit 396. The liquid crystal panel drive circuit, on its part, sends out liquid crystal panel drive signals to the liquid crystal display panel 394.

The control circuit 395 uses control signals BLR, BLG and BLB for controlling the drive power sources 391, 392 and 393 respectively as well as other control signals (not shown) for controlling the operation of the accelerating voltage source (not shown) so that appropriate voltages may be applied to them. Once the apparatus starts displaying images, the apparatus displays images in accordance with the incoming picture related signals but the viewer may modify at will the color tone (color balance) of the current image on the display screen simply and quickly by controlling the output level of the electron-emitting devices to make the color tone (color balance) meet the viewer's taste and/or the lighting conditions of the surroundings.

The output level of the electron-emitting devices can be modified either by modifying the peak level of the pulse-shaped output voltage of the electron-emitting device driving power source or by controlling the width of the pulse-shaped voltage being applied to the electron-emitting devices if a pulse voltage generator is used for the electron-emitting device driving power source.

While only a small number of pixels and corresponding electron-emitting devices are shown in the drawings for the above embodiments, they may actually comprise as many as 300×300 or more pixels.

An apparatus having a configuration as described above can be made very thin and display bright color images in a stable manner with a reduced level of energy consumption and heat generation and without any uneven distribution of brightness on the screen when compared with any comparable conventional apparatuses using white fluorescent lamps for illumination.

It should be noted that the above described embodiments have a simplified configuration without requiring complicated and costly image signal processing circuits and other circuits so that they may be realized at significantly reduced cost because the color tone of display can be regulated in the light source itself. Additionally, since the dynamic range of the proper transmissivity of the display panel itself can be fully exploited because of the structural features, chromatically well balanced and well graduated images can be displayed on any known display panel.

Finally, the color reproducibility of the embodiments can be further improved by selecting a suitable phosphor material and using color filters.

Embodiment 4

Figure 26:
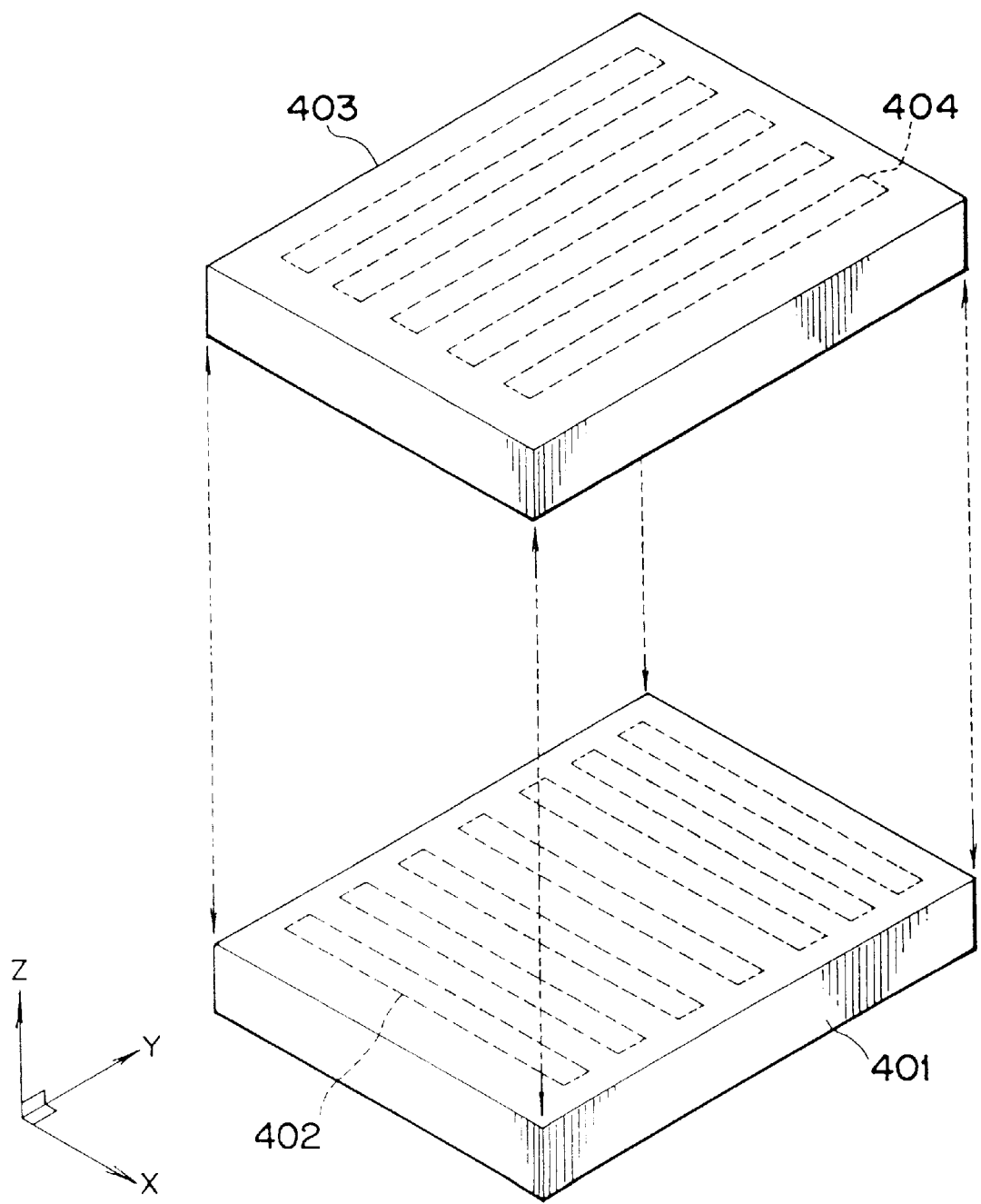
FIG. 26 is a schematic perspective view of a fourth embodiment of the invention, illustrating its basic configuration.

FIG. 26 is a schematic perspective view of a fourth embodiment of the invention, illustrating its basic configuration. Referring to FIG. 26, the embodiment comprises a panel type linear sequential scanning light source 401 for sequentially emitting a linear light flux on a one by one basis for linear sequential scanning and a panel type optical modulator 403 for modulating the light emitted by the linear sequential scanning light source 401 and forming images on a display panel. The linear sequential scanning light source 401 has a number of linear light emitting sections 402 arranged in parallel with the X-axis in FIG. 26 so that the linear sequential scanning light source 401 emits scanning light linearly and sequentially as the light emitting sections 402 are sequentially driven to emit light on a one by one basis. On the other hand, a number of stripe-shaped optical modulation cells 404 are arranged on the optical modulator 403 in parallel with the Y-axis in FIG. 26. Thus, the linear light emitting sections 402 and the stripe-shaped optical modulation cells 404 rectangularly intersect each other. The optical modulation cells 404 of the optical modulator 403 are driven to operate in synchronism with the sequential activation of the light emitting sections 402 of the linear sequential scanning light source 401 in order to form an image line by line on the display screen.

While the linear sequential scanning light source 401 and the optical modulator 403 are shown as if they are separated from each other along the Z-axis in FIG. 26 for simplification, they may be arranged close to each other or, if desired, they may be integrally formed.

FIGS. 27A and 27B are sectional views of the embodiment of FIG. 26 taken along a plane defined by arrows X and Z. Referring to FIGS. 27A and 27B, the linear sequential scanning light source 401 is realized in the form of a vacuum container comprising a bottom plate 405, side plates 406 and a top plate 407. The inside of the vacuum container is preferably held to a vacuum of less than $10^{-5}$ Torr. The top plate 407 is required to be transparent and the bottom plate 405, the side plates 406 and the top plate 407 all made of glass. While a number of electron-emitting devices are formed along the X-axis on the upper surface of the bottom plate 405, they will be described in greater detail hereinafter by referring to FIG. 28. Reference numeral 408 denotes the electron-emitting section of each electron-emitting device. A transparent electrode 410 and a phosphor layer 409 are laid on the lower surface of the top plate 407. An accelerating voltage is applied to the transparent electrode 410 to accelerate the electron beams emitted from the electron-emitting devices. The phosphor layer 409 emits rays of light when irradiated with electron beams.

The optical modulator comprises a thin type container having a bottom plate 411, side plates 412 and a top plate 413. An appropriately oriented liquid crystal material is sealed in the inside space 414 of the container. A transparent electrode is arranged on the upper surface of the bottom plate 411 and stripe-shaped transparent electrodes 416 are oppositely arranged on the lower surface of the top plate 413. Deflector plates 417 and 418 are arranged respectively on the lower surface of the bottom plate 411 and on the upper surface of the top plate 413. The optical modulator 403 operates basically in much the same way as TN-type liquid crystal popularly used for display panels. Note that each of the optical modulation cells 404 of the optical modulator is realized in the form of a stripe extending along the Y-axis as shown by dotted lines in FIGS. 27A and 27B.

Figure 28:
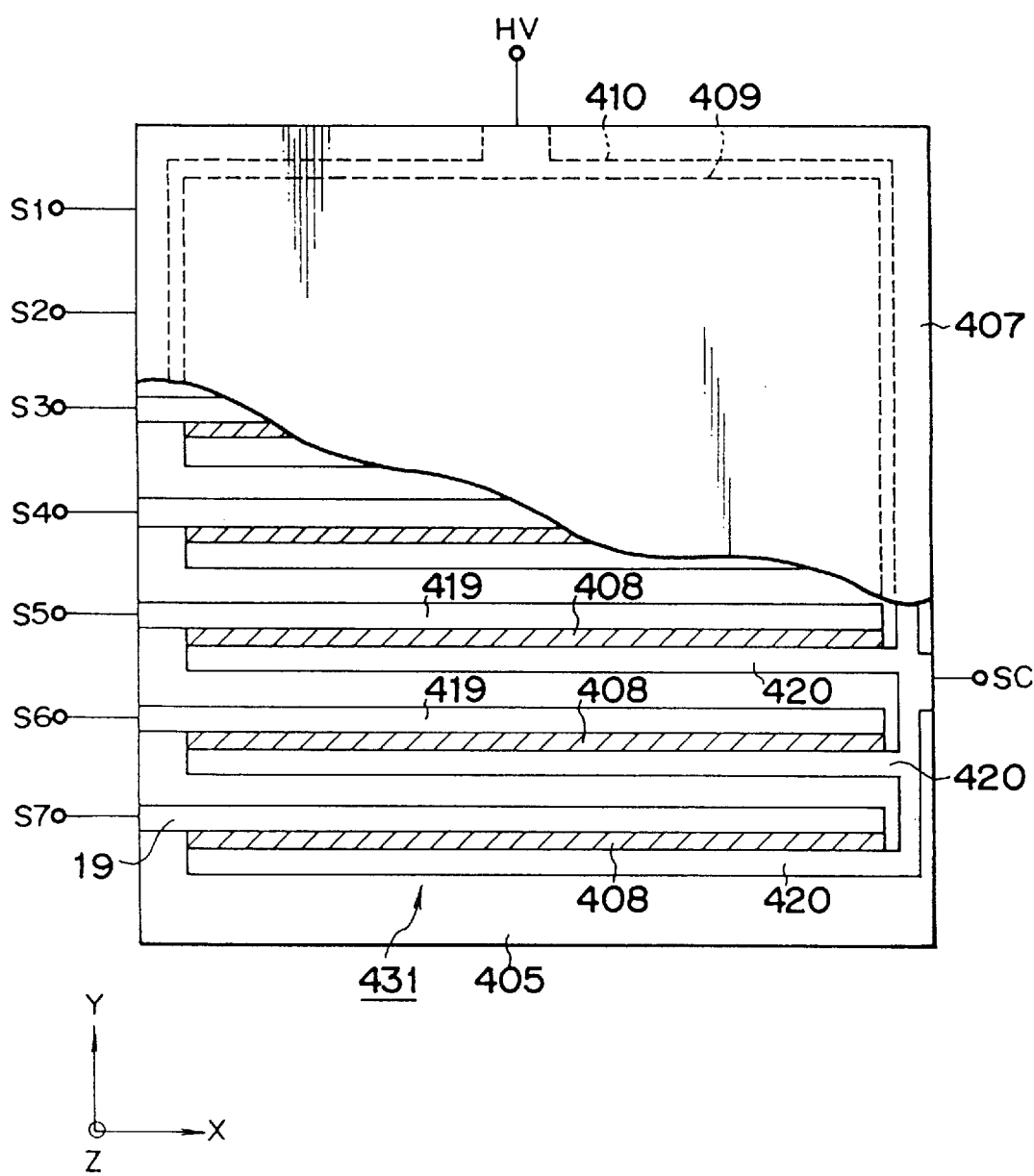
FIG. 28 is a partially torn off plan view of the linear sequential scanning light source of the embodiment of FIG. 26.

FIG. 28 is a plan view of the linear sequential scanning light source 401 of FIG. 26, having its top plate 407 partly torn off to show the inside. In a lower half portion of FIG. 28, it is seen that electron-emitting devices 431 are formed on the upper surface of the bottom plate 405, each comprising a positive electrode 419, a negative electrode 420 and a electron-emitting region 408 arranged between the electrodes 419 and 420. The electron-emitting devices 431 of this embodiment are surface conduction electron-emitting devices. The positive and negative electrodes 419 and 420 of each device are formed typically from a nickel (Ni) thin film by photolithography etching, while precisely controlling their positions and profile and thereafter the electron-emitting region 408 is produced by applying a solution containing very fine palladium (Pd) particles under a dispersed condition to the space between the positive and negative electrodes 419 and 420. The distance separating the electrodes 222 and 223 is preferably between 0.01 and 100 $\mu$m and a solution containing very fine palladium (Pd) particles under a dispersed condition is applied to the gap in such a way that the thin film formed after the solution is dried to fill the gap shows an electric resistance between $10^3$ and $10^9$ $\Omega/\square$.

As seen in FIG. 28, the electron-emitting devices 431 are arranged in rows in parallel with the X-axis and the positive electrodes 419 of the devices 431 are respectively connected to terminals S1 through S7. On the other hand, all the negative electrodes 420 of the devices are connected to a common terminal SC, which is by turn connected to an external line. As described above, a transparent accelerating electrode 410 made of ITO and a phosphor layer 409 are laid on the lower surface of the top plate 407, of which the accelerating electrode 410 is electrically connected to an external line by way of a terminal HV.

Figure 29:
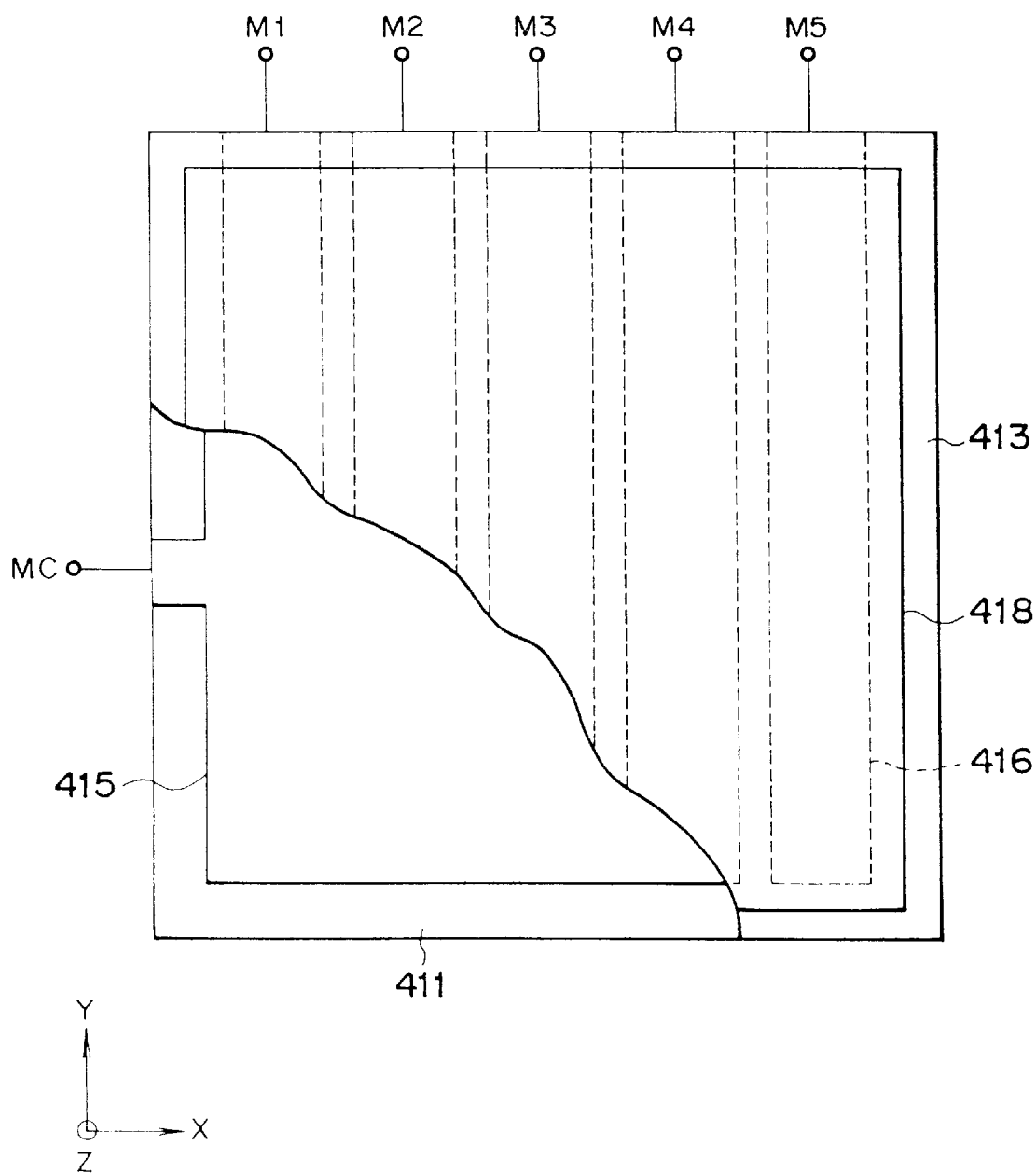
FIG. 29 is a partially torn off plan view of the optical modulator of the embodiment of FIG. 26.

FIG. 29 is a plan view of the optical modulator 403 of FIG. 26, having its top plate 413 partly torn off at a lower left portion thereof to show the inside. In the lower left portion of FIG. 29, it is seen that a transparent electrode 415 is formed on the upper surface of the bottom plate 411. The transparent electrode 415 serves as a common electrode for the stripe-shaped optical modulation cells and connected externally via a terminal MC. Stripe-shaped transparent electrodes 416 are arranged in parallel with the Y-axis on the lower surface of the top plate 413 and externally connected via respective terminals M1 through M5.

Figure 30:
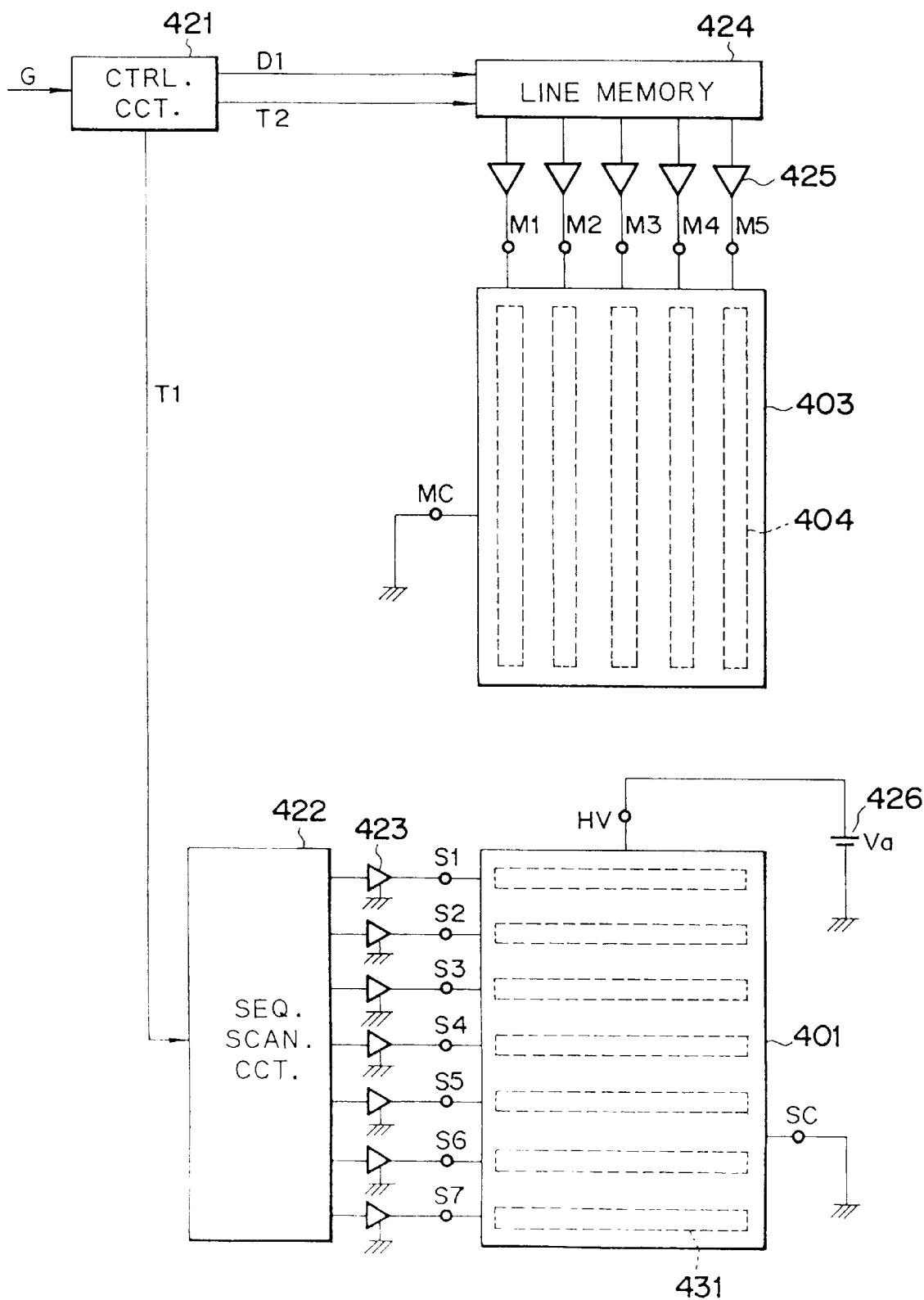
FIG. 30 is a schematic block diagram illustrating the method of driving the apparatus of FIG. 26.

The apparatus is driven to operate in a manner as described below. FIG. 30 is a schematic block diagram of the apparatus that can be used to illustrate how the apparatus is driven to operate. In FIG. 30, reference numeral 421 denotes a control circuit for controlling the timing of picture data transmission and that of operation of each component section of the apparatus. Picture signals G that may typically be NTSC signals are externally given to the control circuit 421, which by turn generates timing signals for driving the image display apparatus in response to the picture signals G and, at the same time, serially sends out data on the images to be formed. It also sends out linear sequential scanning timing signal T1 to the linear sequential scanning light source 401 for linear sequential scanning operation.

Sequential scanning circuit 422 is a circuit for sequentially selecting the electron-emitting devices 431 to be driven on a one by one basis and the output signal of the sequential scanning circuit 422 is appropriately amplified for its voltage in order to successfully drive the electron-emitting devices 431 by means of switching devices 423 provided for driving the electron-emitting devices. If the electron-emitting devices are surface conduction electron-emitting devices, they can emit electron beams with a satisfactory intensity when a voltage of approximately 14 V is applied thereto and, therefore, the switching devices 423 may be constituted of MOS-FETs, for example, that can be prepared to a highly integrated form. The negative electrodes 420 of the devices are grounded by way of the terminal SC such that electron beams are emitted from the electron-emitting devices 431 when 14 V is applied to the positive electrode 419 of the electron-emitting device 431 to be driven by way of the right one of the terminals S1 through S7.

On the other hand, the accelerating electrode 410 is connected to a power source 426 via the terminal HV and an accelerating voltage Va of e.g. 1 KV is applied thereto by the power source 426 such that the electron beams emitted from the electron-emitting devices 431 are accelerated before they linearly hit the phosphor layer 409, when by turn emit light in lines. Thus, as 14 V is sequentially applied to the terminals S1 through S7, linearly arranged rays of light are emitted for linear sequential scanning operation.

As described above, the control circuit 421 sends out picture data D1 (on light and shade) of the image to be formed on the display screen to the optical modulator 403 along with data transfer timing (clock) signal T2. The serially transferred picture data D1 are then temporarily stored in a line memory 424 for a single line before they are converted into parallel data and sent out. Then, the data on light and shade for a single line stored in the line memory 424 are converted by an amplifier 415 into a modulation voltage for driving the stripe-shaped liquid crystal cells 404 of the optical modulator 403 and applied to the right one of the liquid crystal cells 404 via the related one of the terminals M1 through M5. Thus, an image is formed on the liquid crystal screen on a line by line basis as the liquid crystal cells 404 are driven by the picture data for the image in synchronism with the linearly arranged rays of scanning light emitted from the linear sequential scanning light source 401.

It will be easily understood that, while the number of scanning lines of the linear sequential scanning light source 401 is made equal to seven and the number of the stripe-shaped optical modulation cells of the optical modulator 403 is only five in the above description and FIGS. 26 through 30 for the purpose of simplicity, a large image display apparatus may prepared on the above described principle so that it may comprise as many as 1,200 scanning lines, each having more than 2,000 pixels.

Electron-emitting devices to be used for the purpose of the present invention are not limited to surface conduction electron-emitting devices of the above described type and may alternatively be cold cathode devices using printed emitters such as proposed by Spindt of the SRI Laboratory in "J. Appl. Phys." 39, (1968), 3504, or MIM-type cold cathode devices. Still alternatively, they may be cold cathode devices comprising PN junctions as disclosed in Japanese Patent Publication No. 56-15529.

The optical modulator is not limited to a TN type liquid crystal panel for the purpose of the invention. What is essentially required here is a transmission type panel comprising stripe-shaped optical modulation cells and therefore other types of liquid crystal such as scattering mode liquid crystal and ceramic materials such as PLZT may be appropriately be used for the purpose of the invention.

Figure 31:
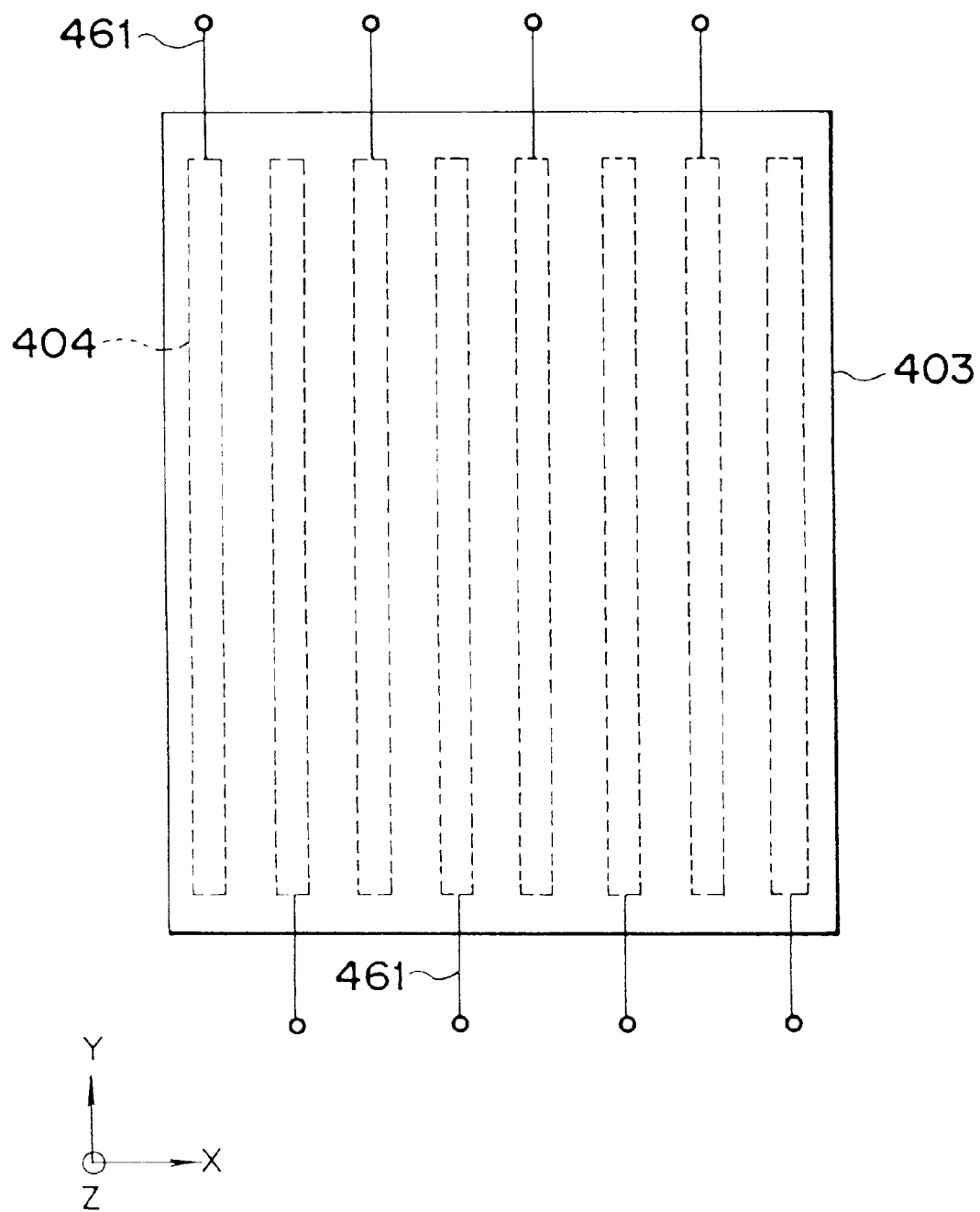
FIG. 31 is a schematic plan view of a modified optical modulator that can be used for the embodiment of FIG. 26.
Figure 32:
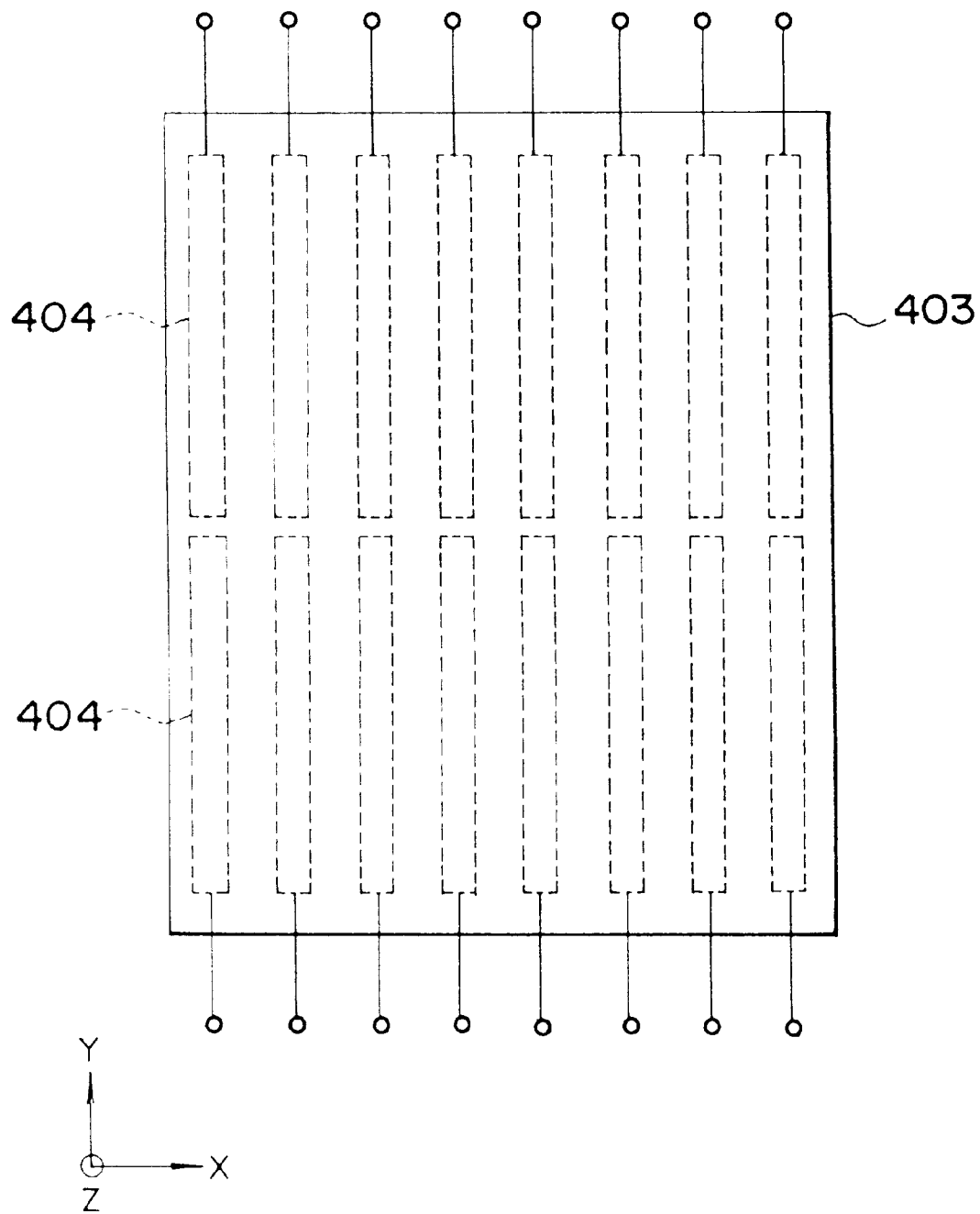
FIG. 32 is a schematic plan view of another modified optical modulator that can be used for the embodiment of FIG. 26.

The optical modulator may alternatively comprise stripe-shaped optical modulation cells 404 that are alternately connected to oppositely arranged electric connectors 461 as illustrated in FIG. 31. Or still alternatively, it may comprise stripe-shaped liquid crystal cells 404 arranged in two rows so that the display screen are divided into upper and lower halves as shown in FIG. 32.

As the embodiment comprises a panel type light source having electron-emitting devices adapted to linear sequential scanning and a panel type optical modulator having stripe-shaped optical modulation cells, it is possible to make it very thin and provided with a highly bright display screen having an even distribution of brightness by using electron-emitting devices such as surface conduction electron-emitting devices and a phosphor layer for the panel type light source. Since surface conduction electron-emitting devices are structurally simple and hence can be arranged tightly and regularly, a large capacity image display apparatus having a large display screen can be realized by using such devices.

A transmission type optical modulator can be realized by arranging, for example, TN liquid crystal cells in stripes and, since such an arrangement does not require a XY (simple) or active matrix system, it is easy to drive such a modulator. Again, it can remarkably contribute to a large display panel and a large displaying capacity because of its structural simplicity.

Thus, an image display apparatus according to the invention and carried out in the above described mode can be made very thin and have a large display screen with an evenly distributed brightness and a large capacity.

Embodiment 5

Figure 33:
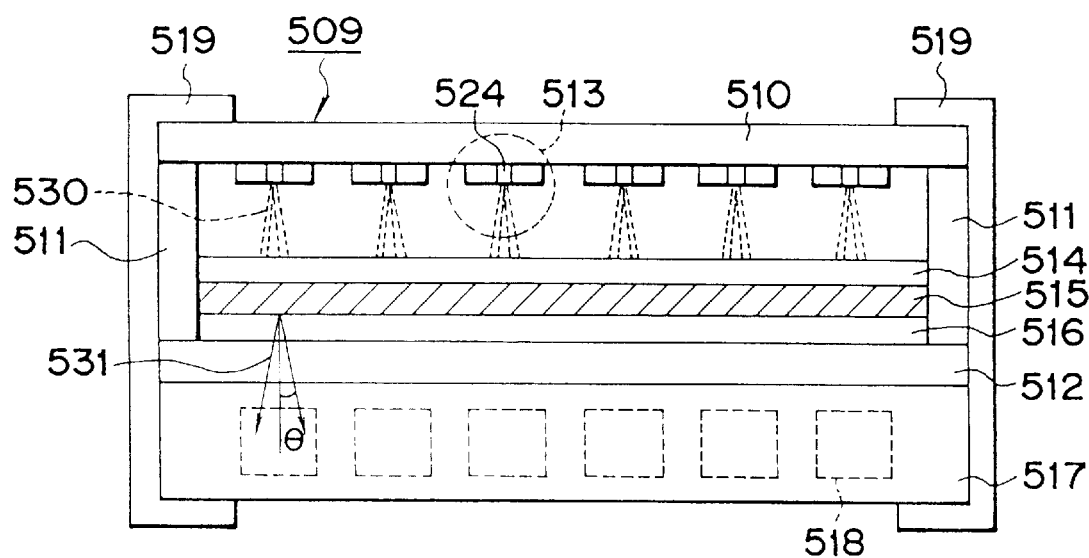
FIG. 33 is a sectional view of a part of a fifth embodiment of image display apparatus according of the invention.

FIG. 33 is a sectional view of a fifth embodiment of the invention. Referring to FIG. 33, the embodiment comprises a glass substrate 510 constituting a rear plate of the light source of the embodiment, which is realized in the form of a vacuum container having side glass plates 511 and a front glass plate 512. The inside of the vacuum container is preferably held to a vacuum of less than $10^{-5}$ Torr.

In FIG. 33, reference numeral 517 denotes a transmission type liquid crystal panel provided thereon liquid crystal light values 518 for modulating illumination light.

Surface conduction electron-emitting devices 513 are arranged on the glass substrate 510 at a pitch equal to that of arrangement of the liquid crystal light valves 518. As will be described in greater detail hereinafter, the surface conduction electron-emitting devices 513 are designed to emit electron beams from their electron-emitting regions 524 when an appropriate voltage is applied thereto and all the electron-emitting devices 513 are electrically connected in parallel.

An interference filter 516, a phosphor layer 515 and a metal back layer 514 are sequentially laid on the glass plate 512 in the above mentioned order to produce a multilayer structure.

The metal back layer 514 is typically made of an aluminum thin film having a thickness between 300 and 500 nm and the phosphor layer 515 is formed by applying appropriately selected materials for red, green and blue to a thickness of 20 to 50 $\mu$m so that it may emit light with desired wavelengths.

The interference filter 516 is formed by laying alternately $TiO_2$ thin films and $SiO_2$ this film to produce a multilayer structure, although the thickness of each thin film and the number of layers of the multilayer structure need to be appropriately determined as a function of the desired wavelengths of light.

Reference numeral 519 denotes fixtures to be used for aligning the illumination light source 509 comprising the above described components 510 through 516 and the transmission type liquid crystal panel 517. After aligning the luminous spots of the illumination light source 509 and the respective corresponding liquid crystal light valves 518, the light source and the panel are rigidly held together to make a unit by means of the fixtures.

Figure 38:
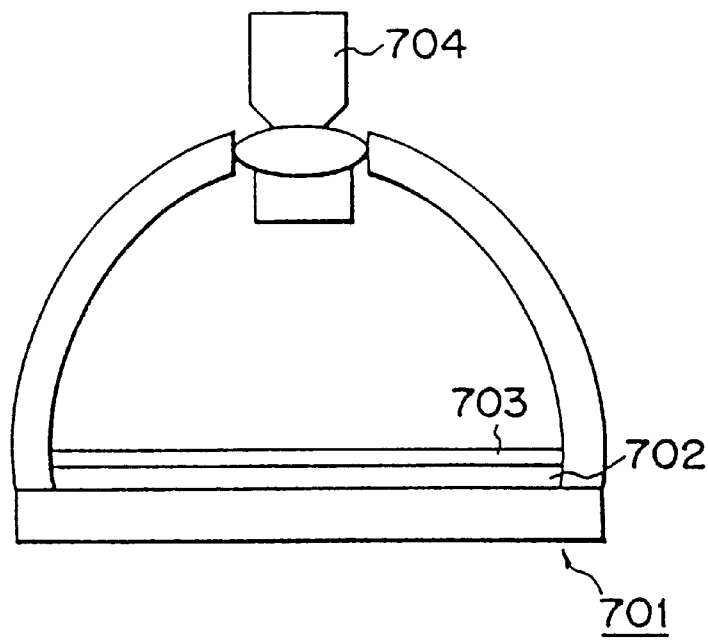
FIG. 38 is a schematic side view of a conventional projection type image display apparatus comprising a cathode luminescence light source.
Figure 39:
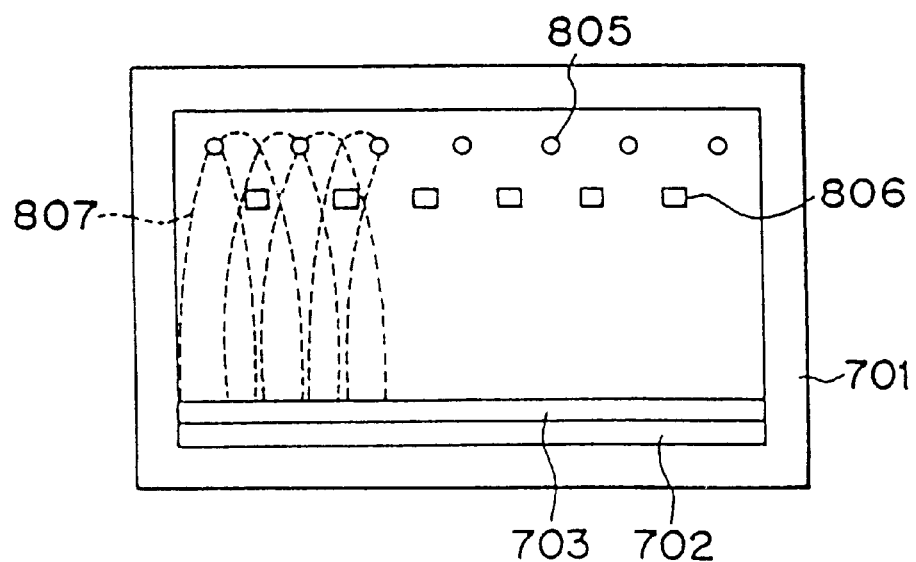
FIG. 39 is a schematic plan view of another conventional projection type image display apparatus comprising a cathode luminescence light source different from that of FIG. 38.

The embodiment having the above configuration operates in a manner as described below. As a drive voltage is applied to the electron-emitting devices 513, they start emitting electron beams simultaneously. Under this condition, a voltage that may typically be 20 KV is applied to the metal back layer 514 in order to accelerate the emitted electron beams until they hit the phosphor layer 515, which by turn is energized and emits rays of light. Since, unlike any conventional light sources as shown in FIGS. 38 and 39, electrons emitted from the electron-emitting devices 513 proceed, taking the form of beams that are independent from one another as shown by dotted lines 530 in FIG. 33, the entire surface of the phosphor layer 515 in not evenly irradiated with electron beams but only limited areas that correspond to the openings of the liquid crystal light valves 518 are locally irradiated with beams so that those areas become highly luminous spots. It should be noted that the angle of emission $\theta$ of the emitted rays of light 531 is limited so that they effectively strike and efficiently illuminate the light valves 518.

The electron-emitting devices 513 will now be described in detail. In this embodiment, surface conduction electron-emitting devices that operate excellently for electron beam emission despite of the relatively simple structure are used. A surface conduction electron-emitting device can be realized by forming a pair thin film electrodes separated from each other by an appropriate distance on a substrate and arranging an electron-emitting region that contains very fine particles between the electrode.

Figure 34A:
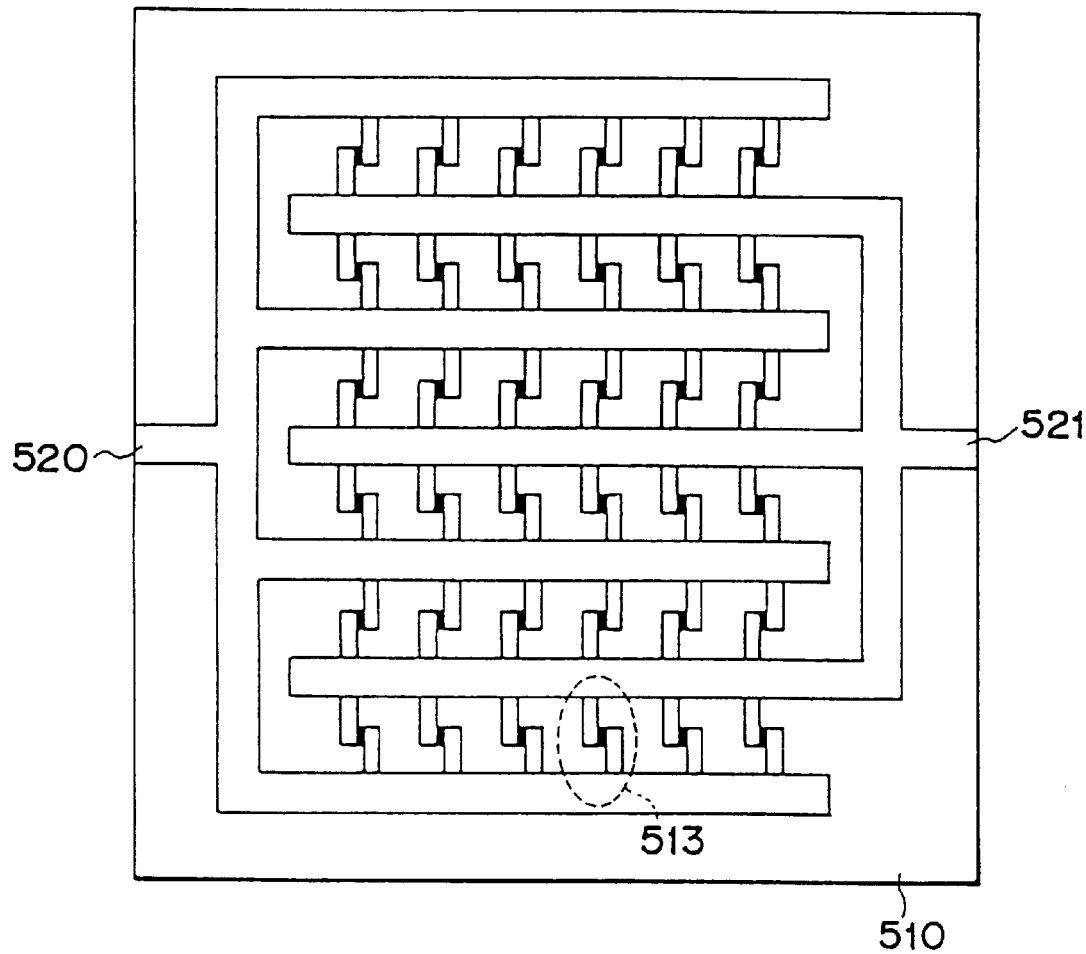
FIG. 34 is a plan view of the electron beam source of the embodiment of FIG. 33.
Figure 34B:
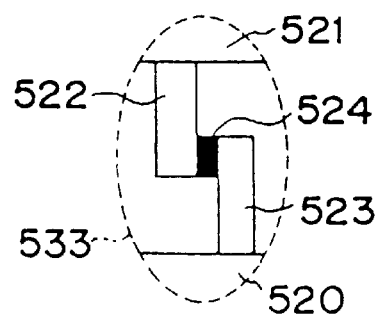

FIG. 34 is a plan view of the electron beam source of the embodiment of FIG. 33, showing how the electron-emitting devices 513 are arranged on the glass substrate 510. In FIG. 34, a single surface conduction electron-emitting device 513 in a smaller dotted ellipse is shown in enlarged dimensions in a larger dotted ellipse indicated by numeral 533 in FIG. 13, said device 513 comprising a electrode 522, an electrode 523 and an electron-emitting region 524. The electrodes 522 and 523 my be formed typically from a nickel (Ni) thin film by photolithography etching, while precisely controlling their positions and profile. The distance separating the electrodes 522 and 523 is preferably between 0.01 and 100 $\mu$m and an electron-emitting region 524 is prepared to fill the gap therebetween by forming a thin film containing very fine particles of an appropriate material such as palladium (Pd). The electron-emitting region 524 is preferably a thin film having an electric resistance between $10^3$ and $10^9$ $\Omega/\square$ in term of its electron beam emitting performance.

While the electrodes 522 and 523 and the electron-emitting region 524 have a rectangular plan view, they may alternatively be formed to show a different profile. It should be noted that only six liquid crystal light valves 518 and six electron-emitting devices 513 are shown in FIG. 33 and arranged in respective single rows. Correspondingly, only 6×6=36 electron-emitting devices 513 are shown in FIG. 34, although, for example, as many as 500×500=250,000 electron-emitting devices may be arranged on the glass substrate 510 if the embodiment is used for a projection type color television set.

Electron-emitting devices to be used for the purpose of the present invention are not limited to surface conduction electron-emitting devices of the above described type and may alternatively be cold cathode devices using printed emitters such as proposed by Spindt of the SRI Laboratory in "J. Appl. Phys." 39, (1968), 3504, or MIM-type cold cathode devices. Still alternatively, they may be cold cathode devices comprising PN junctions as disclosed in Japanese Patent Publication No. 56-15529. What is essential here is that such devices operate excellently in emitting electrons and can be down-sized and arranged in arrays with an enhanced level of precision.

Figure 35:
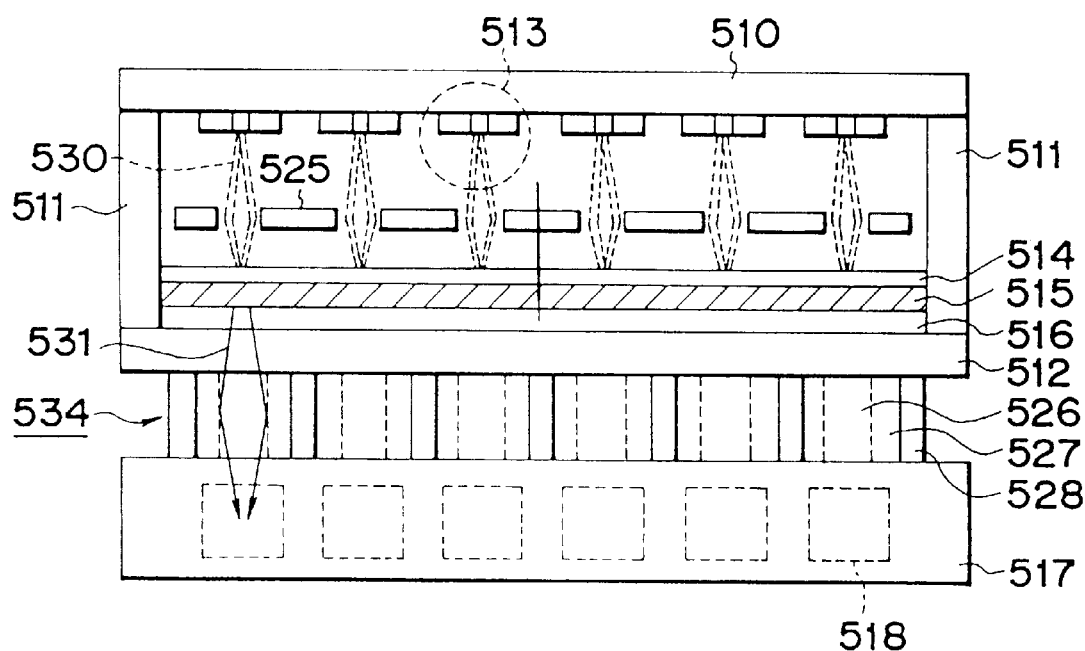
FIG. 35 is a sectional view of a modified electron beam source that can be used for the embodiment of FIG. 33.

FIG. 35 is a schematic sectional view of a light source obtained by modifying that of the above embodiment. This light source differs from that of the above embodiment in that electron lenses 525 are additionally arranged for focusing electron beams and an optical guide path 534 is provided between each of the luminous spots of the phosphor layer and the corresponding liquid crystal light valve 518. It is otherwise similar to that of the above embodiment.

The electron lenses 525 are collectively made of a metal plate having electron passage holes at positions exactly opposite to the electron-emitting devices so that it operates as electron focusing lenses when an appropriate voltage is applied thereto. Since electron beams are focused toward the phosphor layer 515 as illustrated by dotted lines 530 in FIG. 35 as they pass through the electron lenses 525, they are converged to so much smaller luminous spots on the phosphor layer to produce intensified fluxes of light that are emitted via an interference film filter 516 and a face plate 512.

The optical guide paths 534 comprise for each path a core section 526 having a high reflective index and forming an optical fiber, a clad section 527 having a low refractive index and also forming an optical fiber and a resin section 528 for bonding the optical fibers together so that as it is realized in the form of a so-called fiber plate as a whole. While rays of light 531 emitted from each luminous spot show a limited angle of emission under the effect of the inter reference filter 516 and then effectively guided to the corresponding liquid crystal light valve 518 by the corresponding optical fibers 526 and 527 as shown in FIG. 35 so that they hit the liquid crystal light valve 518 practically without any loss.

While fixtures as shown in FIG. 33 are not present in FIG. 35, they may be appropriately provided to effectively align and held together the vacuum container of the light source, the optical guide paths 534 and the transmission type liquid crystal panel 517.

Figure 36:
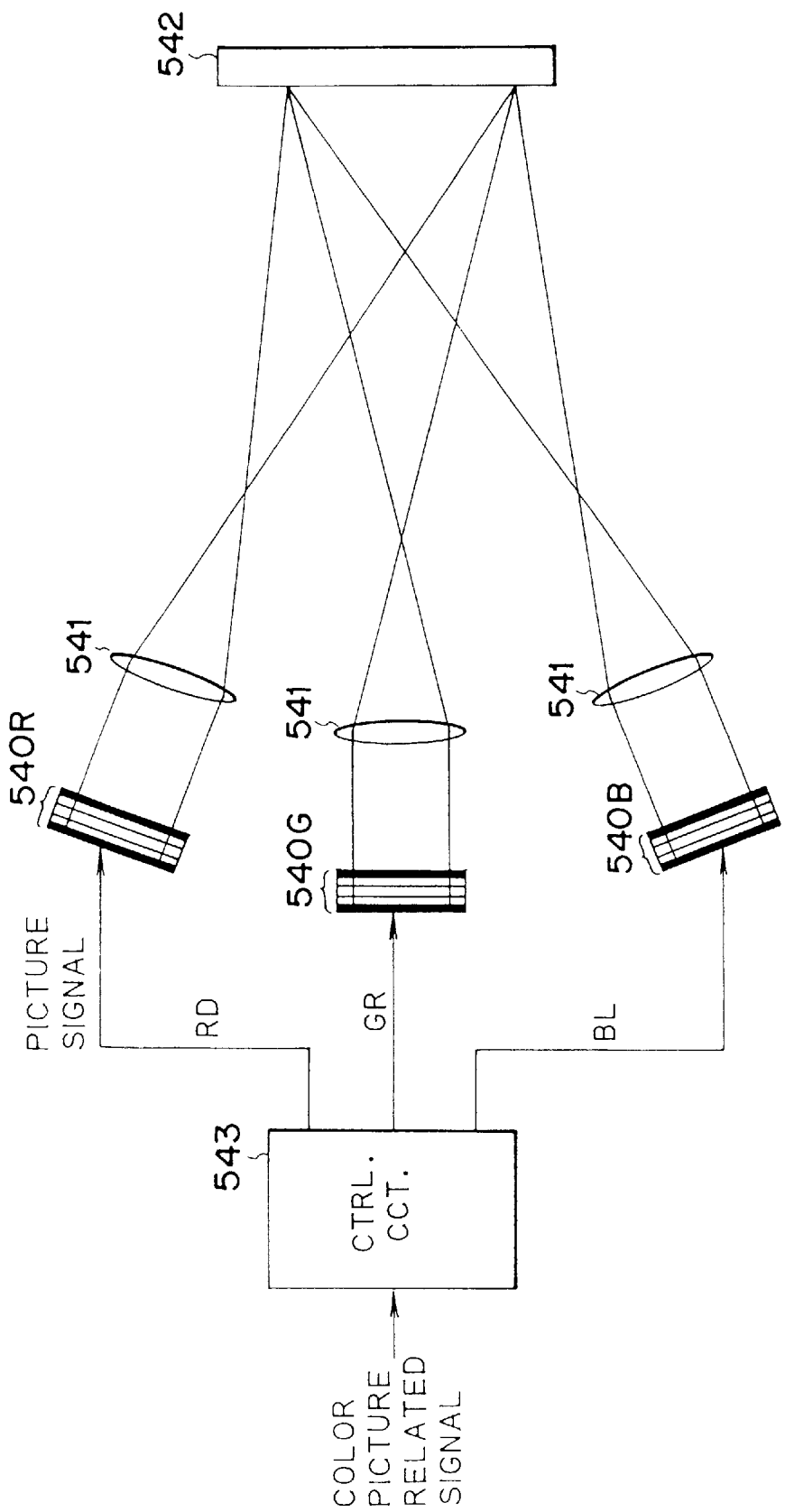
FIG. 36 is a schematic illustration of the optical system of a projection type color image display apparatus according to the invention.
Figure 37:
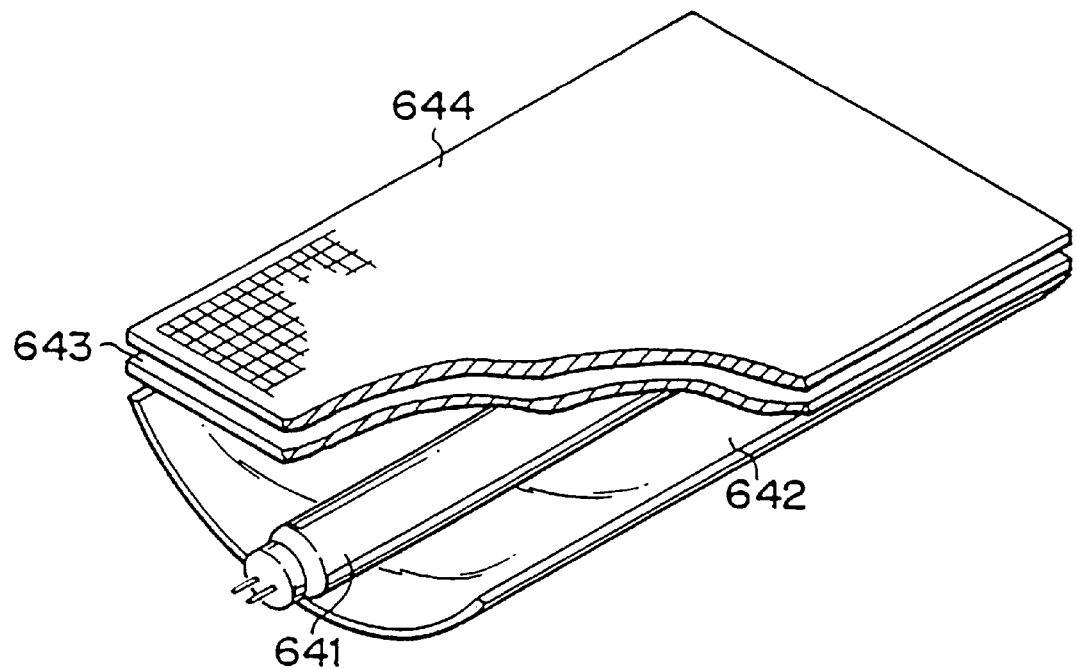
FIG. 37 is a partly torn off schematic perspective view of a conventional direct viewing type image display apparatus, showing its illumination system.

FIG. 36 is a schematic illustration of the optical system of a projection type display apparatus comprising the units of FIGS. 33 through 35. Referring to FIG. 36, reference symbols 540R, 540G and 540B respectively denote projector units for red, green and blue lights, each comprising a light source and a transmission type liquid crystal panel. Reference numerals 541 and 542 respectively denote a projection lens and a projection screen, whereas reference numeral 543 denotes a control circuit.

The control circuit 543 appropriately extracts picture signals for three colors necessary for image display out of the incoming picture related signals and transmits respective picture signals to the projector units. The projector units drive the respective liquid crystal panels according to the picture signals they receive, while the liquid crystal panels are illuminated from behind by the respective panel type light sources. The rays of light emitted from the projector units are focused by the projection lenses to produce an image on the screen 542.

The apparatus may be either of front projection type for viewing projected images from the projector side or of rear projection type for viewing projected images from the side opposite to the projector.

As described above in detail, an image display according to the invention utilizes electron emitting devices such as surface conduction electron-emitting devices for an electron source to realize a very thin cathode luminescence light source and, at the same time, solve the problem of uneven distribution of brightness of the image display screen that accompanies conventional apparatus of the type under consideration. Since electron-emitting devices are structurally simple, they allow remarkable down-sizing and standardizing such that they can be arranged tightly in one-to-one correspondence with liquid crystal light valves to accurately irradiate the respective light valves with focused electron beams, which by turn emit light with a relatively small angle of emission, if necessary after passing an interference filter. Such a compact illumination system comprising electron emitting devices and liquid crystal light valves arranged with one-to-one correspondence is characterized by evenness and uniformity of illumination because of the standardized quality of the electron-emitting devices and can realize a projecting type image display screen with a degree of uneven illumination of less than 1/128 for a television set.

The luminous spots of the phosphor layer of the apparatus can be reduced to produce intense fluxes of light for the light valves by arranging an electron lens between each of the electron-emitting devices and the corresponding phosphor spot.

Additionally, the level of lighting loss can be reduced to achieve an improved lighting efficiency by arranging an optical guide path between each of the luminous spots of the light source and the corresponding liquid crystal light valve.

Finally, as the level of uneven illumination is reduced, a remarkably down-sized color television set comprising liquid crystal light valves can be realized with an astonishingly reduced level of uneven illumination of the display screen.

What is claimed is:

1. An image display apparatus, comprising:
a light source including a vacuum container containing (i) a plurality of cold-cathode devices arranged two-dimensionally on a substrate, said cold-cathode devices emitting electron beams, and (ii) a phosphor member within said container, said cold-cathode devices irradiating said phosphor member with the emitted electron beams, and said phosphor member emitting visible light when irradiated by the emitted electron beams;
a transmission type optical modulation panel comprising a light valve arranged outside of said container, said light valve being illuminated with and modulating the visible light emitted by said light source; and
a plurality of variable voltage sources connected to said plurality of cold cathode devices, wherein
said light source comprises red, green and blue phosphor members for color display and further comprising electric feeding means for operating said cold-cathode devices for irradiating said red, green and blue phosphor members with electron beams, and wherein
said cold-cathode devices for irradiating said red phosphor members with electron beams, said cold-cathode devices for irradiating said green phosphor members with electron beams and said cold-cathode devices for irradiating said blue phosphor members with electron beams are connected to said respective variable voltage sources capable of changing the amplitude of the applying voltage and/or the time period of the applying voltage.

2. An image display apparatus according to claim 1, wherein said plurality of cold-cathode devices are a plurality of surface conduction electron-emitting devices.

3. An image display apparatus according to claim 1, wherein said transmission type optical modulation panel is a panel utilizing a liquid crystal material for light valves.

4. An image display apparatus according to claim 1, wherein said transmission type optical modulation panel is of a direct viewing type.

5. An image display apparatus according to claim 1, further comprising a projection type optical system.

6. An image display apparatus according to claim 1, further comprising optical means provided between said phosphor member of said light source and said transmission type optical modulation panel.

7. An image display apparatus according to claim 6, wherein said optical means comprises at least light diffusing means.

8. An image display apparatus according to claim 6, wherein said optical means comprises at least a gradient index lens.

9. An image display apparatus according to claim 8, wherein said optical means comprises at least first and second gradient index lenses, wherein said first gradient index lens closest to said phosphor member of said light source has a radius greater than that of said second gradient index lens remote from said phosphor member.

10. An image display apparatus according to claim 6, wherein said optical means comprises wavelength selection means for selecting a wavelength.

11. An image display apparatus according to claim 6, wherein said optical means comprises an interference filter.

12. An image display apparatus according to claim 6, wherein said optical means comprises an optical guide path.

13. An image display apparatus according to claim 1, wherein further comprising a transparent electrode between said light source and said transmission type optical modulation panel, said transparent electrode is electrically connected to a common grounding terminal of a drive circuit of said light source and a drive circuit of said transmission type optical modulation panel.

14. An image display apparatus according to claim 1, wherein said transmission type optical modulation panel includes a plurality of pixels, and each light emitting area of said light source is smaller than an opening of a light valve of each said pixel of said transmission type optical modulation panel.

15. An image display apparatus according to claim 1, further comprising a display screen, and wherein said transmission type optical modulation panel has a plurality of light valves, the ratio of the arranging interval of said light valves to the arranging interval of said cold-cathode devices of said light source being constant throughout said entire display screen.

16. An image display apparatus according to claim 1, wherein said transmission type optical modulation panel includes a plurality of pixels, and said light source includes a red, green or blue phosphor members arranged in correspondence with each pixel of said transmission type optical modulation panel.

17. An image display apparatus according to claim 1, wherein said plurality of cold-cathode devices are arranged in rows in parallel with an X-axis and stripe-shaped light valves are arranged in parallel with a Y-axis rectangularly intersecting the X-axis, the X- and Y-axes being defined by a coordinate system, and further comprising drive means for driving said cold-cathode devices of said light source sequentially row by row and applying a modulation signal to each light valve of said transmission type optical modulation panel in synchronism with the timing of driving said cold-cathode devices.

18. An image display apparatus according to claim 1, further comprising a control electrode arranged between each of said cold-cathode devices of said light source and a phosphor member corresponding to each cold-cathode device for focusing electron beams.

19. A method of driving an image display apparatus having a light source including a vacuum container containing (i) a plurality of cold-cathode devices arranged two-dimensionally on a substrate, the cold-cathode devices emitting electron beams, and (ii) a phosphor member within the container, the cold-cathode devices irradiating the phosphor member with the emitted electron beams, and the phosphor member emitting visible light when irradiated by the emitted electron beams and a transmission type of optical modulation panel comprising a light valve and arranged outside of the vacuum container, said method comprising the steps of:

applying a voltage to the plurality of cold-cathode devices to force them to emit electron beams;

irradiating the phosphor member with the electron beams emitted from the plurality of cold-cathode devices to cause the phosphor member to emit visible light;

illuminating the transmission type optical modulation panel from behind with the visible light from the irradiated phosphor member;

driving the transmission type optical modulation panel according to picture signals; and controlling the color balance of a display screen to a desired color tone by applying a color tone control signal to the light source and modifying the color tone of light emitted from the light source according to the control signal, wherein the step of modifying the color tone of light emitted from the light source further comprises the step of independently modifying the drive signal being applied to the cold-cathode devices for irradiating red phosphor members, the drive signal being applied to the cold-cathode devices for irradiating green phosphor members and the drive signal being applied to the cold-cathode devices for irradiating blue phosphor members according to the control signal, and wherein the step of modifying the drive signals being applied to the cold-cathode devices further comprises the step of changing the amplitude of the voltage being applied to the plurality of cold-cathode devices and/or the time period of applying the voltage according to the control signal.

20. A method of driving an image display apparatus according to claim 19, further comprising the step of controlling the maximum brightness of a display screen to a desired level by applying a maximum brightness control signal to the light source and modifying the brightness of light emitted from the panel type light source according to the control signal.

21. A method of driving an image display apparatus having a light source including a vacuum container containing (i) a plurality of cold-cathode devices arranged two-dimensionally on a substrate, the cold-cathode devices emitting electron beams, and (ii) a phosphor member within the container, the cold-cathode devices irradiating the phosphor member with the emitted electron beams, and the phosphor member emitting visible light when irradiated by the emitted electron beams and a transmission type of optical modulation panel comprising a light valve and arranged outside of the vacuum container, said method comprising the steps of:

applying a voltage to the plurality of cold-cathode devices to force them to emit electron beams;

irradiating the phosphor member with electron beams emitted from the plurality of cold-cathode devices to cause the phosphor member to emit visible light;

illuminating the transmission type optical modulation panel from behind with the visible light from the irradiated phosphor member;

driving the transmission type optical modulation panel according to picture signals; and controlling the maximum brightness of a display screen to a desired level by applying a maximum brightness control signal to the light source and modifying the brightness of light emitted from the light source according to the control signal, wherein modifying the brightness of light emitted from the light source further comprises the step of changing the amplitude of the voltage being applied to the plurality of cold-cathode devices and/or the time period of applying the voltage according to the control signal.

22. A method of driving an image display apparatus according to claim 21, further comprising the step of controlling the color balance of a display screen to a desired color tone by applying a color tone control signal to the light source and modifying the color tone of light emitted from the light source according to the control signal.

23. A method of driving an image display apparatus according to claim 22, wherein the step of modifying the color tone of light emitted from the light source further comprises the step of independently modifying the drive signal being applied to the cold-cathode devices for irradiating red phosphor members, the drive signal being applied to the cold-cathode devices for irradiating green phosphor members and the drive signal being applied to the cold-cathode devices for irradiating blue phosphor members according to the control signal.

24. A method of driving an image display apparatus having a light source including a vacuum container containing (i) a plurality of cold-cathode devices arranged two-dimensionally on a substrate, the cold-cathode devices emitting electron beams, and (ii) a phosphor member within the container, the cold-cathode devices irradiating the phosphor member with the emitted electron beams, and the phosphor member emitting visible light when irradiated by the emitted electron beams and a transmission type of optical modulation panel comprising a light valve and arranged outside of the vacuum container, said method comprising the steps of:

applying a voltage to the plurality of cold-cathode devices to force them to emit electron beams;

irradiating the phosphor member with electron beams emitted from the plurality of cold-cathode devices to cause the phosphor member to emit visible light;

illuminating the transmission type optical modulation panel from behind with the visible light from the irradiated phosphor member;

driving the transmission type optical modulation panel according to picture signals; and controlling the maximum brightness of a display screen to a desired level by applying a maximum brightness control signal to the light source and modifying the brightness of light emitted from the light source according to the control signal, wherein modifying the brightness of light emitted from the light source further comprises a step of changing the amplitude of the voltage being applied to the phosphor members.

25. A method of driving an image display apparatus according to claim 24, further comprising the step of controlling the color balance of a display screen to a desired color tone by applying a color tone control signal to the light source and modifying the color tone of light emitted from the light source according to the control signal.

26. A method of driving an image display apparatus according to claim 25, wherein the step of modifying the color tone of light emitted from the light source further comprises the step of independently modifying the drive signal being applied to the cold-cathode devices for irradiating red phosphor members, the drive signal being applied to the cold-cathode devices for irradiating green phosphor members and the drive signal being applied to the cold-cathode devices for irradiating blue phosphor members according to the control signal.

* * * * *

UNITED STATES PATENT AND TRADEMARK OFFICE
CERTIFICATE OF CORRECTION

PATENT NO. : 6,184,850 B1
DATED : February 6, 2001
INVENTOR(S) : Hidetoshi Suzuki et al.

Page 1 of 1

It is certified that error appears in the above-identified patent and that said Letters Patent is hereby corrected as shown below:

Item [56], References Cited:
U.S. PATENT DOCUMENTS, "Spague et al." should read -- Sprague et al. --.

Column 30,
Line 9, "407" should read -- 407 are --.

Column 37,
Line 6, "wherein" should be deleted.

Signed and Sealed this

Twenty-seventh Day of November, 2001

Attest:

Nicholas P. Godici

NICHOLAS P. GODICI
Attesting Officer    Acting Director of the United States Patent and Trademark Office